United States Patent
Urushihata et al.

(10) Patent No.: US 7,363,896 B2
(45) Date of Patent: Apr. 29, 2008

(54) VARIABLE VALVE TIMING CONTROL DEVICE OF INTERNAL COMBUSTION ENGINE

(75) Inventors: Haruyuki Urushihata, Chiryu (JP); Hisashi Iida, Kariya (JP)

(73) Assignee: Denso Corporation, Aichi-pref. (JP)

( * ) Notice: Subject to any disclaimer, the term of this patent is extended or adjusted under 35 U.S.C. 154(b) by 0 days.

(21) Appl. No.: 11/494,612

(22) Filed: Jul. 28, 2006

(65) Prior Publication Data

US 2006/0260573 A1    Nov. 23, 2006

Related U.S. Application Data

(62) Division of application No. 10/510,765, filed on Oct. 12, 2004, now Pat. No. 7,107,951.

(51) Int. Cl.
    *F01L 1/34* (2006.01)
(52) U.S. Cl. .................. 123/90.17; 123/90.15; 123/90.31
(58) Field of Classification Search ............. 123/90.17, 123/90.15, 90.31
    See application file for complete search history.

(56) References Cited

U.S. PATENT DOCUMENTS

| | | | |
|---|---|---|---|
| 5,181,484 A * | 1/1993 | Kan et al. ................ | 123/90.17 |
| 5,293,076 A | 3/1994 | Fukui | |
| 5,417,187 A | 5/1995 | Meyer et al. | |
| 5,598,814 A * | 2/1997 | Schroeder et al. ....... | 123/90.11 |
| 5,680,837 A | 10/1997 | Pierik | |
| 5,924,395 A | 7/1999 | Moriya et al. | |
| 6,328,006 B1 | 12/2001 | Heer | |
| 6,405,694 B2 | 6/2002 | Sato | |
| 6,412,459 B1 | 7/2002 | Takahashi et al. | |
| 6,446,602 B1 | 9/2002 | Yonezawa et al. | |
| 6,457,446 B1 * | 10/2002 | Willmot ................... | 123/90.17 |

(Continued)

FOREIGN PATENT DOCUMENTS

JP    U-61-186708    11/1986

(Continued)

OTHER PUBLICATIONS

Examination Report cited in corresponding JP application JP2003-320612.

(Continued)

*Primary Examiner*—Zelalem Eshete
(74) *Attorney, Agent, or Firm*—Nixon & Vanderhye P.C.

(57) ABSTRACT

A required valve timing change rate Vreq is calculated so as to make a deviation D between a target valve timing VTtg and an actual valve timing VT small and then a required speed difference DMCRreq between a motor 26 and a camshaft 16 is calculated on a basis of the required valve timing change rate Vreq. When the deviation D is larger than a predetermined value, a required motor speed Rmreq is calculated by adding the required speed difference DMCRreq to a camshaft speed RC and a motor control value is calculated so as to control the motor speed RM to the required motor speed Rmreq. When the deviation D is not larger than the predetermined value, the camshaft speed RC is set as the required motor speed Rmreq and the motor control value is calculated so as to control the motor speed RM to the camshaft speed RC.

31 Claims, 43 Drawing Sheets

U.S. PATENT DOCUMENTS

2002/0096134 A1* 7/2002 Michelini et al. ........ 123/90.15

FOREIGN PATENT DOCUMENTS

| JP | 63-001728 | 1/1988 |
|----|-----------|--------|
| JP | 4-318238 | 11/1992 |
| JP | A-6-213021 | 8/1994 |
| JP | A-7-054620 | 2/1995 |
| JP | 7-229410 | 8/1995 |
| JP | 8-109840 | 4/1996 |
| JP | 8-210158 | 8/1996 |
| JP | A-10-227236 | 8/1998 |
| JP | 2001-207879 | 8/2001 |
| JP | A-2001-207879 | 8/2001 |
| JP | A-2001-234765 | 8/2001 |
| JP | A-2001-248410 | 9/2001 |
| JP | A-2001-355462 | 12/2001 |
| JP | 2002-130037 | 5/2002 |
| JP | 2002-138865 | 5/2002 |
| JP | 2002-161763 | 6/2002 |
| JP | A-2002-161763 | 6/2002 |

OTHER PUBLICATIONS

Examination Report cited in corresponding JP application JP2003-045392.
Korean Office Action issued in Appln. No. 016653 (Jun. 12, 2006).
Office Action dated Oct. 25, 2006 in corresponding Japanese Application No. 2003-045392 (including English translation).
Office Action dated Jun. 1, 2007 in corresponding Japanese Application No. 2003-045392 (including English translation).

* cited by examiner

EFFECTIVE VOLTAGE
CORRECTION COEFFICIENT K
FOR WHEN MOTOR SPEED
IS INCREASING

EFFECTIVE VOLTAGE
CORRECTION COEFFICIENT K
FOR WHEN MOTOR SPEED
IS DECREASING

VARIABLE VALVE TIMING CONTROL DEVICE OF INTERNAL COMBUSTION ENGINE

This application is a Divisional of U.S. application Ser. No. 10/510,765, filed Oct. 12, 2004, now U.S. Pat. No. 7,107,951 allowed, which is the U.S. national phase of international application PCT/JP03/13578, filed 23 Oct. 2003, which designated the U.S. PCT/JP03/13578 claims priority to JP Application Nos. JP 2002-310579, filed 25 Oct. 2002, JP 2002-320612, filed 5 Nov. 2002, JP 2002-344892, filed 28 Nov. 2002 and JP 2003-45392, filed 24 Feb. 2003. The entire contents of these applications are incorporated herein by reference.

TECHNICAL FIELD

This invention relates to a variable valve timing control device of an internal combustion engine, for varying the valve timing of intake valves or exhaust valves of an internal combustion engine.

BACKGROUND ART

In recent years, among internal combustion engines mounted in automotive vehicles, an increasing number have employed variable valve timing devices for varying the valve timing of intake valves and exhaust valves with the object of increasing output, reducing fuel consumption, and lowering exhaust emissions. Most variable valve timing devices in use at present change the valve timing of intake valves and/or exhaust valves driven to open and close by a camshaft by driving a phase-varying mechanism with hydraulic pressure to vary the rotation phase of the camshaft with respect to a crankshaft. However, in a hydraulically driven variable valve timing device like this there is the shortcoming that in cold conditions and on starting of the engine the hydraulic pressure is insufficient, the responsiveness of hydraulic control falls, and the accuracy of valve timing control falls.

In this connection, as disclosed for example in JP-A-6-213021, motor-driven variable valve timing devices have been developed, in which a phase-varying mechanism is driven with drive power from a motor to vary the rotation phase of a camshaft with respect to a crankshaft and thereby vary a valve timing.

However, in this motor-driven variable valve timing device of related art, because the construction is such that the motor as a whole rotates integrally with a pulley rotationally driven by the crankshaft, there is the short coming that the inertial weight of the rotating system of the variable valve timing device is heavy and the durability of the variable valve timing device is poor. Furthermore, a sliding contact arrangement using brushes or the like has to be used to connect the rotating motor with external electrical wiring, and this also constitutes a cause of reduced durability. Also, motor-driven variable valve timing devices of related art have had the shortcoming that their overall construction is complex and they are high in cost.

The present invention was made in view of these circumstances, and an object of the invention is to provide a variable valve timing control device of an internal combustion engine with which while fulfilling the requirements of increased durability and reduced cost of a variable valve timing device it is possible to control a valve timing by motor drive and it is possible to raise the accuracy of valve timing control.

DISCLOSURE OF THE INVENTION

To achieve the above-mentioned object, a variable valve timing device according to the invention has a first rotating member disposed concentrically with a camshaft and rotationally driven by rotary drive power from a crankshaft; a second rotating member that rotates integrally with the camshaft; a phase-varying member that transmits rotary power from the first rotating member to the second rotating member and varies the rotation phase of the second rotating member with respect to the first rotating member; and a motor disposed concentrically with the camshaft so as to control the rotation phase of this phase-varying member, and is constructed so that when the valve timing is not to be changed the speed of the motor is matched to the speed of the camshaft to match the turning speed of the phase-varying member to the speed of the camshaft and thereby hold the difference in rotation phase between the first rotating member and the second rotating member steady and thus hold the camshaft phase steady, and when the valve timing is to be changed the speed of the motor is changed with respect to the speed of the camshaft to change the turning speed of the phase-varying member with respect to the speed of the camshaft and thereby vary the difference in rotation phase between the first rotating member and the second rotating member and thus vary the camshaft phase.

In this construction, because it is not necessary for the whole motor to be rotated, the inertial weight of the rotating system of the variable valve timing device can be lightened and the motor can be directly connected to external electrical wiring by fixed connection means, and overall the durability of the variable valve timing device can be increased. Furthermore, the construction of the variable valve timing device is relatively simple, and the requirements of cost minimization can also be satisfied.

Also, in this invention, a required valve timing change rate is calculated on the basis of a deviation between a target valve timing and an actual valve timing, a required speed difference between the motor and the camshaft is calculated on the basis of this required valve timing change rate, and a motor control value is calculated so as to control the speed difference between the motor and the camshaft to the required speed difference. If this is done, the speed of the motor can be feed-forwardly controlled with good accuracy so as to make the speed difference between the motor and the camshaft match the required speed difference, the actual valve timing can be controlled to the target valve timing by motor drive, and valve timing control accuracy can be improved.

In this case, as the specific method for calculating the motor control value needed for controlling the speed difference between the motor and the camshaft to the required speed difference, for example a required motor speed may be calculated on the basis of the camshaft speed and the required speed difference and then a motor control value may be calculated so as to control the motor speed to the required motor speed. Or, a basic control value for controlling the motor speed to a basic motor speed the same as the camshaft speed may be calculated, a change control value for changing the motor speed by the required speed difference with respect to the basic motor speed then calculated, and a motor control value then calculated on the basis of the basic control value and the change control value. By using either of these methods it is possible to accurately calculate a motor control value needed to control the speed difference between the motor and the camshaft to the required speed difference.

Also, when the deviation between the target valve timing and the actual valve timing is below a predetermined value, a motor control value may be calculated so as to control the motor speed to the same speed as the camshaft speed. If this is done, when the actual valve timing is at or near the target valve timing, the actual valve timing can be held stably as it is.

Now, because the output torque of the motor is also consumed as loss torque resulting from frictional losses in the variable valve timing device and drive losses on the camshaft side, the motor control value (applied voltage value, duty value or the like) needed to control the speed difference between the motor and the camshaft to the required speed difference varies with the drive losses in the variable valve timing device and on the camshaft side. And because when the motor rotates a counter-electromotive force arises in the motor, the motor control value needed to control the speed difference between the motor and the camshaft to the required speed difference also changes with this counter-electromotive force of the motor.

In view of these circumstances, preferably, a motor control value is calculated using at least one among the frictional loss in the variable valve timing device or a parameter correlated with this, the drive loss on the camshaft side or a parameter correlated with this, and the counter-electromotive force of the motor or a parameter correlated with this. When this is done, because the motor control value can be calculated taking into account changes in drive losses in the variable valve timing device and on the camshaft side and changes in the counter-electromotive force of the motor, the motor control value needed to control the speed difference between the motor and the camshaft to a required speed difference can be calculated with good accuracy without influences of frictional losses and counter-electromotive force being suffered.

In the variable valve timing device of this invention, because the valve timing change rate changes in correspondence with the speed difference between the motor and the camshaft, the frictional loss in the variable valve timing device changes in correspondence with the speed difference between the motor and the camshaft. Therefore when a parameter of frictional loss in the variable valve timing device (the frictional loss or a parameter correlated with this) is used, although the parameter of frictional loss in the variable valve timing device can be calculated in correspondence with the actual speed difference between the motor and the camshaft, alternatively the parameter of frictional loss in the variable valve timing device may be calculated in correspondence with the required speed difference between the motor and the camshaft. In this way it is possible to calculate feed-forwardly a parameter of frictional loss in the variable valve timing device to be used in the calculation of the motor control value, and the responsiveness of motor rotation control can be increased. As a result, even under running conditions in which the engine speed (the camshaft speed) changes suddenly, such as during racing (engine racing), the motor rotation speed can be made to follow speed changes of the camshaft with good responsiveness, and the accuracy of valve timing control can be ensured.

And, because the counter-electromotive force of the motor changes in correspondence with the motor speed, when a motor counter-electromotive force parameter (the counter-electromotive force or a parameter correlated with this) is used, although the motor counter-electromotive force parameter may be calculated in correspondence with the actual speed of the motor, alternatively a motor counter-electromotive force parameter may be calculated in correspondence with a required motor speed calculated on the basis of the speed of the camshaft and the required speed difference. If this is done, the motor counter-electromotive force parameter used in the calculation of the motor control value can be calculated feed-forwardly, and the same effects as those mentioned above can be obtained.

Now, as shown in FIG. 12, when the motor speed changes, the counter-electromotive force of the motor changes and the effective voltage (the difference between the battery voltage and the counter-electromotive force) changes. And when the motor speed is increasing, as the motor speed increases the effective voltage decreases, and conversely, when the motor speed is increasing, as the motor speed increases the effective voltage increases.

So, preferably, the motor control value is corrected on the basis of the motor speed and/or whether it is increasing or decreasing. If this is done, even when the effective voltage changes with the motor speed and whether it is increasing or decreasing, the motor control value can be corrected in correspondence with that. Therefore, it is possible to calculate an appropriate motor control value without an influence of variation in the effective voltage being suffered. This correction of the motor control value may be applied in a system wherein a duty value (excitation rate) for duty-controlling the power supplied to the motor is calculated as the motor control value. In duty control, by the duty value for a supplied voltage being regulated, the pulse width of the supplied voltage is regulated and the power supplied to the motor is regulated. However, even at the same duty value, when the effective voltage (the difference between the battery voltage and the counter-electromotive force) changes, because the amplitude of the supplied voltage pulse changes, the power supplied to the motor changes correspondingly. Accordingly, if the duty value is corrected on the basis of the motor speed and whether it is increasing or decreasing, the duty value and the pulse width of the supplied voltage can be corrected for the effective voltage changing and the amplitude of the supplied voltage pulse changing with the motor speed and whether it is increasing or decreasing. As a result, it is possible to compensate for changes in supplied power caused by amplitude variation of the supplied voltage pulse by correcting the supplied voltage pulse width.

And, a limit value may be set on at least one among the valve timing change rate, the speed difference between the motor and the camshaft, and the motor speed. If this is done, because the valve timing change rate, the difference between the motor and the camshaft, and the motor speed can be limited with a limit value, it is possible to avoid failure and damage caused by actuation exceeding guarantee limits of the variable valve timing device.

Other features and effects of the invention will become clear from the description of embodiments thereof using drawings below.

BEST MODES FOR CARRYING OUT THE INVENTION

First Embodiment

Figure 1:
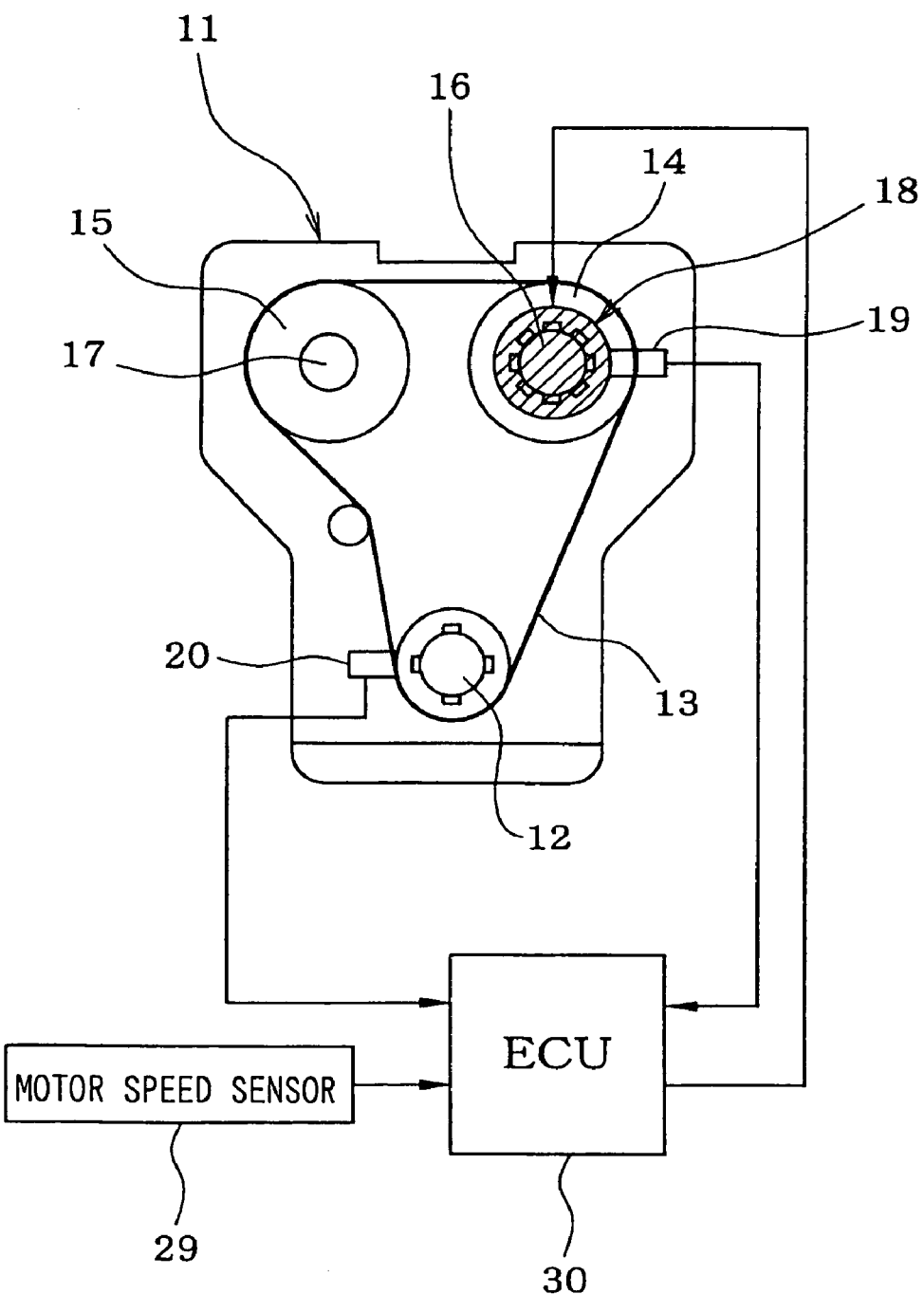
FIG. 1 is a schematic construction view of an overall control system in a first embodiment of the invention.

A first embodiment of the invention applied to a variable valve timing control device for intake valves will now be described, on the basis of FIG. 1 through FIG. 8. First, the outline construction of the overall system will be described, on the basis of FIG. 1. Power from the crankshaft 12 of an internal combustion engine 11 is transmitted by a timing chain 13 (or a timing belt) via sprockets 14, 15 to an intake-side camshaft 16 and an exhaust-side camshaft 17. A motor-driven variable valve timing device 18 is provided on the intake-side camshaft 16 side. This variable valve timing device 18 varies the rotation phase (camshaft phase) of the intake-side camshaft 16 with respect to the crankshaft 12 and thereby varies the valve timing of intake valves (not shown) driven to open and close by the intake-side camshaft 16.

A cam angle sensor 19 for outputting a cam angle signal at intervals of a predetermined cam angle is mounted beside the intake-side camshaft 16. And a crank angle sensor 20 for outputting a crank angle signal at intervals of a predetermined crank angle is mounted beside the crankshaft 12.

Next, on the basis of FIG. 2 the outline construction of the variable valve timing device 18 will be described. A phase varying mechanism 21 of the variable valve timing device 18 is made up of an outer gear 22 (a first rotating member), with internal teeth, disposed concentrically with the intake-side camshaft 16; an inner gear 23 (a second rotating member), with external teeth, disposed inside and concentrically with this outer gear 22; and a planetary gear 24 (a phase-varying member), disposed between and meshing with the outer gear 22 and the inner gear 23. The outer gear 22 is provided so as to rotate integrally with the sprocket 14, which rotates synchronously with the crankshaft 12. The inner gear 23 is provided so as to rotate integrally with the intake-side camshaft 16. The planetary gear 24, by turning so as to describe a circular orbit about the inner gear 23 while meshing with the outer gear 22 and the inner gear 23, performs the role of transmitting the rotary power of the outer gear 22 to the inner gear 23, and also, by the turning speed (revolving speed) of the planetary gear 24 with respect to the rotational speed of the inner gear 23 being changed, adjusts the rotation phase (camshaft phase) of the inner gear 23 with respect to the outer gear 22.

A motor 26 for varying the turning speed of the planetary gear 24 is provided on the engine 11. The output shaft 27 of this motor 26 is disposed coaxially with the intake-side camshaft 16, the outer gear 22 and the inner gear 23, and the output shaft 27 of this motor 26 and a support shaft 25 supporting the planetary gear 24 are connected by a connecting member 28 extending in the radial direction. As a result, along with rotation of the motor 26 the planetary gear 24 can turn (revolve) along its circular orbit around the inner gear 23 while rotating (autorotating) about the support shaft 25. A motor speed sensor 29 (see FIG. 1) for detecting the rotational speed RM (the speed of the output shaft 27) of the motor 26 is mounted on the motor 26.

In this variable valve timing device 18, when the speed RM of the motor 26 is matched to the speed RC of the intake-side camshaft 16, so that the revolving speed of the planetary gear 24 is matched to the rotational speed of the inner gear 23 (and the rotational speed of the outer gear 22), the rotation phase difference between the outer gear 22 and the inner gear 23 is held steady and the valve timing (camshaft phase) is thereby held steady.

When the valve timing of the intake valves is to be advanced, the speed RM of the motor 26 is made faster than the speed RC of the intake-side camshaft 16, so that the revolving speed of the planetary gear 24 is made faster than the rotational speed of the inner gear 23. By this means, the rotation phase of the inner gear 23 with respect to the outer gear 22 is advanced, and the valve timing (camshaft phase) is advanced.

When on the other hand the valve timing of the intake valves is to be retarded, the speed RM of the motor 26 is made slower than the speed RC of the intake-side camshaft 16, so that the revolving speed of the planetary gear 24 is made slower than the rotational speed of the inner gear 23. By this means, the rotation phase of the inner gear 23 with respect to the outer gear 22 is retarded and the valve timing is thereby retarded.

The outputs of the various sensors mentioned above are inputted to an engine control unit (hereinafter, "ECU") 30. This ECU 30 is constructed around a microcomputer, and by executing various engine control programs stored in ROM thereof (a storage medium) controls the fuel injection quantities of fuel injection valves (not shown) and the ignition timing of spark plugs (not shown) in accordance with the running state of the engine.

The ECU 30 also executes a variable valve timing control program shown in FIG. 3 and a motor control value calculation program shown in FIG. 4, which will be further discussed later. By executing these programs, first, it calculates a required valve timing change rate Vreq so as to minimize a deviation D between a target valve timing VTtg and an actual valve timing VT of the intake valves. On the basis of this required valve timing change rate Vreq it calculates a required speed difference DMCreq between the motor 26 and the camshaft 16. And it calculates a motor control value (for example a motor applied voltage value) so as to control a speed difference DMC between the motor 26 and the camshaft 16 to the required speed difference DMCreq. By this means it controls the rotation of the motor 26 so as to control the speed difference DMC between the motor 26 and the camshaft 16 to the required speed difference DMCreq, and thereby controls the actual valve timing VT of the intake valves to the target valve timing VTtg. The detailed processing content of these programs will be explained below.

Figure 3:
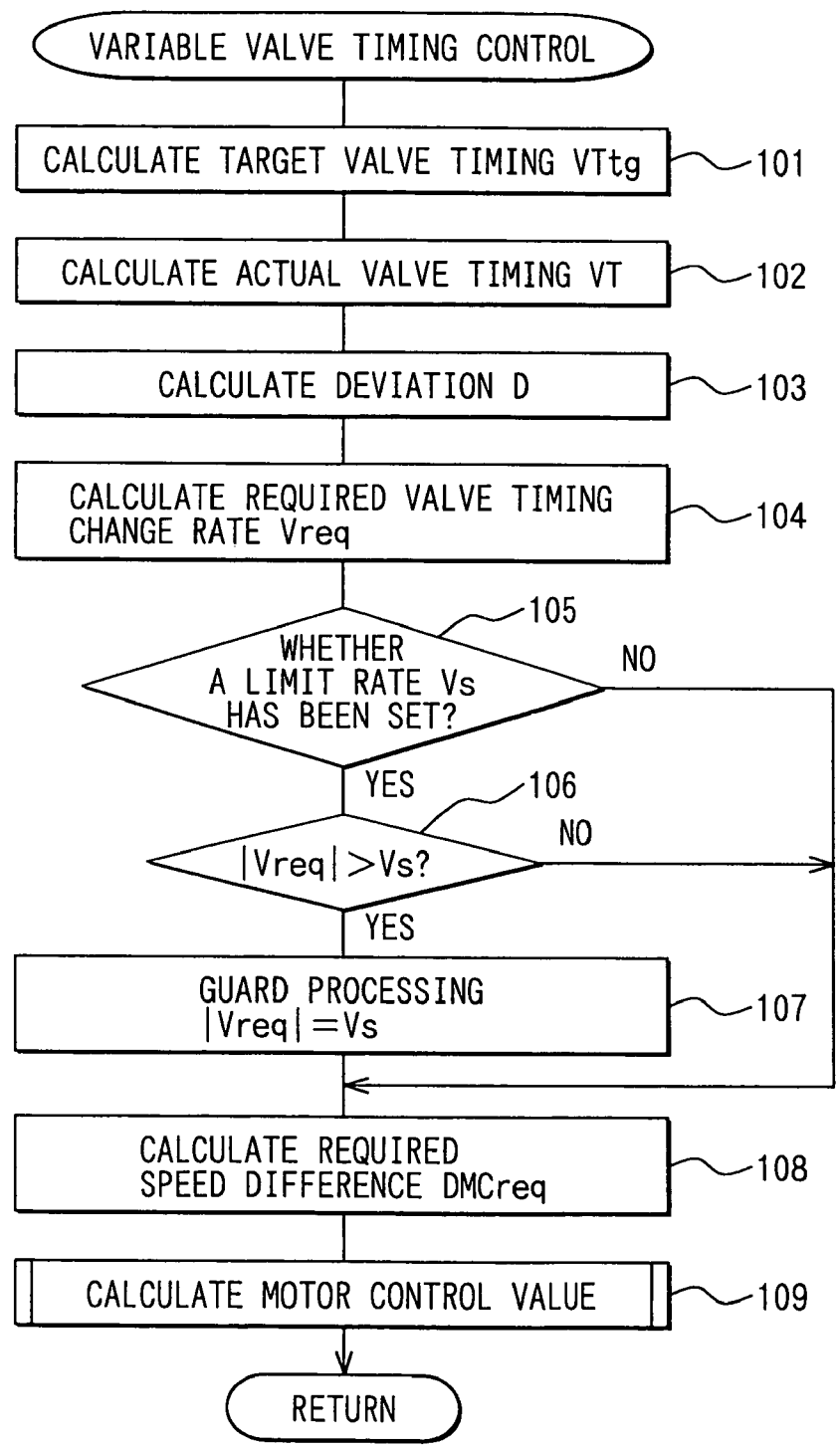
FIG. 3 is a flow chart showing the flow of processing of a variable valve timing control program of the first embodiment.

The variable valve timing control program shown in FIG. 3 is executed for example at intervals of a predetermined period after an ignition switch (not shown) is turned on. When this program starts, first, in a step 101, a target valve timing VTtg is calculated on the basis of the running state of the engine. Processing then proceeds to step 102, and calculates an actual valve timing VT on the basis of the crank angle signal outputted from the crank angle sensor 20 and the cam angle signal outputted from the cam angle sensor 19. The calculation of the actual valve timing VT can also be carried out as set forth in a sixth embodiment which will be described later.

After the calculation of the actual valve timing VT, processing proceeds to step 103 and calculates the deviation D between the target valve timing VTtg and the actual valve timing VT. Then, in step 104, in correspondence with this deviation D, a required valve timing change rate Vreq is calculated so as to minimize the deviation D, using a map or the like. This required valve timing change rate Vreq for example assumes a plus value when the direction of the change in valve timing is to the advanced angle side and a minus value when it is to the retarded angle side. The processing of this step 104 performs the role of required valve timing change rate calculating means referred to in the Scope of Patent Claim.

After that, processing proceeds to step 105 and determines whether or not a limit rate Vs has been set with respect to the valve timing change rate. This limit rate Vs is a relatively slow valve timing change rate, at which tooth grinding and damage of the gear mechanism (the gears 22 to 24) do not occur for example even if a moving part for limiting the range of movement of the phase varying mechanism 21 strikes a stopper part. A limit rate Vs is set at times such as: [1] when the actual valve timing VT is within a rate-limited region set near a most retarded angle position or near a most advanced angle position; [2] when valve timing reference position learning has not been completed; and [3] when it has been determined that there is an abnormality of reference position learning (erroneous reference position learning). Setting of the limit rate Vs with respect to the valve timing change rate will be explained in detail in a seventh embodiment to be described later.

When in this step 105 it is determined that a limit rate Vs has been set, processing proceeds to step 106 and determines whether or not the absolute value of the required valve timing change rate Vreq is larger than the limit rate Vs. If as the result of this it is determined that the absolute value of the required valve timing change rate Vreq is larger than the limit rate Vs, processing proceeds to step 107 and guard-processes the absolute value of the required valve timing change rate Vreq with the limit rate Vs. After that, processing proceeds to step 108.

When on the other hand in step 105 it is determined that a limit rate Vs has not been set, or when in step 106 it has been determined that the absolute value of the required valve timing change rate Vreq is not larger than the limit rate Vs, processing proceeds to step 108 without changing the required valve timing change rate Vreq calculated in correspondence with the deviation D between the target valve timing VTtg and the actual valve timing VT.

In this step 108, using the required valve timing change rate Vreq [° CA/s], a required speed difference DMCreq [rpm] between the motor 26 and the camshaft 16 is calculated by means of Exp. (1).

$$DMCreq = Vreq \times 60 \times G / 720°CA \quad (1)$$

Here, G is the reduction ratio of the phase varying mechanism 21, and is the ratio of the relative amount of turn of the motor 26 with respect to the camshaft 16 to the valve timing variation (camshaft phase variation). The processing of this step 108 performs the role of required speed difference calculating means referred to in the Scope of Patent Claim.

Figure 4:
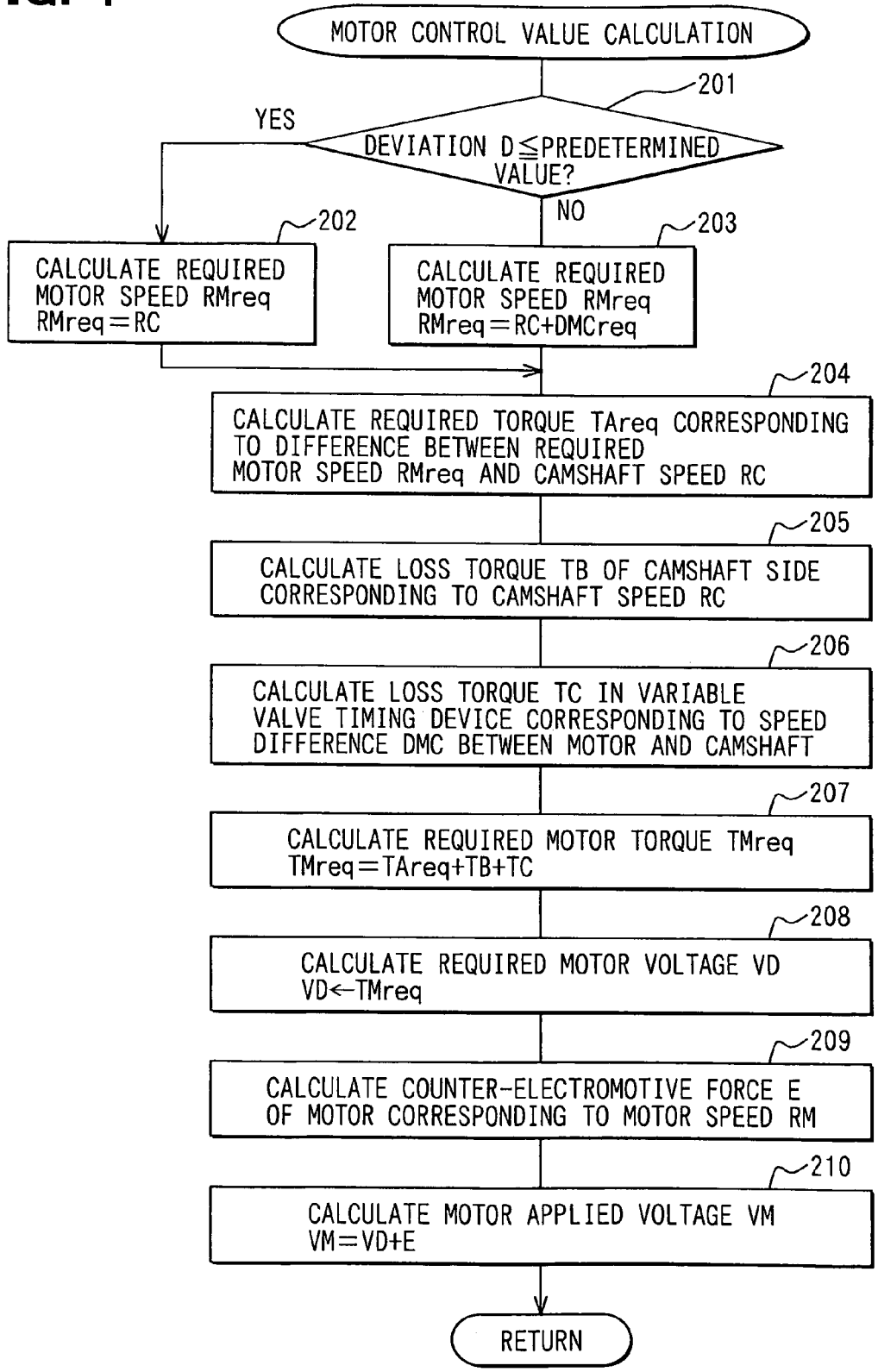
FIG. 4 is a flow chart showing the flow of processing of a motor control value calculation program of the first embodiment.

After the calculation of the required speed difference DMCreq, processing proceeds to step 109 and executes the motor control value calculating program shown in FIG. 4 and calculates a motor control value. This motor control value calculation program shown in FIG. 4 performs the role of motor control value calculating means referred to in the Scope of Patent Claim.

When this program is started, first, in a step 201, it is determined whether or not the deviation D between the target valve timing VTtg and the actual valve timing VT is below a predetermined value. If the deviation D is below the predetermined value, processing proceeds to step 202 and sets a required motor speed RMreq to the camshaft speed RC, as shown by Exp. (2).

$$RMreq = RC \quad (2)$$

If on the other hand in step 201 it is determined that the deviation D is larger than the predetermined value, processing proceeds to step 203 and sets the required motor speed RMreq to a value obtained by adding the required speed difference DMCreq to the camshaft speed RC, as shown by Exp. (3).

$$RMreq = RC + DMCreq \quad (3)$$

Figure 5:
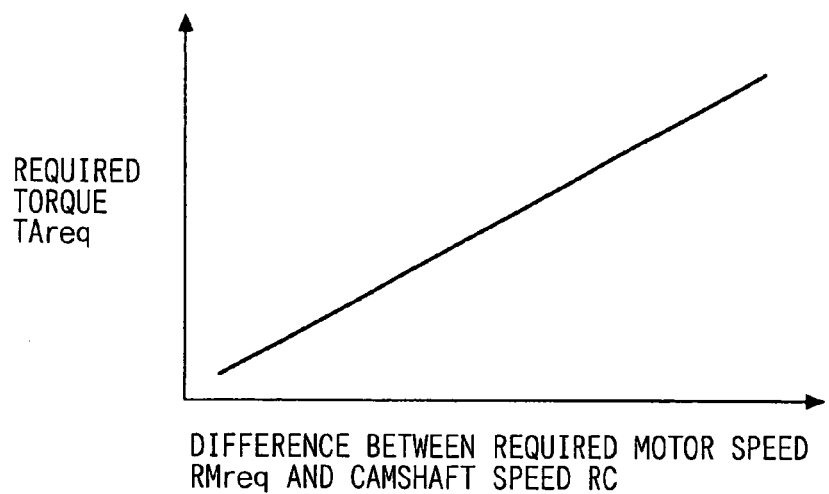
FIG. 5 is a graph showing conceptually a map of a required torque TAreq.

After the required motor speed RMreq is set in step 202 or step 203 as described above, processing proceeds to step 204. In step 204, using the map of required torque TAreq shown in FIG. 5 or a numerical formula, a required torque TAreq corresponding to the difference between the required motor speed RMreq and the camshaft speed RC is calculated. This required torque TAreq is the net torque needed to revolve the planetary gear 24 at the required motor speed RMreq (a torque not including any loss torque inside the variable valve timing device 18 or loss torque on the camshaft 16 side). The map of required torque TAreq shown in FIG. 5 is set on the basis of the change characteristic of the required torque TAreq with respect to the difference between the required motor speed RMreq and the camshaft speed RC.

Figure 6:
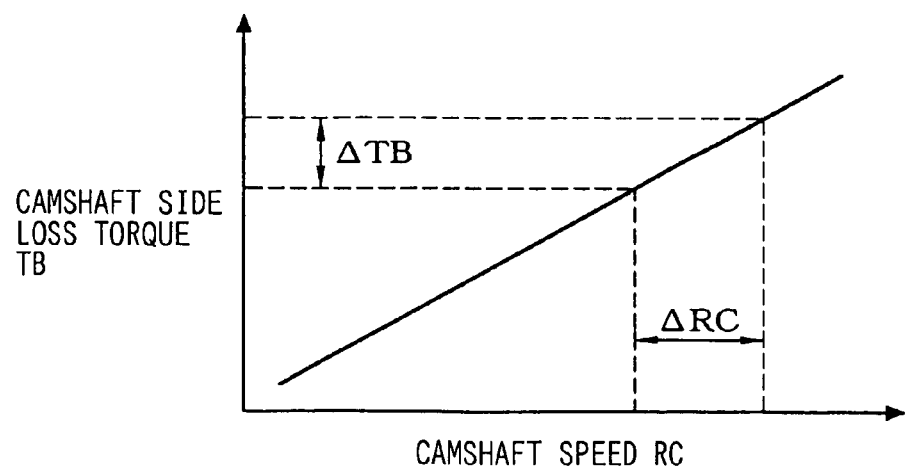
FIG. 6 is a graph showing conceptually a map of a camshaft side loss torque TB.

After that, processing proceeds to step 205 and calculates a loss torque TB of the camshaft 16 side corresponding to the camshaft speed RC, using the map of camshaft 16 side loss torque TB shown in FIG. 6 or a numerical formula. This camshaft 16 side loss torque TB is the torque consumed as a result of drive losses on the camshaft 16 side. The map of camshaft 16 side loss torque TB shown in FIG. 6 is set on the basis of the change characteristic of the camshaft 16 side loss torque TB with respect to the camshaft speed RC.

Figure 7:
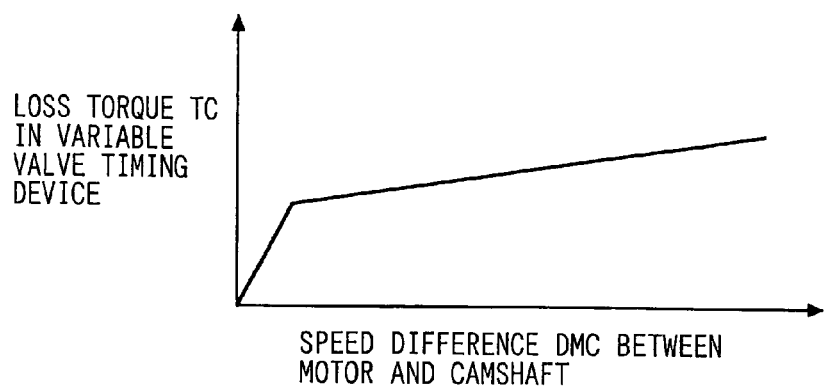
FIG. 7 is a graph showing conceptually a map of a loss torque TC in the variable valve timing device.

In the following step 206, using the map of loss torque TC in the variable valve timing device 18 shown in FIG. 7 or a numerical formula, a loss torque TC in the variable valve timing device 18 corresponding to the speed difference DMC between the motor 26 and the camshaft 16 (the difference between the motor speed RM and the camshaft speed RC) is calculated. This loss torque TC in the variable valve timing device 18 is a torque consumed as a result of frictional losses in the variable valve timing device 18. The map of loss torque TC in the variable valve timing device 18 shown in FIG. 7 is set on the basis of the change characteristic of the loss torque TC in the variable valve timing device 18 with respect to the speed difference DMC between the motor 26 and the camshaft 16.

After that, processing proceeds to step 207, and adds the loss torque TB on the camshaft 16 side and the loss torque TC in the variable valve timing device 18 to the required torque TAreq to obtain a required motor torque TMreq needed to control the motor speed RM to the required motor speed RMreq, as shown in Exp. (4).

$$TMreq = TAreq + TB + TC \quad (4)$$

Figure 8:
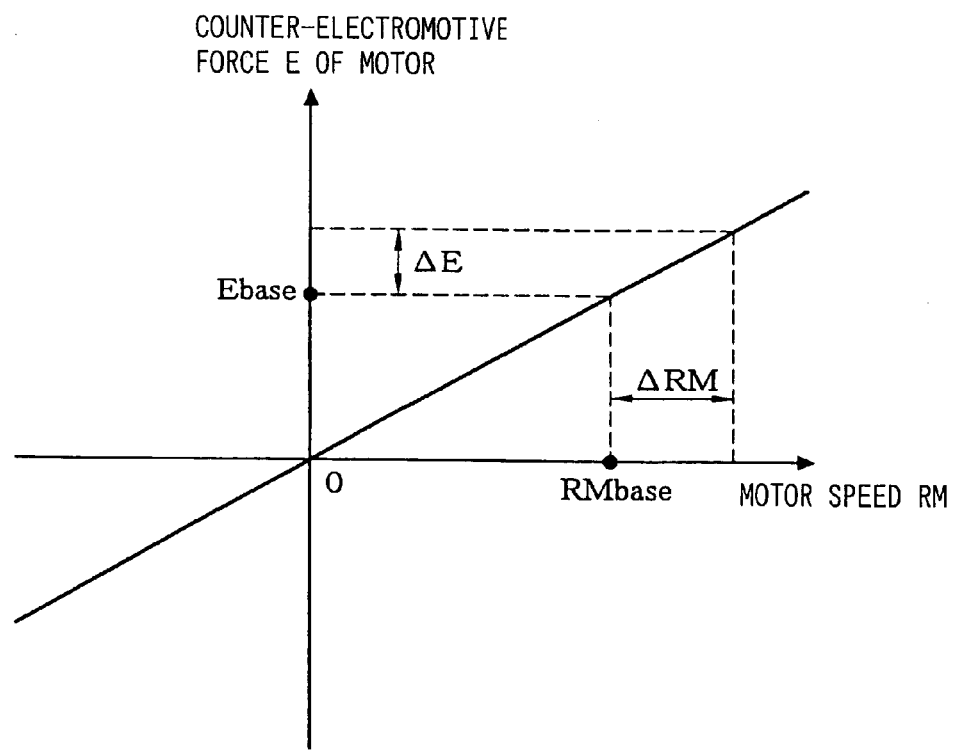
FIG. 8 is a graph showing conceptually a map of a counter-electromotive force E of a motor.

After that, processing proceeds to step 208, and by means of a map or the like converts the required motor torque TMreq into a required motor voltage VD. After that, processing proceeds to step 209, and calculates a counter-electromotive force E of the motor 26 corresponding to the motor speed RM, making use of the map of counter-electromotive force E of the motor 26 shown in FIG. 8 or a numerical formula. The map of the counter-electromotive force E of the motor 26 shown in FIG. 8 is set on the basis of the change characteristic of the counter-electromotive force E of the motor 26 with respect to the motor speed RM.

Then, in the following step 210, the counter-electromotive force E is added to the required motor voltage VD to obtain a motor applied voltage VM needed to control the motor speed RM to the required motor speed RMreq, as shown in Exp. (5).

$$VM = VD + E \quad (5)$$

By the above processing, when the deviation D between the target valve timing VTtg and the actual valve timing VT is larger than a predetermined value, the required motor speed RMreq is set to the value obtained by adding the required speed difference DMCreq to the camshaft speed RC, and a motor applied voltage VM needed to control the motor speed RM to the required motor speed RMreq (=camshaft speed RC+required speed difference DMCreq) is calculated. By this means, the speed of the motor 26 is feed-forward-controlled so that the speed difference DMC between the motor 26 and the camshaft 16 is made to match the required speed difference DMCreq, and the actual valve timing VT can be made to change in the direction of the target valve timing VTtg with good responsiveness.

And when the deviation D between the target valve timing VTtg and the actual valve timing VT falls to below the predetermined value, the required motor speed RMreq is set to the camshaft speed RC and the motor applied voltage VM needed to control the motor speed RM to the required motor speed RMreq (=camshaft speed RC) is calculated. By this means, the rotation of the motor 26 is controlled so as to bring the speed difference DMC between the motor 26 and the camshaft 16 to 0, and the actual valve timing VT is stably held at or near the target valve timing VTtg. In this way it is possible to control an actual valve timing to a target valve timing by motor drive with good accuracy, and valve timing control accuracy can be improved.

And, the variable valve timing device 18 of this first embodiment is constructed with the outer gear 22, disposed concentrically with the camshaft 16 and rotationally driven by the rotary driving power of the crankshaft 12; the inner gear 23, which rotates integrally with the camshaft 16; the planetary gear 24, which transmits the rotary power of the outer gear 22 to the inner gear 23 and changes the relative rotation phase between the gears 22, 23; and the motor 26, which turns this planetary gear 24 along a circular orbit concentric with the camshaft 16. Consequently, it is not necessary for the motor 26 as a whole to be rotated, and the inertial weight of the rotating system of the variable valve timing device 18 can be lightened and the motor 26 can be connected directly to outside electrical wiring by fixed connection means, and overall it is possible to raise the durability of the variable valve timing device 18. Furthermore, the construction of the variable valve timing device 18 is relatively simple, and the requirements of cost minimization can be satisfied.

Now, the output of the motor 26 is also consumed as frictional losses in the variable valve timing device 18 and drive losses on the camshaft 16 side. Because of this, the motor control value (for example, motor applied voltage) needed to control the speed difference DMC between the motor 26 and the camshaft 16 to the required speed difference DMCreq varies with the drive losses in the variable valve timing device 18 and on the camshaft 16 side. And, because a counter-electromotive force arises in the motor 26 when the motor 26 rotates, the motor control value needed to control the speed difference DMC between the motor 26 and the camshaft 16 to the required speed difference DMCreq also varies with the counter-electromotive force of the motor 26.

In view of these circumstances, in this first embodiment, the motor control value is calculated using a loss torque TC consumed by frictional losses in the variable valve timing device 18, a loss torque TB consumed by drive losses in on the camshaft 16 side, and the counter-electromotive force E of the motor 26. And because changes in drive losses in the variable valve timing device 18 and on the camshaft 16 side and changes in the counter-electromotive force of the motor 26 are taken into account in the calculation of the motor control value like this, the motor control value needed to control the speed difference DMC between the motor 26 and the camshaft 16 to the required speed difference DMCreq can be calculated with good accuracy without influences of frictional losses and counter-electromotive force and so on being suffered.

And, in the first embodiment, because the required valve timing change rate Vreq is limited with a limit rate Vs, failure and damage of the variable valve timing device 18 caused by sudden operation can be prevented.

Second Embodiment

Figure 9:
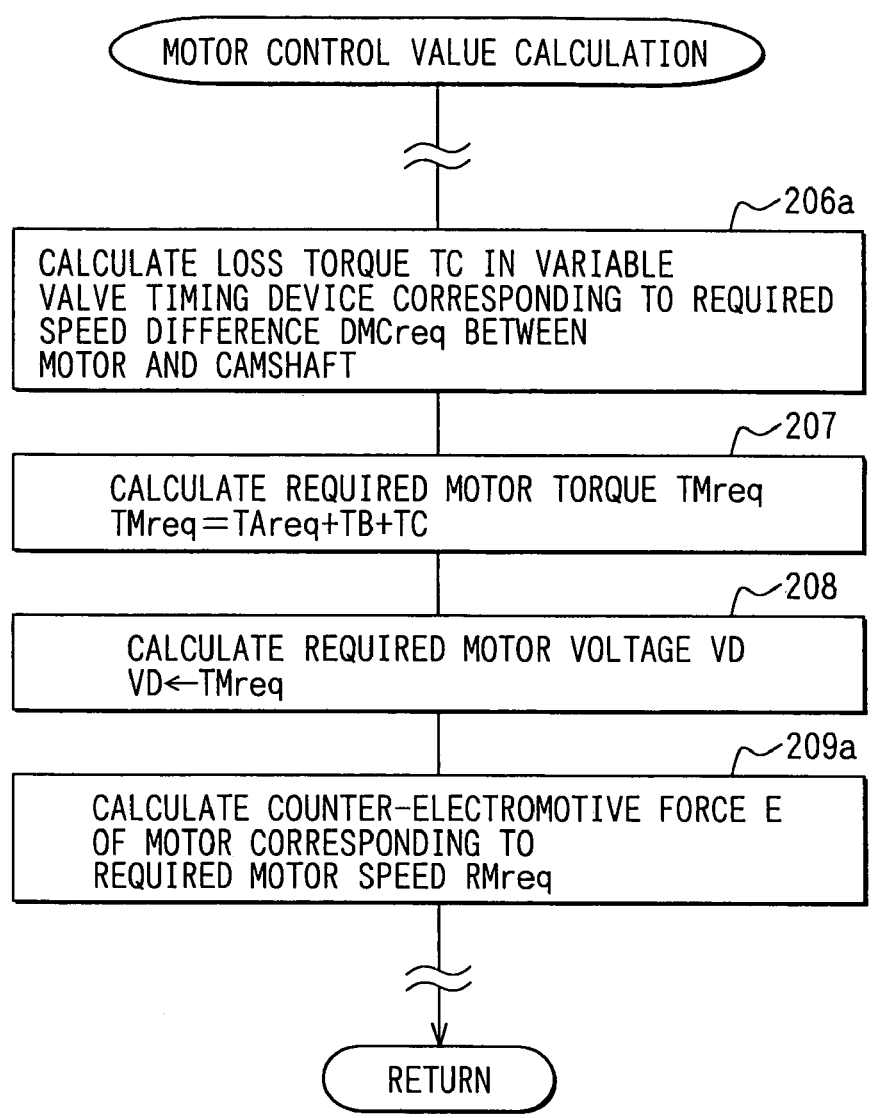
FIG. 9 is a flow chart showing part of the flow of processing of a motor control value calculation program of a second embodiment.

The motor control value calculating program shown in FIG. 9 executed in a second embodiment of the invention is one obtained by changing the processing of step 206 and step 209 of FIG. 4 described in the first embodiment to processing of a step 206a and a step 209a respectively, and the processing of the other steps is the same as in FIG. 4.

In the first embodiment described above, in step 206 of FIG. 4, the loss torque TC in the variable valve timing device 18 was calculated in correspondence with the speed difference DMC between the motor 26 and the camshaft 16 (the difference between the motor speed RM and the camshaft speed RC), and in step 209 the counter-electromotive force E of the motor 26 was calculated in correspondence with the motor speed RM. However, in this second embodiment, in step 206a of FIG. 9, the loss torque TC in the variable valve timing device 18 is calculated in correspondence with the required speed difference DMCreq between the motor 26 and the camshaft 16 (the difference between the required motor speed RMreq and the camshaft speed RC), and in step 209a the counter-electromotive force E of the motor 26 is calculated in correspondence with the required motor speed RMreq.

In this case, because the loss torque TC in the variable valve timing device 18 and the counter-electromotive force E of the motor 26 used for the calculation of the motor control value can be calculated feed-forwardly, the responsiveness of the motor rotation control can be improved. By this means, even under operating conditions in which the engine speed (the camshaft speed RC) changes suddenly, such as on racing, it is possible to make the motor speed RM follow changes in the camshaft speed RC with good responsiveness, and valve timing control accuracy can be ensured.

Third Embodiment

Next, a third embodiment of the invention will be described, using FIG. 10 through FIG. 12. As shown in FIG. 12, when the motor speed RM changes, the counter-electromotive force of the motor 26 changes and the effective voltage (the difference between the battery voltage and the counter-electromotive force) changes. And the effective voltage differs when the motor speed RM is increasing from when it is decreasing.

Figure 10:
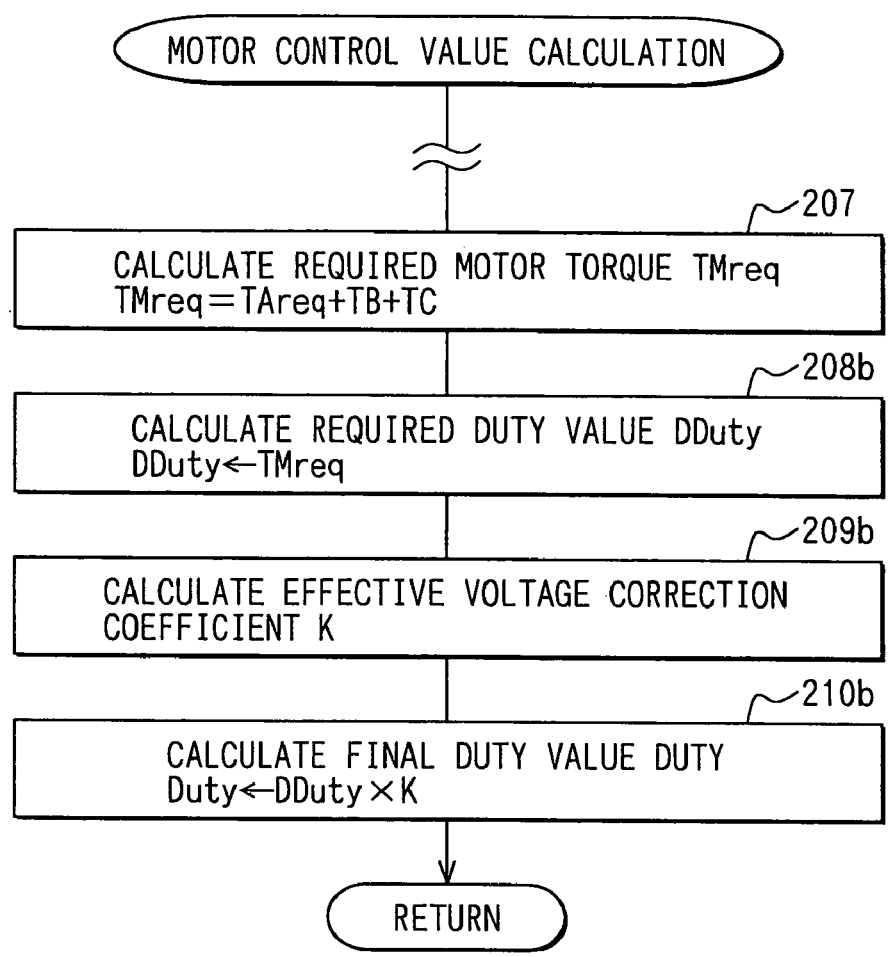
FIG. 10 is a flow chart showing part of the flow of processing of a motor control value calculation program of a third embodiment.

In this third embodiment, by the motor control value calculating program shown in FIG. 10 being executed, a duty value for performing duty control of the power supply to the motor 26 is calculated as the motor control value. In this duty control, by the duty value (excitation rate) of a supply voltage being regulated, the pulse width of the supply voltage is regulated and the supply of power to the motor 26 is regulated. In this case, even when the duty value is the same, when the effective voltage (the difference between the battery voltage and the counter-electromotive force) changes, the amplitude of the supply voltage pulse changes, and consequently the power supply to the motor 26 changes correspondingly.

So, in this third embodiment, by the motor control value calculating program shown in FIG. 10 being executed, the duty value is corrected on the basis of the motor speed RM and whether it is increasing or decreasing. By this means it is possible to correct the duty value to allow for the effective voltage changing with the motor speed RM and whether it is increasing or decreasing.

The motor control value calculating program shown in FIG. 10 is one obtained by changing the processing of steps 208 to 210 of FIG. 4 explained in the foregoing first embodiment to the processing of steps 208b to 210b, and the processing of the other steps is the same as in FIG. 4.

In this program, in step 207, a required motor torque TMreq needed to control the motor speed RM to the required motor speed RMreq is calculated. After that, processing proceeds to step 208b and converts the required motor torque TMreq into a required duty value DDuty using a map or the like.

Figure 11A:
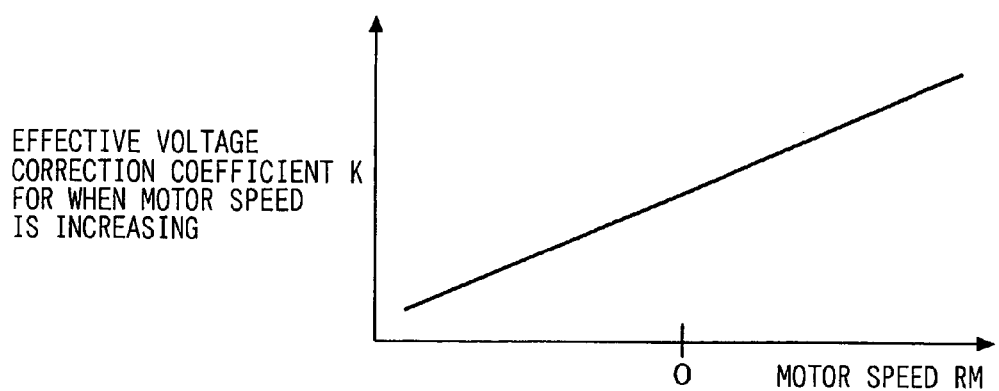
FIG. 11A is a graph showing conceptually a map of an effective voltage correction coefficient K for when a motor speed is increasing.
Figure 12:
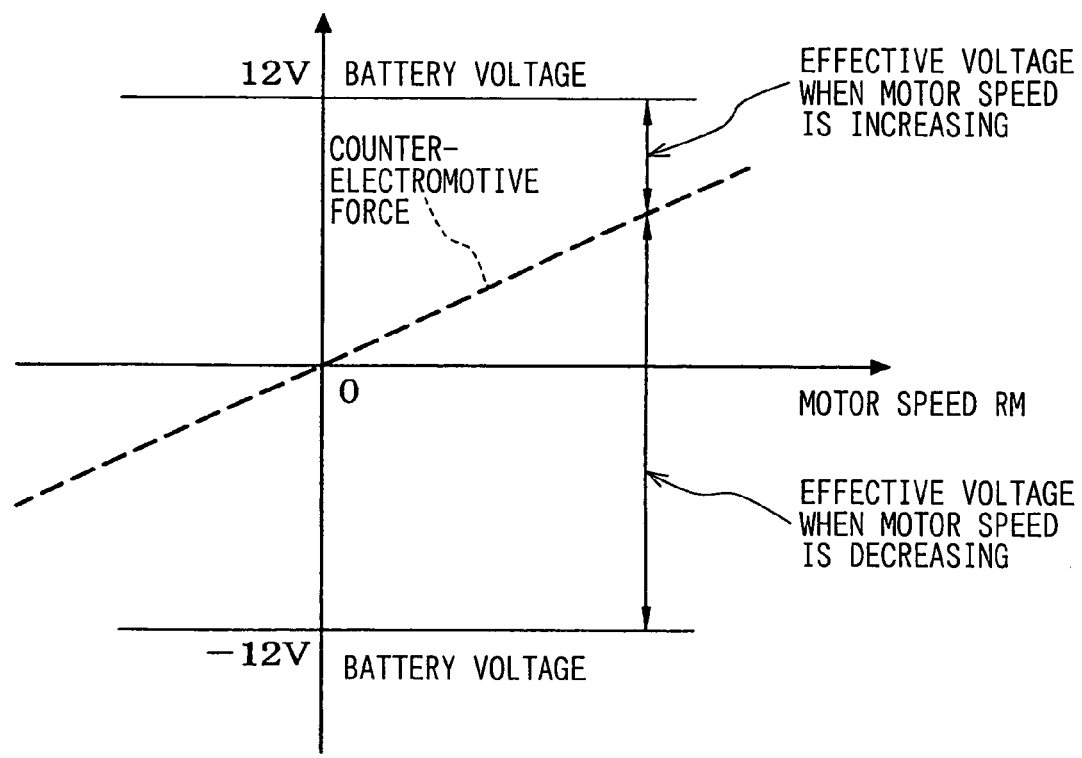
FIG. 12 is a graph showing a relationship between an effective voltage and a motor speed and whether it is increasing or decreasing.

After that, processing proceeds to step 209b, and using the maps of effective voltage correction coefficient K for when the motor speed is increasing and when the motor speed is decreasing shown in FIG. 11(a) and (b) or a numerical formula, an effective voltage correction coefficient K corresponding to the motor speed RM and whether it is increasing or decreasing is calculated.

Figure 11B:
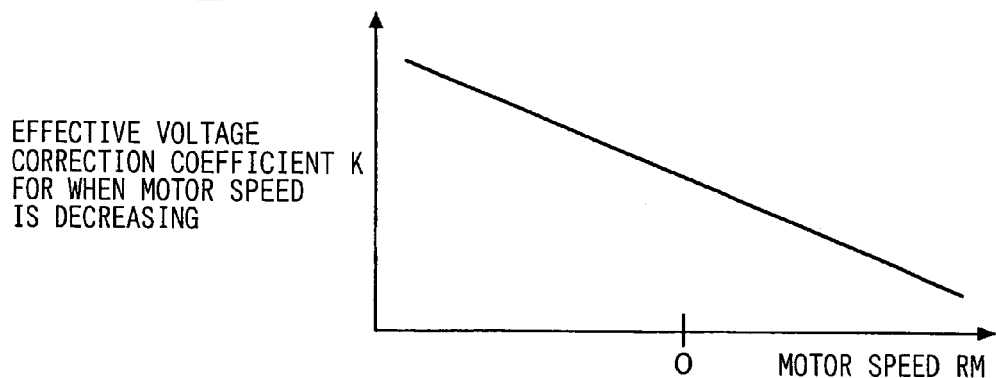
FIG. 11B is a graph showing conceptually a map of an effective voltage correction coefficient K for when a motor speed is decreasing.

As shown in FIG. 12, when the motor speed is increasing, the faster is the motor speed RM the smaller is the effective voltage (the difference between the battery voltage and the counter-electromotive force), and when the motor speed is decreasing, the slower is the motor speed RM the smaller is the effective voltage. Because of this, the map of effective voltage correction coefficient K for when the motor speed is increasing shown in FIG. 11(a) is set so that the effective voltage correction coefficient K is made larger and a final duty value Duty is made larger the faster is the motor speed RM. And the map of effective voltage correction coefficient K for when the motor speed is decreasing shown in FIG. 11(b) is set so that the effective voltage correction coefficient K is made larger and the final duty value Duty is made larger the slower is the motor speed RM.

After the calculation of the effective voltage correction coefficient K, processing proceeds to step 210b and corrects the required duty value DDuty with the effective voltage correction coefficient K as shown by Exp. (6) to obtain a final duty value Duty needed to control the motor speed RM to the required motor speed RMreq.

$$Duty = DDuty \times K \tag{6}$$

In the third embodiment described above, the duty value was corrected in correspondence with the motor speed RM and whether it is increasing or decreasing. Consequently, the duty value can be corrected and the pulse width of the supply voltage corrected to allow for the effective voltage changing and the amplitude of the supply voltage pulse changing with the motor speed RM and whether it is increasing or decreasing. As a result, changes in the supplied power caused by amplitude changes of the supply voltage pulse can be compensated for by correction of the pulse width of the supply voltage. By this means it is possible to perform stable motor rotation control that does not suffer any influence of the effective voltage changing with the motor speed RM and whether it is increasing or decreasing.

Fourth Embodiment

In the foregoing first embodiment, the required speed difference DMCreq was added to the camshaft speed RC to obtain the required motor speed RMreq, and a motor control value was calculated so as to control the motor speed RM to the required motor speed RMreq. With respect to this, in a fourth embodiment of the invention shown in FIG. 13, basic control values for controlling the motor speed RM to a basic motor speed RMbase the same as the camshaft speedRC are calculated, change control values for changing the motor speed RM by the required speed difference DMCreq with respect to the basic motor speed RMbase are calculated, and a motor control value is calculated on the basis of the basic control values and the change control values.

In the motor control value calculating program shown in FIG. 13 executed in this fourth embodiment, first, in a step 301, it is determined whether or not the deviation D between the target valve timing VTtg and the actual valve timing VT is equal to or below a predetermined value. If this deviation D is equal to or below the predetermined value, processing proceeds to step 302 and resets a required torque TAreq, a loss torque differential ΔTB, a loss torque TC and a counter-electromotive force differential ΔE, which will be further discussed later, all to "0" before proceeding to step 307.

When on the other hand in step 301 it is determined that the deviation D between the target valve timing VTtg and the actual valve timing VT is larger than the predetermined value, processing proceeds to step 303. In step 303, using the map of required torque TAreq shown in FIG. 5 or a numerical formula, a required torque TAreq corresponding to the required speed difference DMCreq (the difference between the required motor speed RMreq and the camshaft speed RC) is calculated. After that, processing proceeds to step 304, and if it is a time of transition (a time when the camshaft speed RC is changing), a loss torque differential ΔTB of the camshaft 16 side corresponding to a camshaft speed differential ΔRC is calculated using the map of the loss torque TB of the camshaft 16 side shown in FIG. 6 or a numerical formula.

After that, processing proceeds to step 305 and, using the map of loss torque TC in the variable valve timing device 18 shown in FIG. 7 or a numerical formula, calculates a loss torque TC in the variable valve timing device 18 corresponding to the speed difference DMC between the motor 26 and the camshaft 16 (the difference DMC between the motor speed RM and the camshaft speed RC). Next, in step 306, using the map of counter-electromotive force E of the motor 26 shown in FIG. 8 or a numerical formula, a counter-electromotive force differential ΔE of the motor 26 corresponding to a motor speed differential ΔRM (motor speed RM −basic motor speed RMbase) is calculated.

The required torque TAreq, the loss torque differential ΔTB of the camshaft 16 side, the loss torque TC in the variable valve timing device 18, and the counter-electromotive force differential ΔE of the motor 26 constitute change control values for changing the motor speed RM by the required speed difference DMCreq with respect to the basic motor speed RMbase (=camshaft speed RC)

After that, processing proceeds to step 307 and, using the map of loss torque TB of the camshaft 16 side shown in FIG. 6 or a numerical formula, calculates a loss torque TB of the camshaft 16 side corresponding to the camshaft speed RC. In step 308, using the map of counter-electromotive force E of the motor 26 shown in FIG. 8 or a numerical formula, a basic counter-electromotive force Ebase of the motor 26 corresponding to the basic motor speed RMbase (=camshaft speed RC) is calculated. The loss torque TB of the camshaft 16 side and the basic counter-electromotive force Ebase of the motor 26 constitute basic control values for controlling the motor speed RM to the basic motor speed RMbase (=camshaft speed RC).

In the following step 309, as shown in Exp. (7), the loss torque TB and loss torque differential ΔTB of the camshaft 16 side and the loss torque TC in the variable valve timing device 18 are added to the required torque TAreq to obtain a required motor torque TMreq needed to control the motor speed RM to the required motor speed RMreq.

$$TMreq = TAreq + TB + \Delta TB + TC \tag{7}$$

After that, processing proceeds to step 310 and, using a map or the like to convert the required motor torque TMreq into a required motor voltage VD. In step 311, as shown in Exp. (8), the basic counter electromotive force Ebase and the counter-electromotive force differential ΔE are added to the required motor voltage VD to obtain a motor applied voltage VM needed to control the motor speed RM to the required motor speed RMreq.

$$VM = VD + Ebase + \Delta E \tag{8}$$

By the above processing, when the deviation D between the target valve timing VTtg and the actual valve timing VT has become larger than a predetermined value, a motor applied voltage VM is calculated on the basis of basic control values (TAreq, ΔTB, TC, ΔE) for controlling the motor speed RM to the basic motor speed RMbase (=camshaft speed RC) and change control values (TB, Ebase) for changing the motor speed RM by the required speed difference DMCreq with respect to the basic motor speed RMbase. By this means it is possible to feed-forwardly control the speed of the motor 26 so as to make the speed difference DMC between the motor 26 and the camshaft 16 match the required speed difference DMCreq and thereby change the actual valve timing VT in the direction of the target valve timing VTtg with good responsiveness.

And when the deviation D between the target valve timing VTtg and the actual valve timing VT has fallen below the predetermined value, a motor applied voltage VM needed for controlling the motor speed RM to the basic motor speed RMbase (=camshaft speed RC) is calculated. By this means, the speed of the motor 26 is controlled so as to bring the speed difference DMC between the motor 26 and the camshaft 16 to 0 and the actual valve timing VT is stably held at or near the target valve timing VTtg. In this way also it is possible to control an actual valve timing to a target valve timing by motor drive with good accuracy, and valve timing control accuracy can be improved.

Fifth Embodiment

Figure 13:
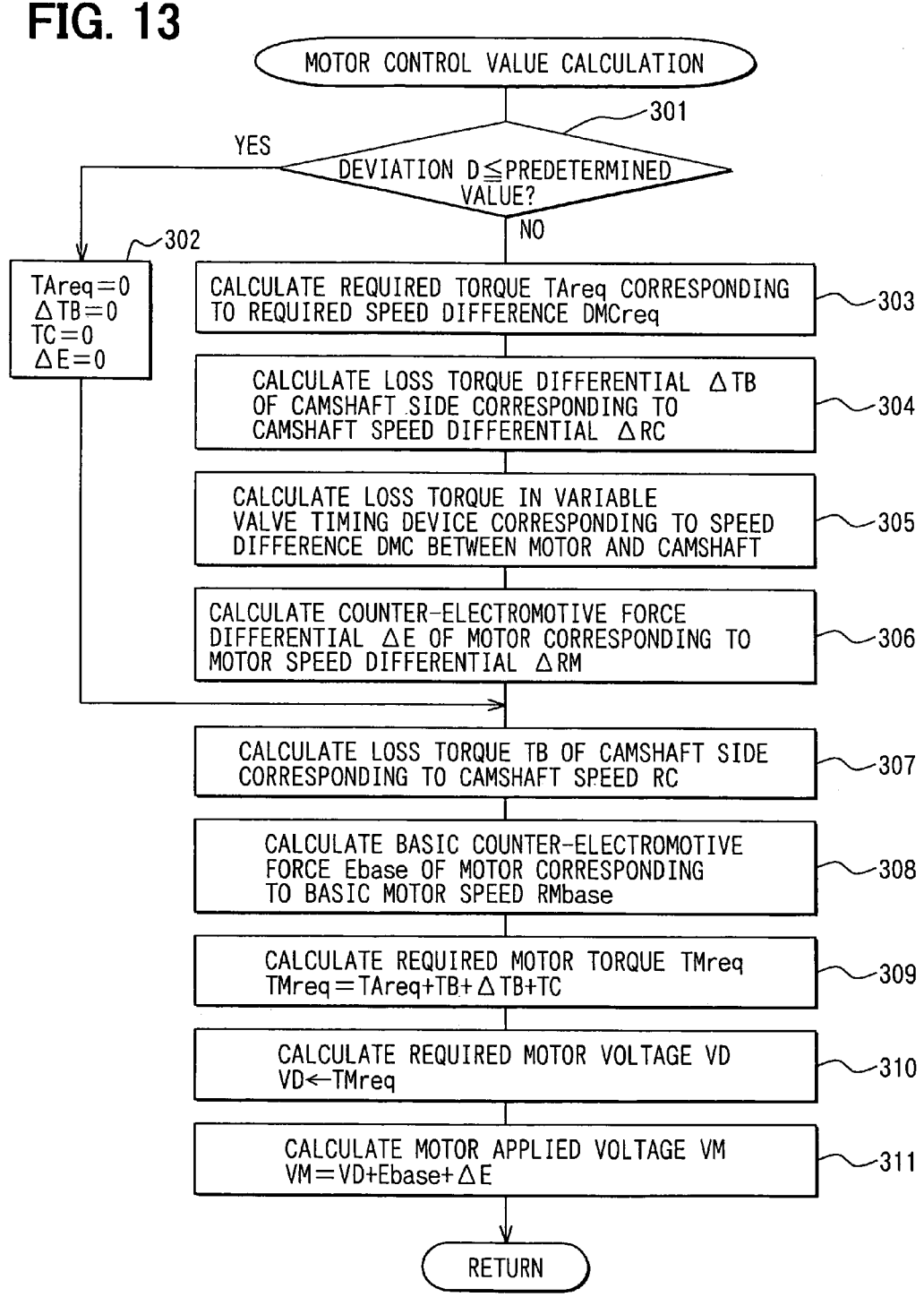
FIG. 13 is a flow chart showing the flow of processing of a motor control value calculation program of a fourth embodiment.
Figure 14:
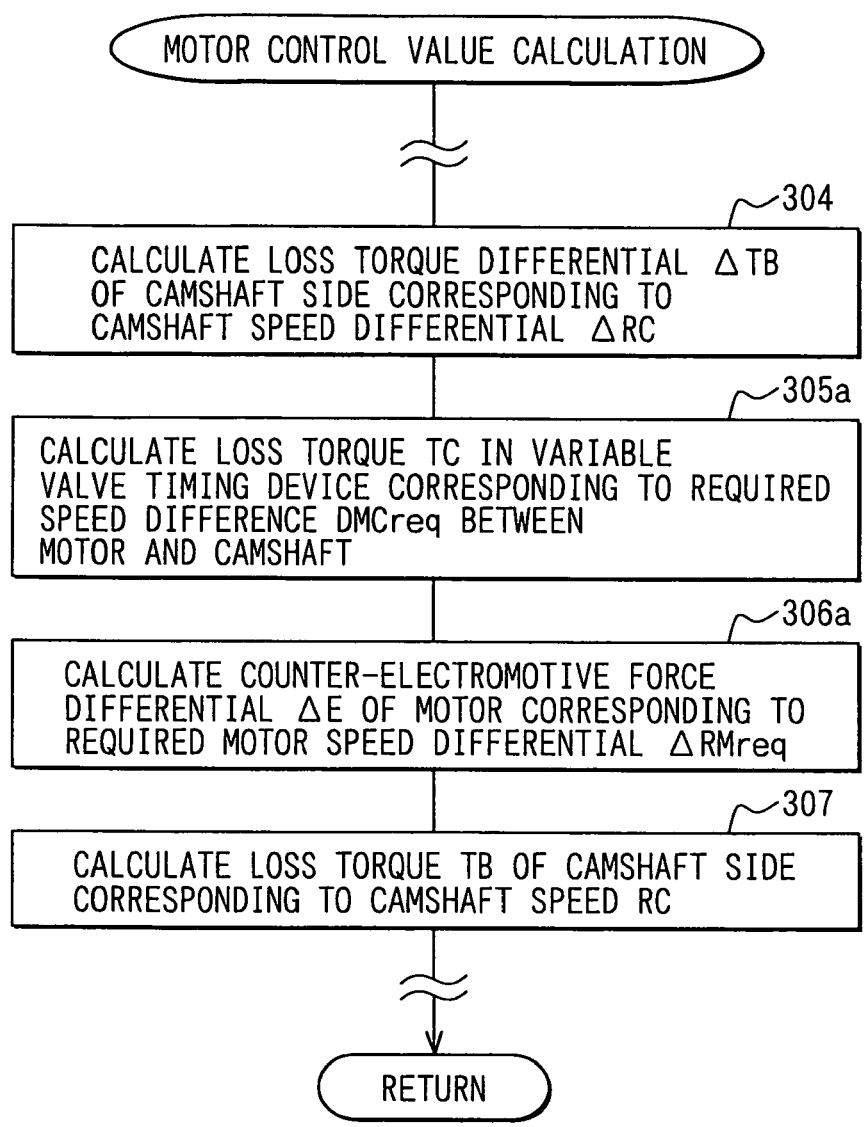
FIG. 14 is a flow chart showing a part of the flow of processing of a motor control value calculation program of a fifth embodiment.

A motor control value calculating program shown in FIG. 14 executed in a fifth embodiment of the invention is one obtained by changing the processing of step 305 and step 306 of FIG. 13 explained in the foregoing fourth embodiment to processing of a step 305a and a step 306a respectively, and the processing of the other steps is the same as in FIG. 13.

In the foregoing fourth embodiment, in step 305 of FIG. 13 a loss torque TC in the variable valve timing device 18 was calculated in correspondence with the speed difference DMC between the motor 26 and the camshaft 16 (the difference, between the motor speed RM and the camshaft speed RC), and in the following step 306 a counter-electromotive force differential ΔE of the motor 26 was calculated in correspondence with a motor speed differential ΔRM (motor speed RM−basic motor speed RMbase). With respect to this, in this fifth embodiment, in step 305a of FIG. 14, a loss torque TC in the variable valve timing device 18 is calculated in correspondence with the required speed difference DMCreq between the motor 26 and the camshaft 16 (the difference between the required motor speed RMreq and the camshaft speed RC). And in the following step 306a a counter-electromotive force differential ΔE of the motor 26 is calculated in correspondence with a required motor speed differential ΔRMreq (required motor speed RMreq−basic motor speed RMbase).

In this way it is possible to calculate the loss torque TC in the variable valve timing device 18 and the counter-electromotive force differential ΔE of the motor 26 used in the calculation of the motor control value feed-forwardly. Accordingly, the responsiveness of the motor rotation control can be improved and the same effects as those of the foregoing second embodiment can be obtained.

Now, although in the fourth and fifth embodiments a motor applied voltage was calculated as the motor control value, alternatively a duty value may be calculated as the motor control value. And in this case, as in the third embodiment, the duty value may be corrected on the basis of the motor speed and whether it is increasing or decreasing.

And although in the first to fifth embodiments a limit value (limit rate Vs) was placed on the valve timing change rate, alternatively a limit value may be placed on the speed difference between the motor 26 and the camshaft 16 or on the motor speed. Furthermore, these limit values may be made to change in correspondence with the running state of the engine (for example the engine speed, cooling water temperature, intake airflow, load etc.).

Also, on the basis of the state of convergence with respect to the target values of the valve timing and the valve timing change rate, the motor control value or the control parameters used in the calculation of the motor control value (the required torque TAreq, the loss torque TB of the camshaft 16 side, the loss torque TC in the variable valve timing device 18, the counter-electromotive force E of the motor 26, the effective voltage correction coefficient K, etc.) may be amended, and the results of those amendments may be learnt. And on the basis of such amendment results the maps and/or numerical formulas used in the calculation of the control parameters may be amended.

Sixth Embodiment

Next, a sixth embodiment of the invention will be described.

Many of the variable valve timing devices currently in use vary the valve timing of intake valves or exhaust valves driven to open and close by a camshaft by varying the rotation phase of the camshaft with respect to the crankshaft (hereinafter, "the camshaft phase") of the internal combustion engine. At this time, as the method for detecting the actual valve timing (the actual camshaft phase), for example, as disclosed in JP-A-2001-355462, there is one that calculates the actual valve timing on the basis of a crank angle signal outputted from a crank angle sensor at intervals of a predetermined crank angle and a cam angle signal outputted from a cam angle sensor at intervals of a predetermined cam angle.

However, with this valve timing calculation method of related art, over the interval from one cam angle signal being outputted to the next cam angle signal being outputted (i.e. the interval over which a cam angle signal is not outputted), it is not possible to calculate the actual valve timing.

Consequently, there has been the shortcoming that although in reality the actual valve timing changes continuously, it is only possible to update the calculated value of the actual valve timing in steps, and the precision of variable valve timing control has been low by a corresponding amount.

In view of this, it is an object of this sixth embodiment to provide a variable valve timing device of an internal combustion engine with which the actual valve timing can be calculated even during the intervals when the cam angle signal is not being outputted, so that variable valve timing control precision can be increased.

First, a variable valve timing control device of an internal combustion engine according to this sixth embodiment will be described in outline. A variable valve timing device according to this sixth embodiment has a first rotating member disposed concentrically with a camshaft and rotationally driven by rotary drive power from a crankshaft; a second rotating member that rotates integrally with the camshaft; a phase-varying member that transmits rotary power from the first rotating member to the second rotating member and varies the rotation phase of the second rotating member with respect to the first rotating member; and a motor disposed concentrically with the camshaft so as to control the rotation phase of this phase-varying member, and is constructed so that when the valve timing is not to be changed the speed of the motor is matched to the speed of the camshaft to match the turning speed of the phase-varying member to the speed of the camshaft and thereby hold the difference in rotation phase between the first rotating member and the second rotating member steady and thus hold the camshaft phase steady, and when the valve timing is to be changed the speed of the motor is changed with respect to the speed of the camshaft to change the turning speed of the phase-varying member with respect to the speed of the camshaft and thereby vary the difference in rotation phase between the first rotating member and the second rotating member and thus vary the camshaft phase. In this construction, because it is not necessary for the motor as a whole to be rotated, the inertial weight of the rotating system of the variable valve timing device can be lightened and the motor can be connected directly to outside electrical wiring by fixed connection means, and overall it is possible to raise the durability of the variable valve timing device. Furthermore, the construction of the variable valve timing device is relatively simple, and the requirements of cost minimization can also be satisfied.

And, in a variable valve timing device which varies valve timing by varying the speed of a motor with respect to the speed of the camshaft, as in the sixth embodiment, the valve timing variation (camshaft phase variation) varies in correspondence with the difference between the speed of the motor and the speed of the camshaft. Because of this, it is possible to calculate the valve timing variation on the basis of the difference between the speed of the motor and the speed of the camshaft.

Focusing on this point, in the sixth embodiment, every time the cam angle signal is outputted from the cam angle sensor, the actual valve timing at the time of outputting of the cam angle signal is calculated on the basis of that cam angle signal and a crank angle signal outputted from the crank angle sensor; with a predetermined computation period a valve timing variation is calculated on the basis of the difference between the motor speed and the camshaft speed; and with the predetermined computation period a final actual valve timing is calculated on the basis of the actual valve timing at the time of outputting of the cam angle signal and the valve timing variation.

Specifically, a final actual valve timing can be obtained by calculating a valve timing variation per computation period and accumulating this calculated value, resetting the accumulated value of the valve timing variation every time the cam angle signal is outputted, and adding to the calculated value of the actual valve timing at the most recent outputting of the cam angle signal the accumulated value of the valve timing variation subsequent to that.

Because a valve timing variation, calculated on the basis of the difference between the motor speed and the camshaft speed can be calculated even in the intervals when the cam angle signal is not being outputted, if in the intervals when the cam angle signal is not being outputted the valve timing variation since the most recent outputting of the cam angle signal is calculated, a final actual valve timing can be obtained precisely by adding to the actual valve timing at the time of the most recent outputting of the cam angle signal the valve timing variation subsequent to that. By this means it is possible to calculate the actual valve timing continuously with good precision even in the intervals when the cam angle signal is not being outputted, and the precision of variable valve timing control can be increased.

Now, although it is conceivable to calculate the camshaft speed to be used in calculating the valve timing variation on the basis of the output period of the cam angle signal, because generally the number of outputtings of the cam angle signal per revolution of the camshaft is small, it is difficult to detect fluctuations of the camshaft speed, which fluctuates with the combustion stroke of each cylinder, from the output period of the cam angle signal. On the other hand, because the number of crank angle signals outputted from the crank angle sensor is much greater than the number of cam angle signals, if the crank angle signal is used it is possible to detect fluctuation of the crankshaft speed, which fluctuates with the combustion stroke of each cylinder.

Accordingly, in view of the relationship that the camshaft rotates once per two revolutions of the crankshaft, the value of ½ of the crankshaft speed detected on the basis of the output period of the crank angle signal of the crank angle sensor can be used as the camshaft speed data. If this is done, the valve timing variation can be calculated using a more accurate camshaft speed than when the camshaft speed is detected from a smaller number of cam angle signals, and the actual valve timing calculation precision can be improved.

When the internal combustion engine is stopped, because the camshaft speed is 0, a final actual valve timing can be obtained by adding to the calculated value of the actual valve timing of when the engine stops an accumulated value of subsequent valve timing variation, or a final actual valve timing can be obtained with an accumulated value of valve timing variation from a reference position. By this means, even when the internal combustion engine is stopped, the actual valve timing can be calculated with good precision, and even when the internal combustion engine is stopped the actual valve timing can be controlled to a target value. And, even when the actual valve timing of when the engine stops is unclear, an actual valve timing can be calculated with an accumulated value of valve timing variation from a mechanical reference position (for example a most retarded angle position) or a reference position detected by other means.

And, considering that when the cam angle sensor fails the cam angle signal ceases to be outputted, when the cam angle sensor has failed a final actual valve timing can be obtained by adding to the calculated value of the actual valve timing at the time of the last outputting of the cam angle signal before the failure an accumulated value of valve timing variation subsequent to that, or a final actual valve timing can be obtained with an accumulated value of valve timing variation from a reference position. By this means, even when the cam angle sensor fails, the actual valve timing can be calculated with good precision, and even when the cam angle sensor has failed the actual valve timing can be controlled to a target value. And, when the actual valve timing of before the cam angle sensor failed is unclear, an actual valve timing can be calculated with an accumulated value of valve timing variation from a mechanical reference position (for example a most retarded angle position) or a reference position detected by other means.

A variable valve timing control device according to the sixth embodiment will now be described in detail on the basis of the figures. The system construction of a variable valve timing control device according to the sixth embodiment is the same as that shown in FIG. 1 and FIG. 2 and so will not be described again here.

The ECU 30 in the sixth embodiment, by executing a variable valve timing control program (not shown), feedback-controls the variable valve timing device 18 so as to make the actual valve timing of intake valves match a target valve timing.

Figure 15:
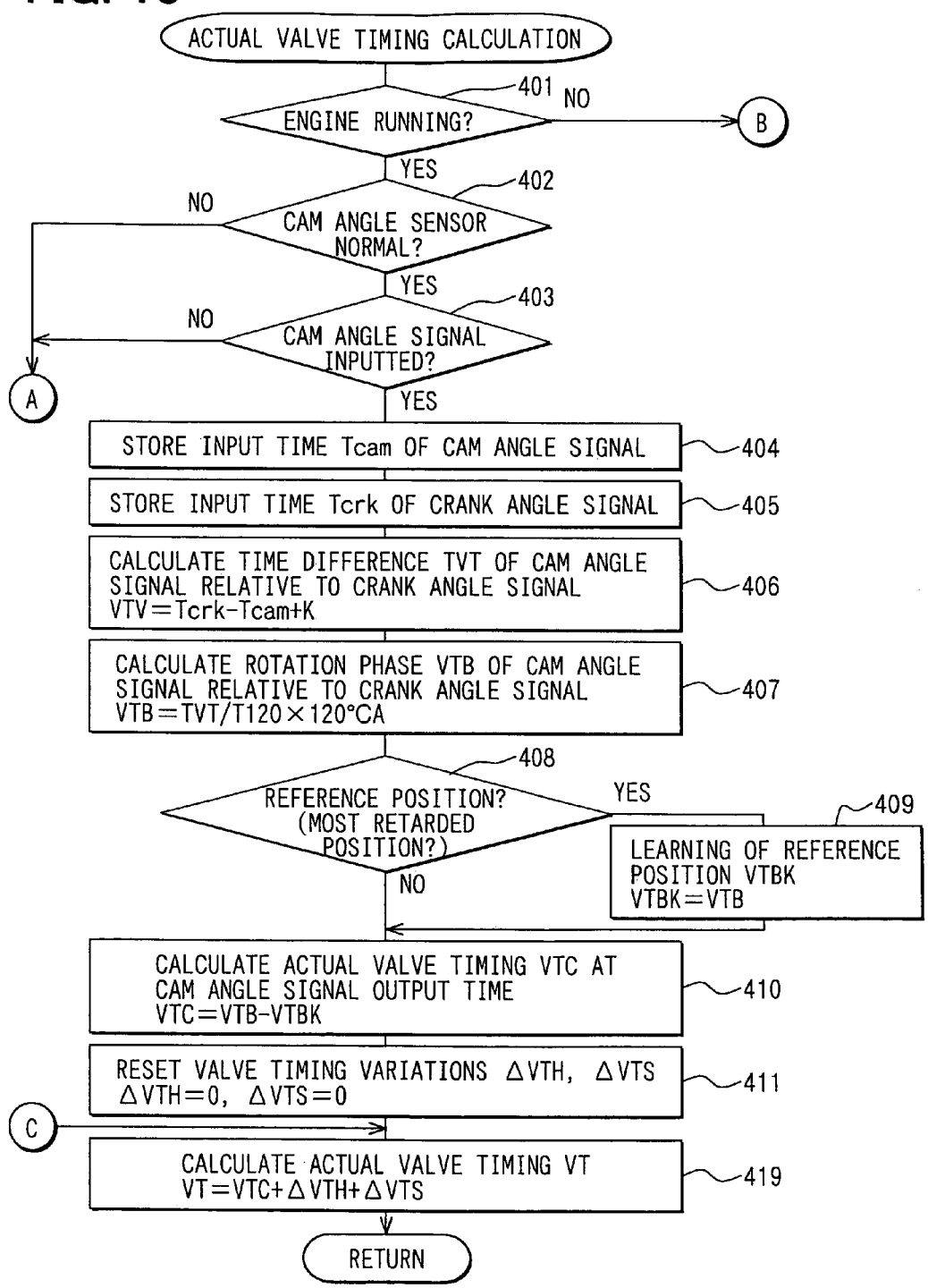
FIG. 15 to FIG. 17 are flow charts showing the flow of processing of an actual valve timing calculation program in a sixth embodiment.
Figure 16:
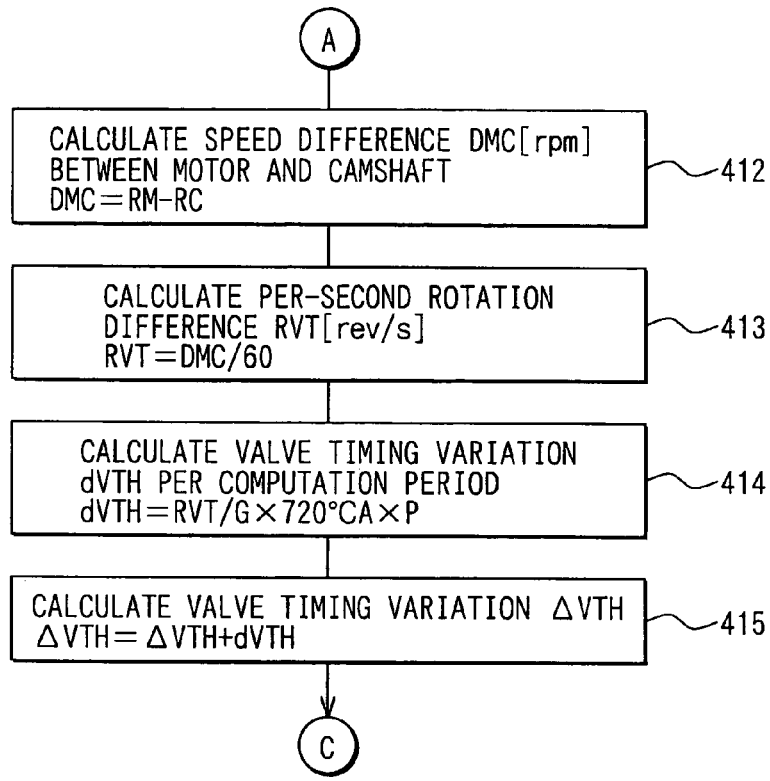
Figure 17:
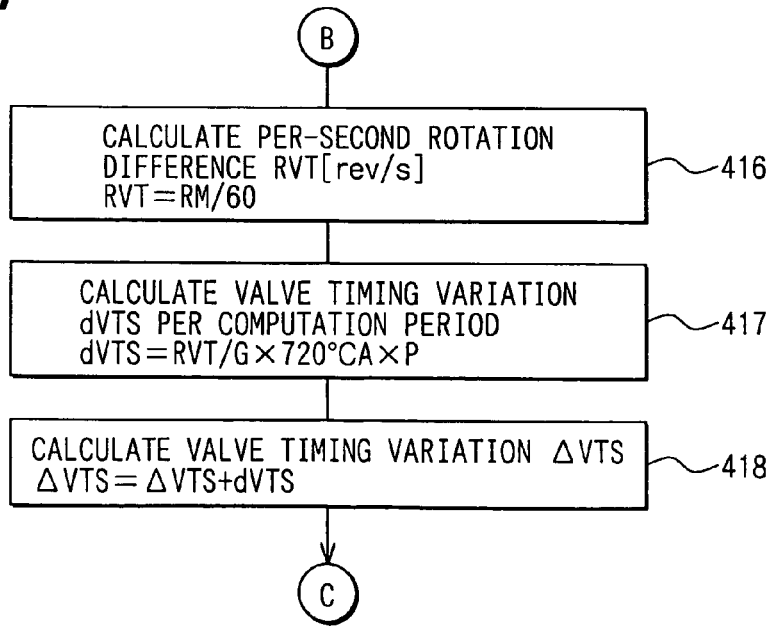

At this time, by executing an actual valve timing calculation program shown in FIG. 15 through FIG. 17, the ECU 30 calculates an actual valve timing VTC at a time of sensor output on the basis of a crank angle signal outputted from the crank angle sensor 20 and a cam angle signal outputted from the cam angle sensor 19. Also, it calculates a valve timing variation $\Delta$VT on the basis of the difference between the motor speed RM of the motor 26 and the camshaft speed RC of the intake-side camshaft 16. And it obtains a final actual valve timing VT by adding to the actual valve timing VTC at the time of outputting of the cam angle signal the subsequent valve timing variation $\Delta$VT.

The actual valve timing calculation program shown in FIG. 15 through FIG. 17 is executed at intervals of a predetermined period after an ignition switch (not shown) is turned on. When this program is started, first, in a step 401, it is determined whether or not the engine is running, for example on the basis of whether or not an engine speed calculated from the output period of the crank angle signal outputted from the crank angle sensor 20 is 0.

If it is determined that the engine is running, processing proceeds to step 402 and determines whether or not the cam angle sensor 19 is normal, on the basis of a failure diagnosis result of a cam angle sensor failure diagnosis program (not shown). When the result of this is that the cam angle sensor 19 is determined to be normal (not failed), processing proceeds to step 403 and determines whether or not a cam angle signal outputted from the cam angle sensor 19 has been inputted.

When it is determined that a cam angle signal has been inputted, processing proceeds to step 404 and stores the input time Tcam of the cam angle signal in memory (not shown) of the ECU 30. After that, processing proceeds to step 405 and stores in memory the input time Tcrk of the crank angle signal outputted from the crank angle sensor 20 immediately thereafter.

After this, processing proceeds to step 406 and calculates a time difference TVT of the cam angle signal relative to the crank angle signal using Exp. (9).

$$TVT = Tcrk - Tcam + K \quad (9)$$

Here, K is a correction amount for correcting a difference of response lag between the cam angle sensor 19 and the crank angle sensor 20.

Then, in the following step 407, using the time difference TVT of the cam angle signal relative to the crank angle signal, a rotation phase VTB of the cam angle signal relative to the crank angle signal is calculated in accordance with Exp. (10).

$$VTB = TVT/T120 \times 120° \ CA \quad (10)$$

Here, T120 is the time needed for the crankshaft 12 to rotate through 120° CA, and is calculated on the basis of the output signal of the crank angle sensor 20.

After this, processing proceeds to step 408 and determines whether or not the valve timing has been controlled to a reference position (for example a most retarded angel position). If the valve timing is at the reference position, processing proceeds to step 409 and learns the present rotation phase of the cam angle signal relative to the crank angle signal (the camshaft phase) VTB as a reference position (reference camshaft phase) VTBK of the rotation phase of the intake-side camshaft 16 with respect to crankshaft 12, as shown in Exp. (11), before proceeding to step 410.

$$VTBK = VTB \quad (11)$$

On the other hand, when in step 408 it is determined that the valve timing is not at the reference position, processing proceeds to step 410 without carrying out the reference position learning processing of step 409. In step 410, as shown in Exp. (12), using the present rotation phase VTB of the cam angle signal relative to the crank angle signal and the reference position VTBK, the rotation phase VTC of the cam angle signal based on the reference position VTBK is calculated. This becomes an actual valve timing VTC at the time of outputting of the cam angle signal.

$$VTC = VTB - VTBK \quad (12)$$

The processing of these steps 403 to 410 performs the role of cam angle signal output time valve timing calculating means referred to in the Scope of Patent Claim, and calculates an actual valve timing VTC at the time of outputting of a cam angle signal on the basis of the cam angle signal and the crank angle signal every time the cam angle signal is inputted (outputted).

After this, processing proceeds to step 411, and resets valve timing variations $\Delta$VTH, $\Delta$VTS, which will be further discussed later, both to "0" every time the actual valve timing VTC at the time of outputting of a cam angle signal is calculated. After that, processing proceeds to step 419 and calculates a final actual valve timing VT using Exp. (13).

$$VT = VTC + \Delta VTH + \Delta VTS \quad (13)$$

Thus, at the time of inputting (time of outputting) of a cam angle signal, because $\Delta$VTH=0 and $\Delta$VTS=0 as a result of the reset processing of step 411, VT=VTC.

When on the other hand in step 403 it is determined that a cam angle signal has not been inputted, processing proceeds to step 412 of FIG. 16 and calculates the speed difference DMC [rpm] between the motor speed RM [rpm] of the motor 26 and the camshaft speed RC [rpm] of the intake-side camshaft 16, as shown by Exp. (14).

$$DMC = RM - RC \quad (14)$$

In this case, as the camshaft speed RC of the intake-side camshaft 16, as shown in Exp. (15), the value of ½× the speed of the crankshaft 12 (the engine speed) calculated on the basis of the output period of the crank angle signal outputted from the crank angle sensor 20 is used.

$$\text{camshaft speed } RC = \text{crankshaft speed} \times \tfrac{1}{2} \quad (15)$$

After this, processing proceeds to step 413 and converts the speed difference DMC [rpm] into a per-second rotation difference [rev/s] in accordance with Exp. (16).

$$RVT = DMC/60 \quad (16)$$

Then, in the following step 414, a valve timing variation $\Delta VTH$ per computation period P[s] of the valve timing variation $\Delta VTH$ (the execution period of this program) is calculated using Exp. (17).

$$dVTH = RVT/G \times 720^\circ \, CA \times P \quad (17)$$

Here, G is the reduction ratio of the phase varying mechanism 21, and is the ratio of the relative amount of turn of the motor 26 with respect to the intake-side camshaft 16 to the valve timing variation (camshaft phase variation).

After this, processing proceeds to step 415 and calculates the valve timing variation $\Delta VTH$ by accumulating the valve timing variation dVTH per computation period P as shown by Exp. (18).

$$\Delta VTH = \Delta VTH + dVTH \quad (18)$$

The processing of these steps 412 to 415 performs the role of valve timing variation calculating means referred to in the Scope of Patent Claim, and obtains a valve timing variation $\Delta VTH$ subsequent to the most recent outputting of a cam angle signal by accumulating the valve timing variation dVTH per computation period over the interval over which a cam angle signal is not inputted.

And the processing of these steps 412 to 415 is executed even when in step 402 of FIG. 15 it is determined that the cam angle sensor 19 has failed. That is, when the cam angle sensor 19 has failed, the valve timing variation dVTH per computation period P is accumulated to obtain the valve timing variation $\Delta VTH$ from the last outputting of a cam angle signal before the cam angle sensor 19 failed to the present.

After the calculation of the valve timing variation $\Delta VTH$, processing proceeds to step 419 of FIG. 15 and calculates a final actual valve timing VT using the above Exp. (13). When the cam angle sensor 19 has failed, because $\Delta VTS=0$, $VT=VTC+\Delta VTH$.

When on the other hand in step 401 it is determined that the engine is stopped, processing proceeds to step 416 of FIG. 17. In step 416, the per-second rotation difference RVT [rev/s] is calculated using only the motor speed RM [rpm] of the motor 26, as shown in Exp. (19).

$$RVT = RM/60 \quad (19)$$

After this, processing proceeds to step 417 and calculates a valve timing variation dVTS per computation period P[s] of the valve timing variation $\Delta VTS$ (i.e. the execution period of this program) in accordance with Exp. (20).

$$dVTS = RVT/G \times 720^\circ \, CA \times P \quad (20)$$

Here, G is the reduction ratio of the phase varying mechanism 21.

After this, processing proceeds to step 418 and accumulates the valve timing variation dVTS per computation period P to obtain the valve timing variation $\Delta VTS$ from the last outputting of a cam angle signal before the stoppage to the present.

$$\Delta VTS = \Delta VTS + dVTS \quad (21)$$

The processing of these steps 416 to 418 also performs the role of valve timing variation calculating means referred to in the Scope of Patent Claim.

After the calculation of the valve timing variation $\Delta VTS$, processing proceeds to step 419 of FIG. 15 and calculates a final actual valve timing VT using the above Exp. (13). Here, because while the engine is stopped $\Delta VTH=0$, $VT=VTC+\Delta VTS$. The processing of this step 419 performs the role of final valve timing calculating means referred to in the Scope of Patent Claim.

By the processing described above, every time a cam angle signal is inputted while the engine is running, the actual valve timing VTC at the time of outputting of the cam angle signal is calculated on the basis of the cam angle signal and the crank angle signal. And when a cam angle signal is inputted (outputted), because the valve timing variations $\Delta VTH$, $\Delta VTS$ are reset to 0 by the reset processing of step 411, the actual valve timing VTC at the time of outputting of a cam angle signal itself becomes the final actual valve timing VT.

On the other hand, in the intervals when a cam angle signal is not inputted, on the basis of the speed difference DMC between the motor 26 and the intake-side camshaft 16, a valve timing variation dVTH per computation period is calculated and accumulated. And a final actual valve timing VT is obtained by adding to the actual valve timing VTC at the time of the most recent outputting of a cam angle signal the valve timing variation $\Delta VTH$ (the accumulated value of dVTH) subsequent to that. By this means it becomes possible to calculate the actual valve timing VT continuously with good precision even in the intervals when a cam angle signal is not inputted, and the precision of variable valve timing control can be increased.

And when the engine is stopped, a final actual valve timing VT is obtained by adding to the actual valve timing VTC at the last time of outputting of a cam angle signal before the stoppage the valve timing variation $\Delta VTS$ subsequent to that. Consequently, even when the engine is stopped, the actual valve timing VT can be calculated with good precision and the actual valve timing VT can be controlled to a target value.

And when the cam angle sensor 19 has failed, a final actual valve timing VT is obtained by adding to the actual valve timing VTC at the last time of outputting of a cam angle signal before the failure the valve timing variation $\Delta VTH$ subsequent to that. Consequently, even when the cam angle sensor 19 has failed, the actual valve timing VT can be calculated with good precision and the actual valve timing VT can be controlled to a target value.

Alternatively, at times of engine stoppage or failure of the cam angle sensor 19, the actual valve timing may be calculated with an accumulated value of valve timing variation from a mechanical reference position (for example a most retarded angle position) or from a reference position detected by other means.

Seventh Embodiment

Next, a seventh embodiment will be described. In the sixth embodiment described above, a valve timing variation $\Delta VT$ was calculated on the basis of the motor speed RM of the motor 26 and the camshaft speed RC of the intake-side camshaft 16, and a final actual valve timing VT was obtained by adding to the actual valve timing VTC at the time of outputting of a cam angle signal the valve timing variation $\Delta VT$ subsequent to that.

With respect to this, in a seventh embodiment, the difference between the motor speed RM of the motor 26 and the camshaft speed RC of the intake-side camshaft 16 (the valve timing variation $\Delta VT$) is calculated on the basis of a variation in the rotation angle of the motor 26 and a variation in the rotation angle of the camshaft, and a final valve timing is obtained by adding to the actual valve timing VTC at the time of outputting of a cam angle signal the valve timing variation ΔVT subsequent to that.

Figure 18:
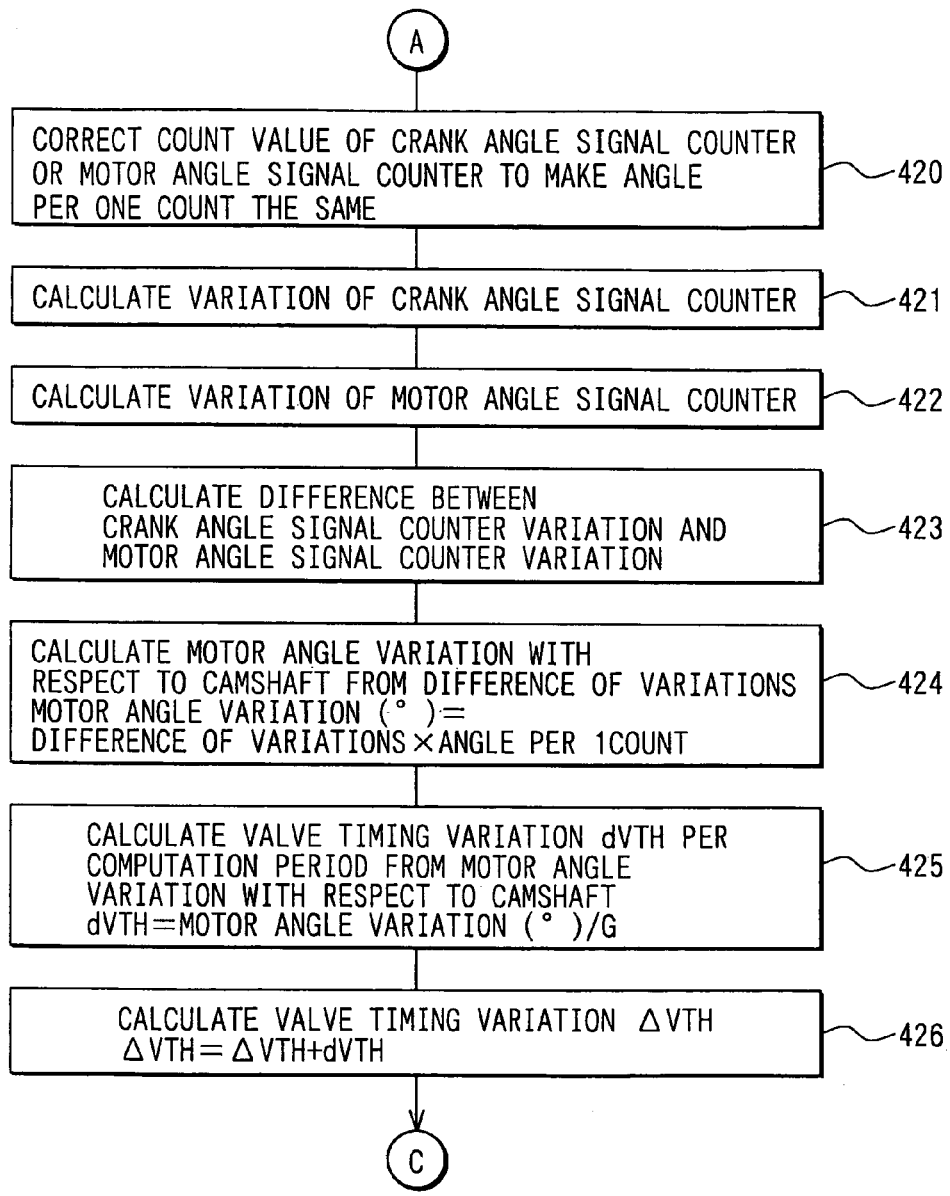
FIG. 18 and FIG. 19 are flow charts illustrating an actual valve timing calculation program in a seventh embodiment.
Figure 19:
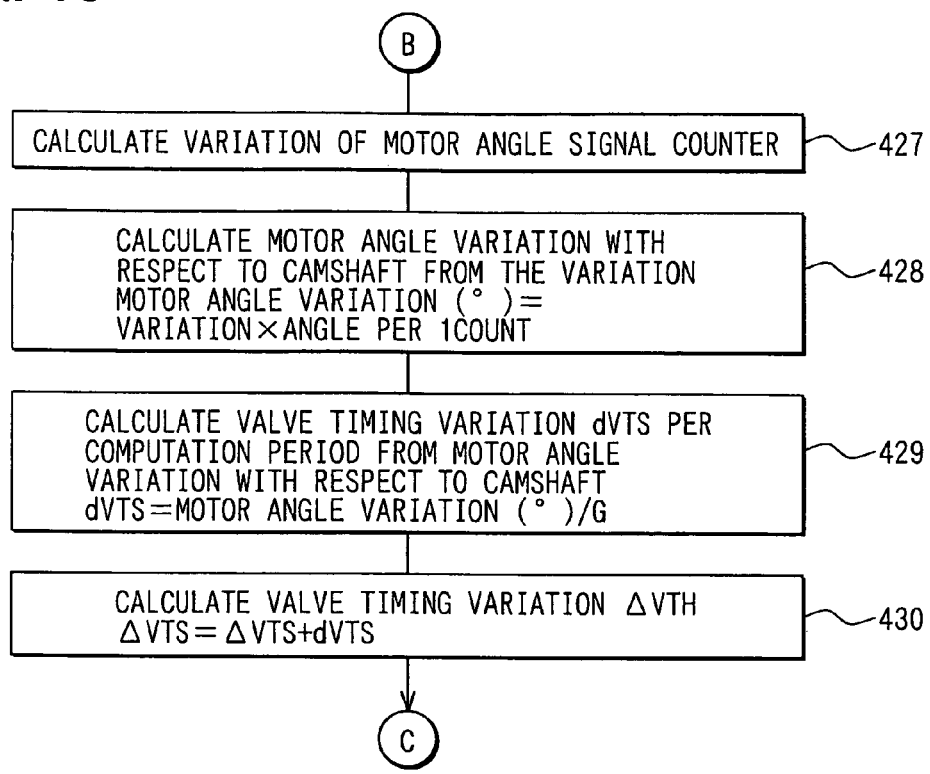

The seventh embodiment, in which the valve timing variation ΔVT is calculated on the basis of a variation in the rotation angle of the motor 26 and a variation in the rotation angle of the camshaft, will now be described using the flow chart of FIG. 18 and FIG. 19. FIG. 18 shows processing carried out instead of the processing for calculating the valve timing variation ΔVTH during engine running of FIG. 16 explained in the sixth embodiment. And FIG. 19 shows processing carried out instead of the processing for calculating the valve timing variation ΔVTS during engine stoppage of FIG. 17. The processing shown in the flow chart of FIG. 15 in the sixth embodiment is executed in exactly the same way in the seventh embodiment.

First, the flow chart of FIG. 18 will be described. FIG. 18 is processing for calculating the actual valve timing after a cam angle signal is inputted while the engine is running. In this processing, a variation in motor rotation angle and a variation in camshaft rotation angle are compared. To compare a variation in motor rotation angle with a variation in camshaft rotation angle, in the seventh embodiment, a comparison is made between a count value of a motor angle signal output counter and a count value of a crankshaft angle signal output counter.

Here, the reason for using the crank angle signal instead of using the camshaft signal is that the crankshaft and the camshaft are connected at a reduction ratio of ½, and in addition to it being possible to deduce a camshaft angle signal by using the crank angle signal, generally the number of crankshaft pulses is greater than the number of camshaft pulses. Because of this it is possible to obtain a variation in the camshaft rotation angle more precisely by using the crank angle signal than by using the cam angle signal.

In this embodiment, there are 36 crankshaft pulses at intervals of 10° CA, and the pulses actually used in computation are pulses at intervals of 30° CA. That is, 12 pulses are used. For the motor 26, on the other hand, pulses at intervals of 30° CA are used.

However, there is a reduction of ½ between the camshaft and the crankshaft. So, first, in a step 420, for example the count value of the crank angle signal is corrected to ½ to make the angle of change per one count of the count value of the angle of the motor 26 and the count value of the crank angle signal the same. Conversely, the count value of the angle of the motor 26 may be corrected by being doubled. In this way the angle variations of one count value of both counters are made the same, and processing proceeds to step 421.

In step 421, a variation of the crank angle is calculated. In practice, a variation is calculated on the basis of the count value of the crank angle signal counted from the time of the previous computation to the time of the present computation (variation of crank angle counter=crank angle counter at this time computation−crank angle counter at last time computation).

Then, processing proceeds to step 422 and calculates a variation in the angle of the motor 26. In practice, a variation is calculated on the basis of the count value of the angle signal of the motor 26 counted from the time of the previous computation to the time of the present computation (variation of motor angle counter=motor angle counter at this time computation−motor, angle counter at last time computation).

Then, in the following step 423, the difference between the variation of the crank angle counter and the variation of the motor angle counter is calculated, and in step 424 a motor angle variation with respect to the camshaft is calculated. Specifically, instep 424, a motor angle variation with respect to the camshaft is computed using the equation shown by "motor angle variation with respect to camshaft= (variation of motor angle counter−variation of crank angle counter)×angle per 1 count".

Next, in step 425, the motor angle variation with respect to the camshaft is corrected by the reduction ratio 1/G of the valve timing alteration part, and a valve timing variation dVTH per computation period is calculated (valve timing variation dVTH=motor angle variation with respect to camshaft/G (reduction ratio)). Here, G is the reduction ratio of the phase-varying mechanism 21 of the variable valve timing device 18, and is the ratio of the relative amount of turn of the motor 26 with respect to the intake-side camshaft 16 to the valve timing variation (camshaft phase variation).

After this, processing proceeds to step 426 and calculates a final valve timing variation ΔVTH by accumulating the phase of the valve timing changed from the last computation to the present computation, that is, the valve timing variation dVTH, with the valve timing variation ΔVTH up to the previous time, as shown in Exp. (22).

$$\Delta VTH = \Delta VTH(i-1) + dVTH \quad (22)$$

The processing of these steps 420 to 426 performs the role of valve timing variation calculating means referred to in the Scope of Patent Claim, and calculates a valve timing variation ΔVTH of an interval over which a cam angle signal is not inputted.

And, even when in step 402 of FIG. 15 it is determined that the cam angle sensor 19 has failed, it is possible to execute the processing of FIG. 18 and accumulate a valve timing variation dVTH of while the cam angle sensor 19 is failed and thereby obtain a valve timing variation ΔVTH of from the last outputting of a cam angle signal before the cam angle sensor 19 failed to the present. By this means it is possible to compute the actual valve timing precisely even when the cam angle sensor 19 has failed.

After the calculation of the valve timing variation ΔVTH, processing proceeds to step 419 of FIG. 15 and calculates a final actual valve timing VT using the above Exp. (13). When the cam angle sensor 19 has failed, because ΔVTS=0, VT=VTC+ΔVTH.

Figure 20:
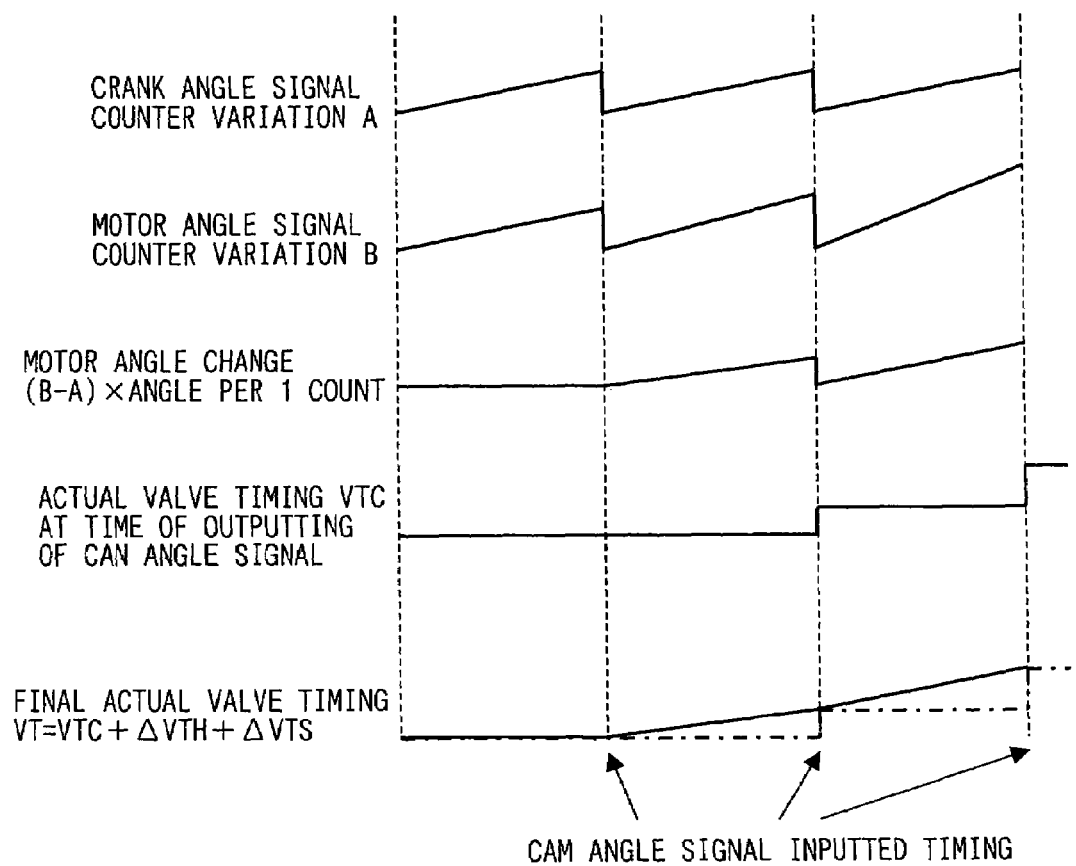
FIG. 20 is a timing chart showing an example of actual valve timing calculation in the seventh embodiment.

An example of calculating the actual valve timing by the processing of the flow chart of FIG. 18 described above is shown in the timing chart of FIG. 20. In the processing shown in the flow chart of FIG. 18, on the basis of a difference between a variation of the angle of the motor 26 and a variation of the angle of the camshaft, a final actual valve timing VT is obtained by adding to an actual valve timing VTC at the time of outputting of a cam angle signal a valve timing variation ΔVTH subsequent to that. Therefore, as shown in the timing chart of FIG. 20, it is possible to calculate an actual valve timing VT continuously with good precision even in the intervals when a cam angle signal is not inputted, and variable valve timing control precision can be increased.

On the other hand, when in step 401 of the flow chart of FIG. 15 it was determined that the engine is stopped, the processing of FIG. 19 is executed. The processing of this FIG. 19 is for calculating a valve timing variation ΔVTS of when the engine is stopped.

First, in a step 427, a variation of the angle of the motor 26 is calculated. In practice, the variation is calculated on the basis of the count value of the angle signal of the motor 26 counted from the time of the previous computation to the time of the present computation (variation of motor angle counter=motor angle counter at this time computation−motor angle counter at last time computation). Then, in step 428, an angle variation of the motor 26 with respect to the camshaft is calculated with only the variation of the motor angle of the motor 26. Specifically, it is calculated using the equation "motor angle variation with respect to camshaft=variation of motor angle counter×angle per 1 count".

Next, in step 429, the angle variation of the motor 26 with respect to the camshaft is corrected by the reduction ratio 1/G of the valve timing alteration part, and a valve timing variation dVTS is calculated (valve timing variation dVTS=motor angle variation with respect to camshaft/G (reduction ratio)).

After this, processing proceeds to step 430, and calculates a final valve timing variation ΔVTS by accumulating the valve timing changed from the last computation time to the present computation time, that is, the valve timing variation dVTS, with the valve timing variation ΔVTS up to the previous time, as shown in Exp. (23).

$$\Delta VTS = \Delta VTS(i-1) + dVTS \quad (23)$$

Thus, the processing shown in the flow chart of FIG. 19 performs the role of valve timing variation calculating means referred to in the Scope of Patent Claim.

After the valve timing variation ΔVTS is calculated, processing proceeds to step 419 of FIG. 15 and calculates a final actual valve timing VT (VT=VTC+ΔVTH+ΔVTS). Here, because the engine is stopped, VTH=0, and VT=VTC+ΔVTS. The processing of the above step 419 performs the role of final valve timing calculating means referred to in the Scope of Patent Claim.

As described above, in the processing of FIG. 18, while the engine is running, in the case where a valve timing variation has been calculated from a comparison of a motor angle variation and a camshaft angle variation also, in the same way as when a valve timing variation was calculated on the basis of speed differences between the motor and the intake-side camshaft, a final actual valve timing VT is obtained by adding to an actual valve timing VTC at the time of outputting of a cam angle signal, constituting a guide, a valve timing variation ΔVTH subsequent to that. By this means it becomes possible to calculate the actual valve timing VT continuously with good precision even in the intervals when a cam angle signal is not outputted, and the precision of variable valve timing control can be increased.

And when the engine is stopped, a final actual valve timing VT is obtained by adding to the actual valve timing VTC at the last time of outputting of a cam angle signal before the stoppage the valve timing variation ΔVTS subsequent to that. Consequently, even when the engine is stopped, the actual valve timing VT can be calculated with good precision and the actual valve timing VT can be controlled to a target value even when the engine is stopped.

And when the cam angle sensor 19 has failed, a final actual valve timing VT is obtained by adding to the actual valve timing VTC at the last time of outputting of a cam angle signal before the failure the valve timing variation ΔVTH subsequent to that. Consequently, even when the cam angle sensor 19 has failed, the actual valve timing VT can be calculated with good precision and the actual valve timing VT can be controlled to a target value.

Alternatively, at times of engine stoppage or failure of the cam angle sensor 19, the actual valve timing may be calculated with an accumulated value of valve timing variation from a mechanical reference position (for example a most retarded angle position) or from a reference position detected by other means.

And, the variable valve timing devices 18 of the sixth and seventh embodiments described above have an outer gear 22 (first rotating member) disposed concentrically with a camshaft 16 and rotationally driven by rotary drive power from a crankshaft 12; an inner gear 23 (second rotating member) that rotates integrally with the camshaft 16; a planetary gear 24 (phase-varying member) that transmits rotary power from the outer gear 22 to the inner gear 23 and varies the relative rotation phase between the gears 22, 23; and a motor 26 that turns this planetary gear 24 around a circular orbit concentric with the camshaft 16, and is constructed so that when the valve timing is not to be changed the speed of the motor 26 is matched to the speed of the camshaft 16 to match the turning speed of the planetary gear 24 to the speed of the camshaft 16 and thereby hold the difference in rotation phase between the outer gear 22 and the inner gear 23 steady and hold the camshaft phase steady, and when the valve timing is to be changed the speed of the motor 26 is changed with respect to the speed of the camshaft 16 to change the turning speed of the planetary gear 24 with respect to the speed of the camshaft 16 and thereby change the difference in rotation phase between the outer gear 22 and the inner gear 23 and change the camshaft phase. In this construction, because it is not necessary for the motor 26 as a whole to be rotated, the inertial weight of the rotating system of the variable valve timing device 18 can be lightened and the motor 26 can be connected directly to outside electrical wiring by fixed connection means, and overall it is possible to raise the durability of the variable valve timing device 18. Furthermore, the construction of the variable valve timing device 18 is relatively simple, and the requirements of cost minimization can also be satisfied.

And, although in the foregoing first embodiment through seventh embodiment variable valve timing control devices for intake valves have been described, the invention is not limited to variable valve timing control devices for intake valves and may alternatively be applied to a variable valve timing control device for exhaust valves. Also, the phase-varying mechanism of the variable valve timing device 18 is not limited to one using a planetary gear mechanism as in the embodiments described above, and alternatively a phase-varying mechanism of some other type may be used, and in short it may be any motor-driven variable valve timing device that varies a valve timing by varying the speed of a motor with respect to the speed of a camshaft.

Eighth Embodiment

Next, an eighth embodiment of the invention will be described.

Generally, in a variable valve timing device, a limit position of the range of variation of the valve timing (a variable valve timing variation range limit position) is mechanically enforced by a moving part of the phase-varying mechanism being made to abut with a stopper part. Because of this, when the valve timing is controlled to a variation range limit position of a variable valve timing device (a most retarded angle position or a most advanced angle position) or to the proximity thereof, it sometimes happens that it overshoots and the moving part of the phase-varying mechanism is not sufficiently slowed and strikes the stopper part. And due to the impact load at the time of this impact a large load acts on the meshing parts of the gears of the phase-varying mechanism, there is a risk of the gears grinding and becoming locked and of the gear mechanism suffering damage, and there is a possibility of it becoming impossible to control the valve timing normally.

Because of this, it is an object of the eighth embodiment to provide a variable valve timing control device with which it is possible to prevent grinding and damage of the gear mechanism of a variable valve timing device when a valve timing is controlled to a variation range limit position of the variable valve timing device or to the proximity thereof, and with which it is possible to improve the reliability of operation of the variable valve timing device.

First, a variable valve timing control device of an internal combustion engine according to the eighth embodiment will be described in outline. A variable valve timing control device according to the eighth embodiment, when the actual valve timing is in a predetermined rate-limited region set in the vicinity of a variation range limit position of the variable valve timing device, executes rate-limiting control for limiting the valve timing change rate to below a predetermined rate. If this is done, when the actual valve timing is in the rate-limited region in the vicinity of the limit position, the valve timing change rate can be slowed to below the predetermined value to forcibly slow down the speed of movement of the moving part of the phase-varying mechanism. Thus it is possible to avoid the moving part of the phase-varying mechanism striking the stopper part without being slowed down, and grinding and damage of the gear mechanism can be prevented.

In this case, even when the actual valve timing is in the rate-limited region, when the actual valve timing is being changed in the opposite direction from the limit position of the rate-limited region (for example when the actual valve timing is being changed in the advanced angle direction from the vicinity of the most retarded angle position), even if the valve timing change rate is large, there will be no collision of the moving part of the phase-varying mechanism and the stopper part. Because of this, even when the actual valve timing is in the rate-limited region, when the actual valve timing is being changed in the opposite direction from the limit position of the rate-limited region, rate-limiting control need not be executed. In this way, even when the actual valve timing is in the rate-limited region, when the actual valve timing is being changed in a direction such that a collision of the moving part of the phase-varying mechanism and the stopper part will not occur, the valve timing change rate can be not slowed. As a result, the actual valve timing can be changed swiftly to the target valve timing, and responsiveness of variable valve timing control can also be ensured.

Now, if the width of the rate-limited region is narrow, when the valve timing change rate at the time of entering the rate-limited region is fast, there is a possibility of the moving part of the phase-varying mechanism striking the stopper part without the valve timing change rate being slowed down sufficiently. And if the detection error (dispersion) of the actual valve timing is large, there is a possibility of the moving part of the phase-varying mechanism striking the stopper part without the valve timing change rate being slowed down sufficiently because the timing at which it is detected that the actual valve timing has entered the rate-limited region is late. In view of these circumstances, it is desirable for the rate-limited region to be set on the basis of the valve timing variation needed to slow the valve timing change rate to below the predetermined rate and/or on the actual valve timing detection error. If this is done, a rate-limited region can be set that has a width such that it is possible to slow down the valve timing change rate to below a predetermined rate in view of the detection error of the actual valve timing and the valve timing variation needed to slow the rate. By this means it is possible to carry out stable rate-limiting control that does not suffer influences of actual valve timing detection error and valve timing change rate. In this case, a valve timing change rate (or an actual valve timing detection error) may be computed during variable valve timing control and a rate-limited region set in accordance with this computed value, or in advance, for example at the design stage, a technologist may measure or compute a maximum valve timing change rate (or a maximum actual valve timing detection error) and set a fixed rate-limited region in correspondence with this value and store it in memory.

A variable valve timing control device of an internal combustion engine according to the eighth embodiment will now be described in detail on the basis of the drawings. The system construction of a variable valve timing control device according to the eighth embodiment is basically the same as that shown in FIG. 1 and FIG. 2.

Figure 2:
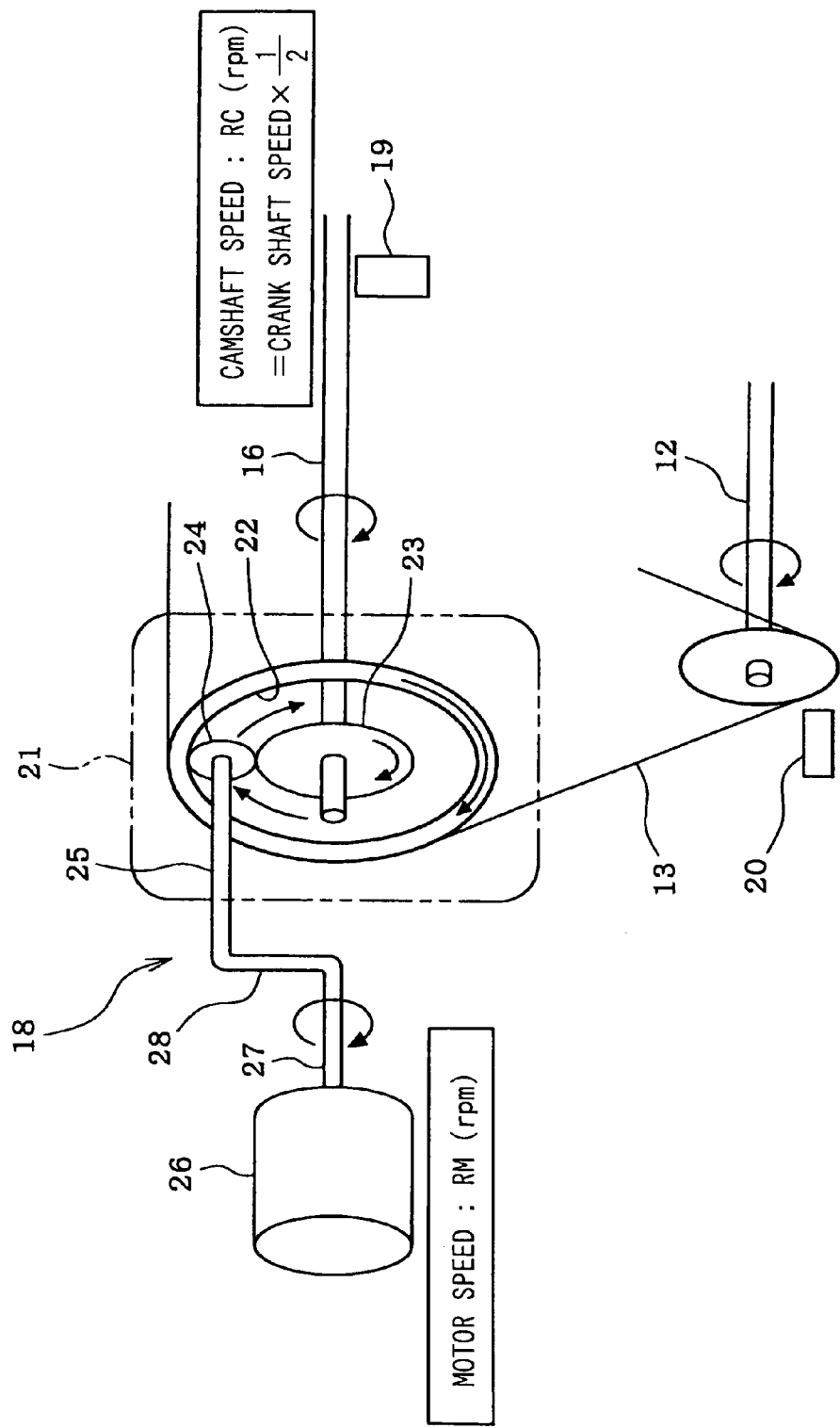
FIG. 2 is a schematic construction view of a variable valve timing device.
Figure 21:
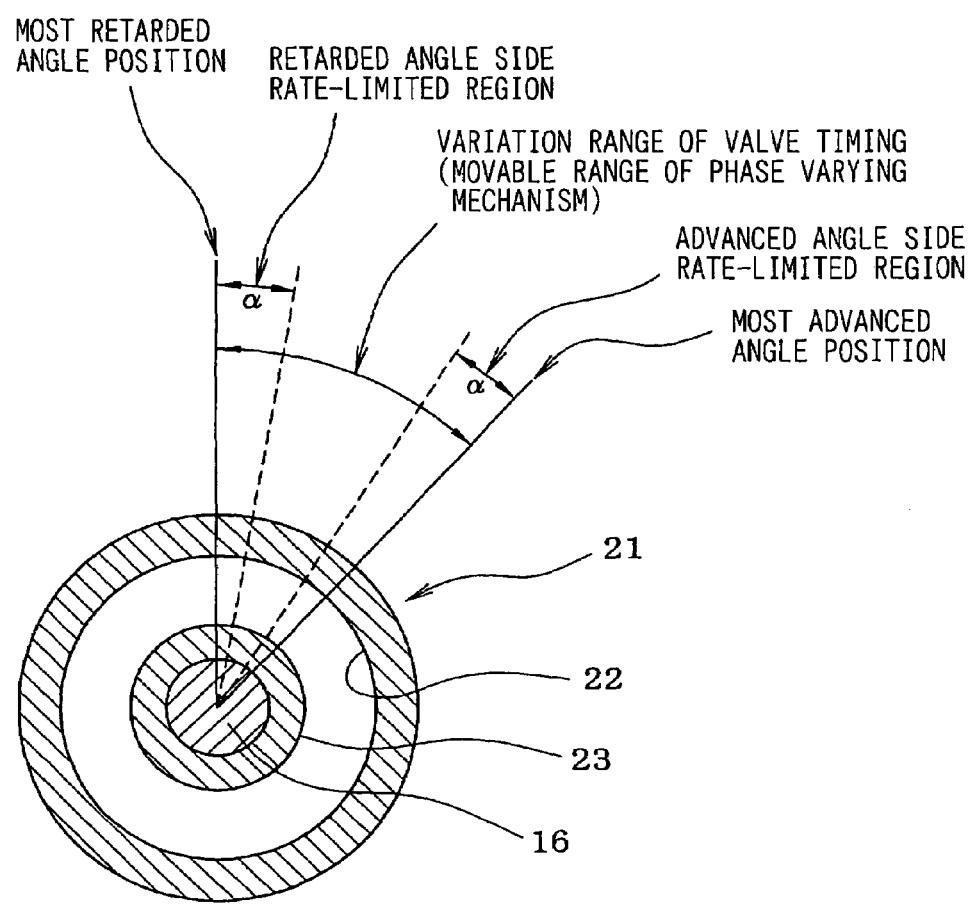
FIG. 21 is a view illustrating a variation range of valve timing and rate-limited regions in an eighth embodiment of the invention.

However, in the variable valve timing device 18 shown in FIG. 1 and FIG. 2, to limit the variation range of the valve timing (the movable range of the phase varying mechanism 21), a moving part and a stopper part (both not shown) are provided on the phase varying mechanism 21. And, as shown in FIG. 21, the movable range of the phase varying mechanism 21 is limited to the range of from a position at which the moving part contacts a retarded angle side stopper part to a position at which it contacts an advanced angle side stopper part, to limit the variation range of the valve timing. In this case, the position at which the moving part of the phase varying mechanism 21 contacts the retarded angle side stopper part is the most retarded angle position (retarded angle side limit position) of the phase varying mechanism 21, i.e. the most retarded angle position of the valve timing. And the position at which the moving part of the phase-varying mechanism 21 contacts the advanced angle side stopper part is a most advanced angle position (advanced angle side limit position) of the phase-varying mechanism 21, i.e. the most advanced angle position of the valve timing.

The variable valve timing device 18 that is the control object of a variable valve timing control device according to the eighth embodiment is not limited to one of the construction shown in FIG. 1 and FIG. 2. That is, a variable valve timing control device according to the eighth embodiment can be applied to any variable valve timing device having a gear mechanism, irrespective of the type of its drive source and phase-varying mechanism.

The ECU 30 executes the same variable valve timing control program as in the first embodiment, shown in FIG. 3. Accordingly, it calculates a required valve timing change rate Vreq so as to minimize the deviation D between a target valve timing VTtg and the actual valve timing VT of intake valves and controls the motor speed RM of the motor 26 so as to realize this required valve timing change rate Vreq. In this way, it matches the actual valve timing VT of the intake valves to the target valve timing VTtg.

Figure 24:
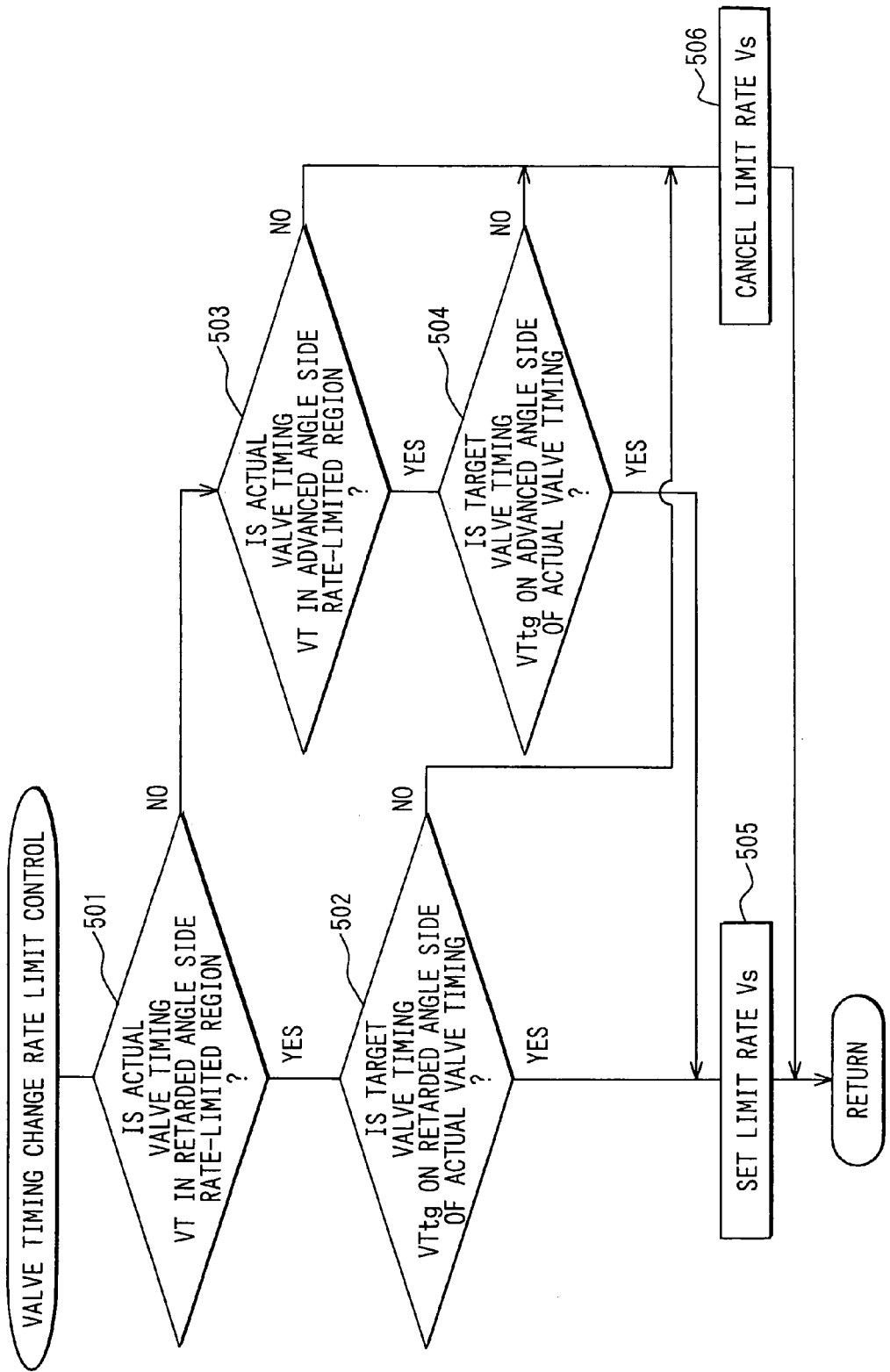
FIG. 24 is a flow chart showing the flow of processing of a valve timing change rate limit control program of the eighth embodiment.

Also, the ECU 30 executes a valve timing change rate limit control program shown in FIG. 24, which will be further discussed later. By this means it executes rate-limiting control by setting a limit rate Vs for limiting the required valve timing change rate Vreq when the actual valve timing VT of the intake valves is in a retarded angle side rate-limited region set in the vicinity of the most retarded angle position or an advanced angle side rate-limited region set in the vicinity of the most advanced angle position.

As shown in FIG. 21, the retarded angle side rate-limited region is set to a range of a predetermined width α [°CA] from the most retarded angle position in the advanced angle direction, and the advanced angle side rate-limited region is set to a range of a predetermined width α [°CA] from the most advanced angle position in the retarded angle direction. The width α [°CA] of these rate-limited regions is set to a value obtained by totalling a detection error C [°CA] of the actual valve timing VT and a valve timing variation D [°CA] needed for slowing the valve timing change rate V down to the limit rate Vs.

$$\alpha = C + D \quad (24)$$

Figure 22:
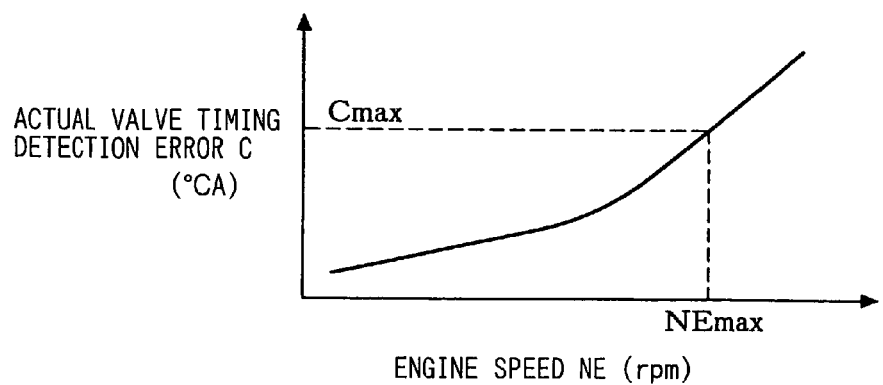
FIG. 22 is a graph showing a relationship between engine speed and actual valve timing.

Because, as shown in FIG. 22, the higher the engine speed NE becomes the larger the actual valve timing VT detection error C becomes, in this embodiment, as the actual valve timing VT detection error C, the maximum detection error value Cmax thereof (the detection error Cmax of the actual valve timing VT at a maximum engine speed NEmax) is used.

Figure 23:
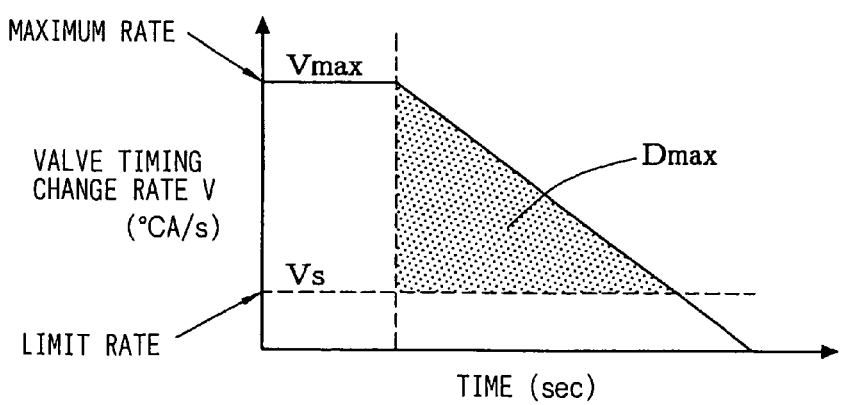
FIG. 23 is a graph showing a relationship between valve timing change rate and slowing-down variation.

And because, as shown in FIG. 23, the faster the valve timing change rate V becomes the larger the valve timing variation D needed for slowing it down to the limit rate Vs becomes, in this embodiment, as the valve timing variation D needed for the slowing down, a maximum value Dmax thereof (the valve timing variation Dmax needed to slow the valve timing change rate V down to the limit rate Vs from a maximum rate Vmax) is used.

The processing content of the valve timing change rate limit control program shown in FIG. 24 executed by the ECU 30 will now be described in detail. The valve timing change rate limit control program shown in FIG. 24 is executed with a predetermined period for example after an ignition switch is turned on.

When this program is started, first, in a step 501, it is determined whether or not the actual valve timing VT is in the retarded angle side rate-limited region (whether or not |most retarded angle position−VT|≦retarded angle side rate-limited region width α). When it is determined that the actual valve timing VT is in the retarded angle side rate-limited region, processing proceeds to step 502. In step 502, it is determined whether or not the target valve timing VTtg is on the retarded angle side of the actual valve timing VT (whether or not VTtg−VT<0).

When the result is that it is determined that the target valve timing VTtg is on the retarded angle side of the actual valve timing VT, because the actual valve timing VT is in the retarded angle side rate-limited region and is changing in the direction of the most retarded angle position, which is the limit position of that region, it is determined that there is a possibility of the moving part of the phase-varying mechanism 21 hitting the retarded angle side stopper part, and processing proceeds to step 505. In step 505, to prevent grinding and damage of the gear mechanism (the gears 22 to 24), a limit rate Vs limiting the required valve timing change rate Vreq is set and rate-limiting control is executed.

Conversely, when in the above-mentioned step 502 it is determined that the target valve timing VTtg is on the advanced angle side of the actual valve timing VT (VTtg−VT>0), because the actual valve timing VT is in the retarded angle side rate-limited region but changing in the opposite direction from the most retarded angle position (in the advanced angle direction), it is determined that there is no possibility of the moving part of the phase-varying mechanism 21 hitting the retarded angle side stopper part, and processing proceeds to step 506. In step 506, the limit rate Vs on the required valve timing change rate Vreq is canceled.

When on the other hand in the above-mentioned step 501 it is determined that the actual valve timing VT is not in the retarded angle side rate-limited region, processing proceeds to step 503. In step 503, it is determined whether or not the actual valve timing VT is in the advanced angle side rate-limited region (whether or not most advanced angle position−VT≦advanced angle side rate-limited region width α). If it is determined that the actual valve timing VT is in the advanced angle side rate-limited region, processing proceeds to step 504 and determines whether or not the target valve timing VTtg is on the advanced angle side of the actual valve timing VT (whether or not VTtg−VT<0).

When the result is that it is determined that the target valve timing VTtg is on the advanced angle side of the actual valve timing VT, because the actual valve timing VT is in the advanced angle side rate-limited region and changing in the direction of the most advanced angle position, which is the limit position of that region, it is determined that there is a possibility of the moving part of the phase-varying mechanism 21 hitting the advanced angle side stopper part, and processing proceeds to step 505. In step 505, to prevent grinding and damage of the gear mechanism (the gears 22 to 24), a limit rate Vs limiting the required valve timing change rate Vreq is set and rate-limiting control is executed.

Conversely, when in the above-mentioned step 504 it is determined that the target valve timing VTtg is on the retarded angle side of the actual valve timing VT, then because the actual valve timing VT is in the advanced angle side rate-limited region but changing in the opposite direction from the most advanced angle position (in the retarded angle direction), it is determined that there is no possibility of the moving part of the phase-varying mechanism 21 hitting the advanced angle side stopper part, and processing proceeds to step 506. In step 506, the limit rate Vs on the required valve timing change rate Vreq is canceled.

By the above processing, when the actual valve timing VT is in the retarded angle side or advanced angle side rate-limited region and changing in the direction of the limit position thereof, a limit rate Vs is set and rate-limiting control is executed to limit the required valve timing change rate Vreq to below the limit rate Vs. By this means, in the retarded angle side or advanced angle side rate-limited region the valve timing change rate V can be slowed down to the limit rate Vs to slow the speed of movement of the moving part of the phase-varying mechanism 21. Consequently, it is possible to avoid the moving part of the phase-varying mechanism 21 hitting a stopper part at high speed. As a result, grinding and damage of the gear mechanism (the gears 22 to 24) can be prevented, and the reliability of operation of the variable valve timing device 18 can be increased.

On the other hand, even when the actual valve timing VT is in the retarded angle side or advanced angle side rate-limited region, when it is changing in the opposite direction from the limit position of that region, the limit rate Vs is canceled and rate-limiting control is not executed. By this means, even when the actual valve timing VT is in the retarded angle side or advanced angle side rate-limited region, when the actual valve timing VT is changing in a direction such that a collision between the moving part of the phase-varying mechanism 21 and a stopper part will not occur, slowing down of the valve timing change rate can be not carried out. Consequently, the actual valve timing VT can be made to change swiftly to the target valve timing VTtg, and responsiveness of variable valve timing control can also be ensured.

Now, if the width α of the retarded angle side or advanced angle side rate-limited region is narrow, when the valve timing change rate at which the retarded angle side or advanced angle side rate-limited region is entered is fast, there is a possibility of the moving part of the phase-varying mechanism 21 striking the stopper part without the valve timing change rate being slowed down sufficiently. And if the detection error (dispersion) of the actual valve timing VT is large, there is a possibility of the moving part of the phase-varying mechanism 21 striking the stopper part without the valve timing change rate being slowed down sufficiently because the timing at which it is detected that the actual valve timing VT has entered the retarded angle side or advanced angle side rate-limited region is late.

Because of this, in this embodiment, the width α of the retarded angle side and advanced angle side rate-limited regions is set to a value obtained by totalling a detection error C of the actual valve timing VT and a valve timing variation D needed for sufficient slowing. Thus, retarded angle side and advanced angle side rate-limited regions having widths such that the valve timing change rate can be slowed down to below a predetermined limit rate Vs without fail can be set. Therefore, it is possible to perform stable rate-limiting control that does not suffer influences of actual valve VT timing detection error and valve timing change rate.

In this embodiment, rate-limited regions of the same width were set on both the most retarded angle side and the most advanced angle side of the valve timing variation range (the variation range of the phase-varying mechanism 21). However, alternatively, depending on the range of valve timing actually used, the width of the retarded angle side rate-limited region and the width of the advanced angle side rate-limited region can be made different, or a rate-limited region may be set on either the retarded angle side or the advanced angle side only.

Ninth Embodiment

Next, a ninth embodiment of the invention will be described, using FIG. 25 and FIG. 26.

The ECU 30, as described in the sixth embodiment, maintains the detection accuracy of the actual valve timing VT by learning a reference position of the valve timing (for example a most retarded angle position) every time predetermined learning conditions arise (for example every time a cam angle signal is inputted, or every time the engine is started). Therefore, when reference position learning has not been completed, because the detection accuracy of the actual valve timing VT has fallen (the detection error has increased), if the valve timing is controlled to or near to a limit position of its variation range in this state, there is a possibility of the moving part of the phase-varying mechanism 21 hitting a stopper part at high speed.

Figure 25:
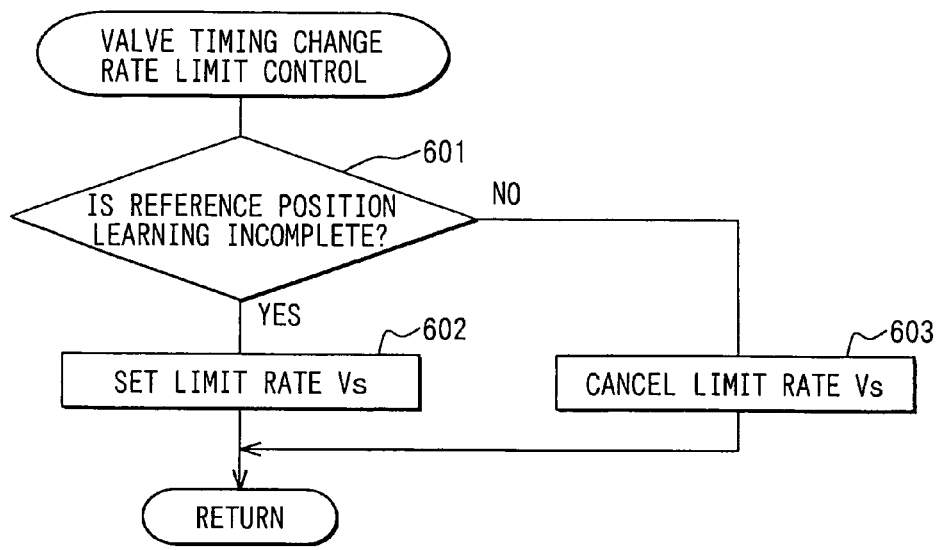
FIG. 25 is a flow chart showing the flow of processing of a valve timing change rate limit control program of a ninth embodiment.

To avoid this, in this embodiment, the ECU 30, by executing a valve timing change rate limit control program shown in FIG. 25 with a predetermined period, when reference position learning has not been completed, sets a limit rate Vs limiting the required valve timing change rate Vreq and executes rate-limiting control.

Also, the ECU 30, by executing the target valve timing calculation program shown in FIG. 26 with a predetermined period, when executing variable valve timing control in a state that reference position learning has not been completed, calculates a target valve timing VTtg in accordance with a required valve timing change rate Vreq limited to below a limit rate Vs by rate-limiting control. The processing content of these programs will be explained below.

When the valve timing change rate limit control program shown in FIG. 25 is started, first, in a step 601, it is determined whether or not reference position learning is incomplete. When it is determined that reference position learning is incomplete, because the detection accuracy of the actual valve timing VT has fallen (the detection error has increased), there is a possibility of the moving part of the phase-varying mechanism 21 being allowed to hit a stopper part at high speed. Because of this, processing proceeds to step 602 and sets a limit rate Vs limiting the required valve timing change rate Vreq and executes rate-limiting control.

After that, this program is started, and at the stage where it is determined in step 601 that reference position learning has been completed, processing proceeds to step 603 and cancels the limit rate Vs on the required valve timing change rate Vreq.

Figure 26:
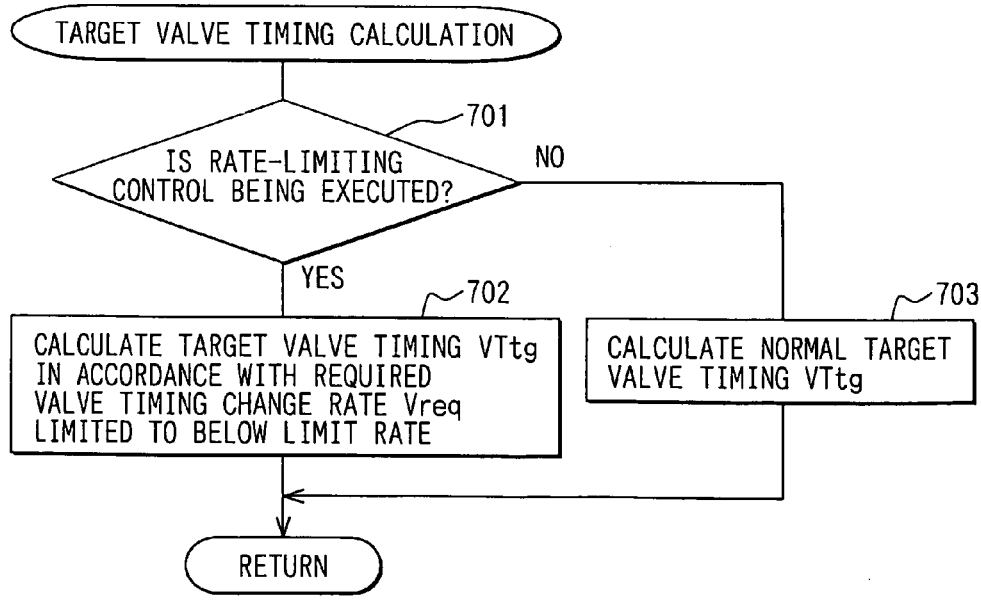
FIG. 26 is a flow chart showing the flow of processing of a target valve timing calculation program of the ninth embodiment.

And when the target valve timing calculation program shown in FIG. 26 is started, first, in a step 701, it is determined whether or not rate-limiting control based on non-completion of reference position learning is being executed. When it is determined that rate-limiting control is being executed, processing proceeds to step 702, and calculates a target valve timing VTtg in accordance with the required valve timing change rate Vreq limited to below a limit rate Vs. The target valve timing VTtg in this rate-limiting control execution is set to a target valve timing such that problems such as misfiring do not occur even at a slowed valve timing change rate.

When on the other hand it is determined that rate-limiting control is not being executed, processing proceeds to step 703 and calculates a normal target valve timing VTtg on the basis of the engine running state and so on.

In the ninth embodiment described above, when reference position learning has not been completed, rate-limiting control that limits the required valve timing change rate Vreq to below a limit rate Vs is executed. Consequently, when before the completion of reference position learning the detection accuracy of the actual valve timing VT has fallen, even when the valve timing is controlled to or near to a limit position of its variation range, the moving part of the phase-varying mechanism 21 hitting a stopper part at high speed can be avoided, and it is possible to prevent grinding and damage of the gear mechanism.

Also, in the ninth embodiment, when variable valve timing control is executed with reference position learning not completed, a target valve timing VTtg in accordance with a valve timing change rate limited to below a limit rate Vs by rate-limiting control is set. Consequently, even when variable valve timing control is carried out at a valve timing change rate slowed by rate-limiting control, a target valve timing VTtg can be set so that running can be continued with quality of combustion and so on of the engine 11 maintained to a certain extent.

Tenth Embodiment

Whereas in the foregoing ninth embodiment when reference position learning had not been completed rate-limiting control was executed over the whole valve timing region, in a tenth embodiment, when reference position learning has not been completed, rate-limiting control is executed only over a region where the difference between the actual valve timing VT and the limit position (most retarded angle position or most advanced angle position) is within a predetermined value (a pre-learning rate-limited region).

Figure 27:
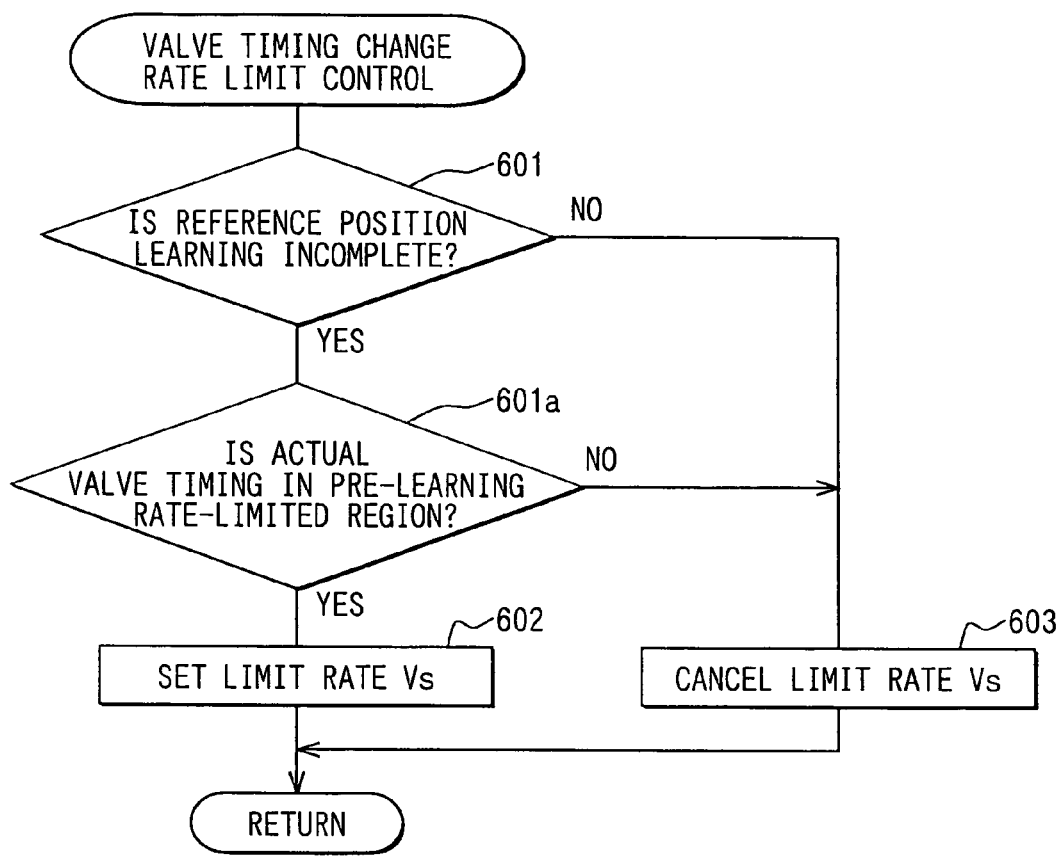
FIG. 27 is a flow chart showing the flow of processing of a valve timing change rate limit control program of a tenth embodiment.

The valve timing change rate limit control program in this embodiment is shown in FIG. 27. The valve timing change rate limit control program of FIG. 27 is obtained by adding the processing of a step 601*a* between the processing of step 601 and step 602 of FIG. 25, and the processing of the other steps is the same as in FIG. 25.

In the program shown in FIG. 27, when in step 601 it is determined that reference position learning has not been completed, processing proceeds to step 601*a* and determines whether or not the actual valve timing VT is in a predetermined pre-learning rate-limited region. This pre-learning rate-limited region is a region where, considering deterioration in actual valve timing VT detection accuracy (increased detection error) due to reference position learning being non-completed, there is a possibility of a collision between the moving part of the phase-varying mechanism 21 and the stopper part occurring, and is set to a region wider than the rate-limited region described in the foregoing seventh embodiment (see FIG. 21).

When reference position learning has not been completed and it is determined that the actual valve timing VT is in the pre-learning rate-limited region, it can be inferred that there is a possibility of a collision between the moving part of the phase-varying mechanism 21 and the stopper part occurring. So, processing proceeds to step 602 and sets a limit rate Vs for limiting the required valve timing change rate Vreq and executes rate-limiting control. Even when the actual valve timing VT is within the pre-learning rate-limited region, when it is changing in the opposite direction from the respective limit position, the limit rate Vs may be canceled and rate-limiting control may be not executed.

On the other hand, even when reference position learning has not been completed, when it is determined that the actual valve timing VT is not in the pre-learning rate-limited region, it can be inferred that the probability of a collision between the moving part of the phase-varying mechanism 21 and the stopper part occurring is low. Therefore, processing proceeds to step 603 and cancels the limit rate Vs on the required valve timing change rate Vreq.

In the tenth embodiment described above, when reference position learning has not been completed, and when the actual valve timing VT is in a pre-learning rate-limited region, rate-limiting control is executed. Consequently, at the time of reference position learning, in the region where a collision between the moving part of the phase-varying mechanism 21 and the stopper part will not occur, the actual valve timing VT can be changed swiftly without the valve timing change rate being limited, and the time required for reference position learning can be shortened.

In the tenth embodiment also, the target valve timing calculation program of FIG. 26 may be executed, so that when variable valve timing control is executed in a state that reference position learning has not been completed a target valve timing VTtg in accordance with a valve timing change rate limited to below a limit rate Vs by rate-limiting control is set.

Eleventh Embodiment

Figure 28:
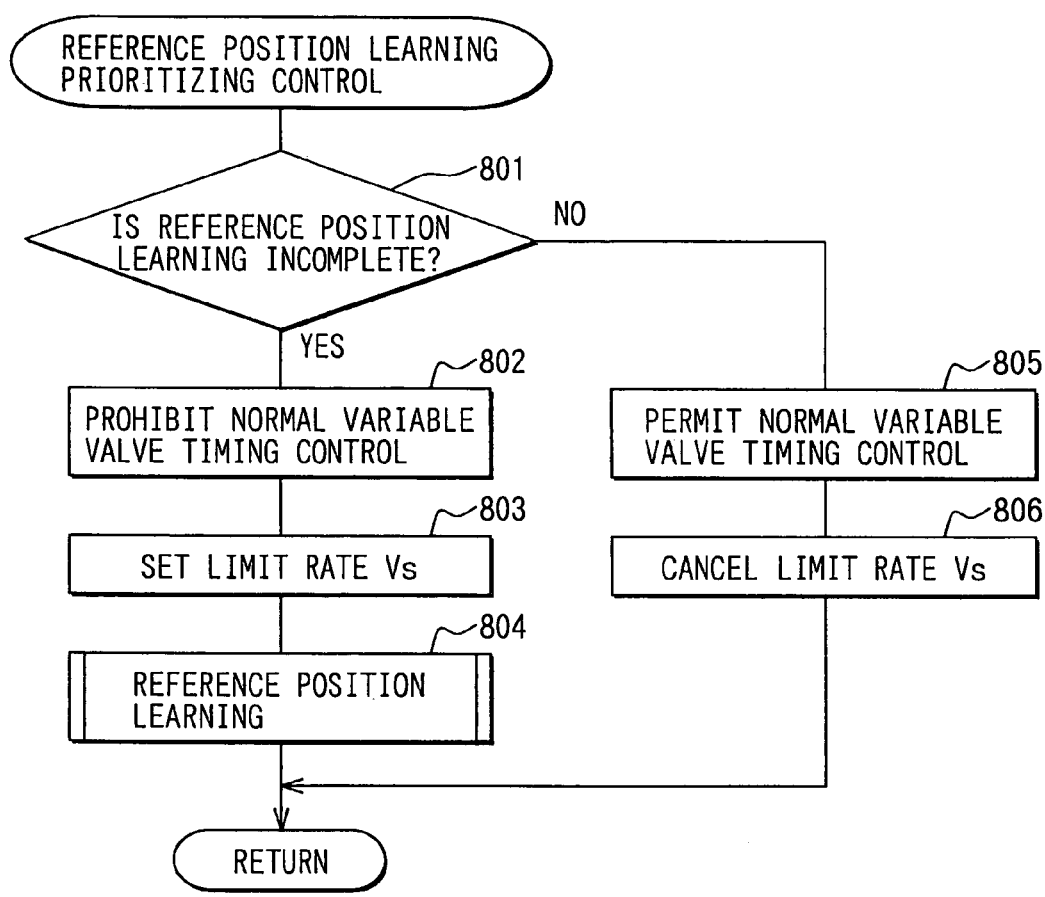
FIG. 28 is a flow chart showing the flow of processing of a reference position learning prioritizing control program of an eleventh embodiment.

In an eleventh embodiment of the invention, by a reference position learning prioritizing control program being executed shown in FIG. 28, until reference position learning has been completed, normal variable valve timing control is prohibited and reference position learning only is made executable.

The reference position learning prioritizing control program shown in FIG. 28 is executed for example at intervals of a predetermined period after an ignition switch is turn on. When this program is started, first, in a step 801, it is determined whether or not reference position learning is non-completed. When it is determined that reference position learning is non-completed, processing proceeds to step 802 and prohibits normal variable valve timing control. After that, processing proceeds to step 803 and sets a limit rate Vs on the required valve timing change rate Vreq.

After this, processing proceeds to step 804 and executes reference position learning. In this reference position learning, in a state where the valve timing has been controlled to a reference position (for example, when the most retarded angle position is used as a reference position, the state of the moving part of the phase-varying mechanism 21 having abutted with a retarded angle side stopper part), an actual valve timing VT is calculated and this is learned as the reference position.

After that, when in step 801 it is determined that reference position learning has been completed, processing proceeds to step 805 and permits normal variable valve timing control. After that, processing proceeds to step 806 and cancels the limit rate Vs on the required valve timing change rate Vreq.

In the eleventh embodiment described above, until reference position learning is completed, normal variable valve timing control is prohibited and only reference position learning is made executable. Consequently, reference position learning can be completed and detection accuracy of the actual valve timing VT ensured before processing shifts to normal variable valve timing control.

Twelfth Embodiment

Even when reference position learning has been completed, if an abnormality has occurred in reference position learning and a reference position is mis-learned, the detection error of the actual valve timing VT becomes large. Consequently, when the valve timing is controlled to or near to a limit position of its variation range, there is a possibility of the moving part of the phase-varying mechanism 21 striking the stopper part at high speed.

Figure 29:
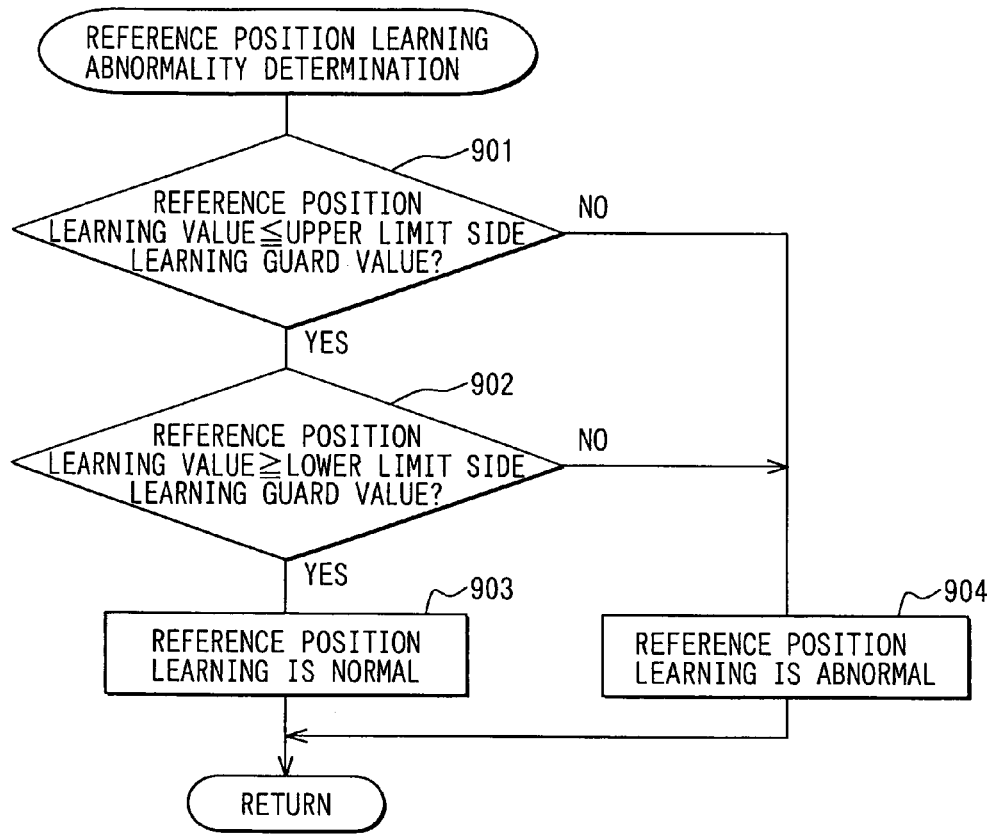
FIG. 29 is a flow chart showing the flow of processing of a reference position learning abnormality determination program of a twelfth embodiment.
Figure 30:
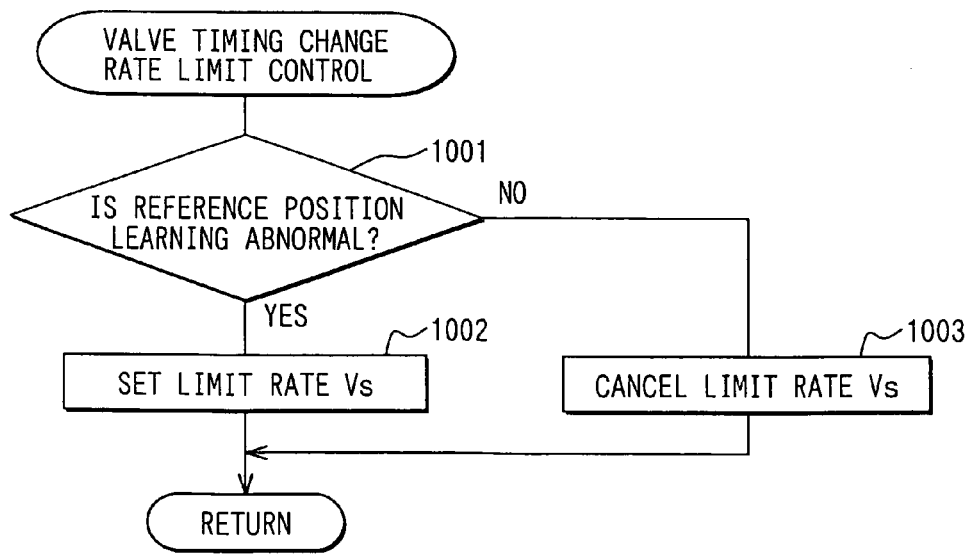
FIG. 30 is a flow chart showing the flow of processing of a valve timing change rate limit control program of the twelfth embodiment.

To avoid this, in a twelfth embodiment of the invention, a reference position learning abnormality determination program shown in FIG. 29 and a valve timing change rate limit control program shown in FIG. 30 are executed. By means of these programs it is possible to determine whether there has been an abnormality of reference position learning, and, when it is determined that there has been an abnormality in reference position learning, to set a limit rate Vs on the required valve timing change rate Vreq and execute rate-limiting control.

The reference position learning abnormality determination program shown in FIG. 29 is executed for example with a predetermined period after an ignition switch is turned on, and performs the role of learning abnormality determination means referred to in the Scope of Patent Claim. When this program is started, first, in a step 901, it is determined whether or not the present reference position learning value VT0 is below an upper limit side learning guard value VTGmax. In step 902, it is determined whether or not the present reference position learning value VT0 is above a lower limit side learning guard value VTGmin. Here, the upper limit side learning guard value VTGmax and the lower limit side learning guard value VTGmin are values set with regard to a normal range of dispersion of the reference position arising from individual differences between systems, change over time and so on.

If the reference position learning value VT0 is in the normal range (VTGmin≦VT0≦VTGmax) between the upper limit side learning guard value VTGmax and the lower limit side learning guard value VTGmin, processing proceeds to step 903 and determines that there has been no abnormality of reference position learning (it is normal).

Conversely, if the reference position learning value VT0 is larger than the upper limit side learning guard value VTGmax or smaller than the lower limit side learning guard value VTGmin, that is, when the reference position learning value VT0 is not contained within the range between the upper and lower side learning guard values VTGmax, VTGmin, processing proceeds to step 904. In step 904, it is determined that there has been an abnormality of reference position learning (reference position mis-learning).

And when the valve timing change rate limit control program shown in FIG. 30 is started, first, in a step 1001, it is determined whether or not reference position learning is abnormal (whether or not the reference position has been mis-learned) on the basis of the abnormality determination result of the reference position learning abnormality determination program of FIG. 29 described above.

When the result is that it has been determined that reference position learning is abnormal (the reference position has been mis-learned), because the detection accuracy of the actual valve timing VT is decreased (the detection error is increased), it can be inferred that there is a possibility of the moving part of the phase-varying mechanism 21 striking the stopper part at high speed. Therefore, processing proceeds to step 1002 and sets a limit rate Vs for limiting the required valve timing change rate Vreq and executes rate-limiting control.

On the other hand, when in step 1001 it is determined that reference position learning is normal, processing proceeds to step 1003 and cancels the limit rate Vs on the required valve timing change rate Vreq.

In the foregoing twelfth embodiment, when it is determined that reference position learning is abnormal (the reference position has been mis-learned), rate-limiting control limiting the required valve timing change rate Vreq to below a limit rate Vs is executed. Consequently, even when the reference position is mis-learned and the detection error of the actual valve timing VT increases, the moving part of the phase-varying mechanism 21 hitting the stopper part at high speed can be avoided, and it is possible to prevent grinding and damage of the gear mechanism.

In the twelfth embodiment also, the target valve timing calculation program of FIG. 26 may be executed, so that when variable valve timing control is carried out with reference position learning abnormal a target valve timing VTtg in accordance with a valve timing change rate limited to below a limit rate Vs by rate-limiting control is set.

Thirteenth Embodiment

Figure 31:
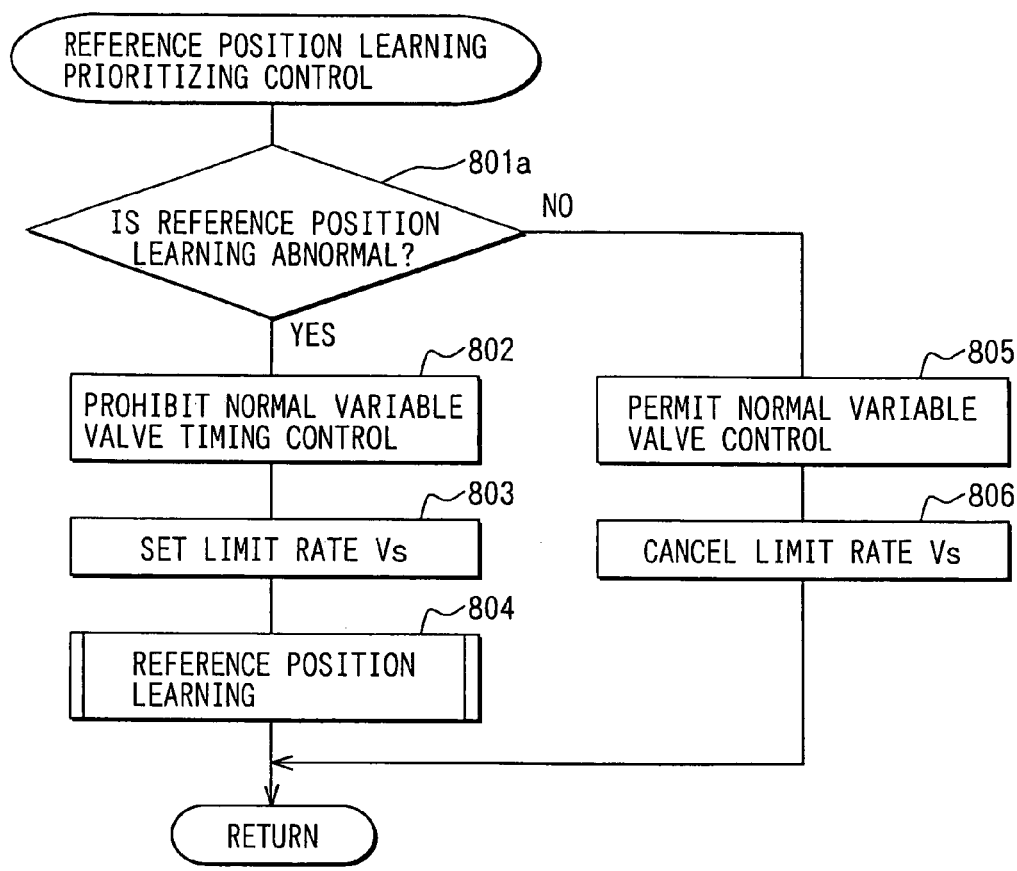
FIG. 31 is a flow chart showing the flow of processing of a reference position learning prioritizing control program of a thirteenth embodiment.

In a thirteenth embodiment of the invention, by a reference position learning prioritizing control program shown in FIG. 31 being executed, normal variable valve timing control is prohibited and only reference position learning is executable until reference position learning is determined to be normal.

The reference position learning prioritizing control program shown in FIG. 31 is one obtained by changing the processing of step 801 of FIG. 28 to processing of a step 801a, and the processing of the other steps is the same as in FIG. 28.

In this program, first, in the step 801a, it is determined whether or not reference position learning is abnormal (whether or not the reference position has been mis-learned) on the basis of the abnormality determination result of the reference position learning abnormality determination program of FIG. 29 described above.

When the result is that it has been determined that reference position learning is abnormal, normal variable valve timing control is prohibited and a limit rate Vs is set on the required valve timing change rate Vreq, and then reference position learning is executed (steps 802 to 804). After that, when in step 801a it is determined that reference position learning is normal, normal variable valve timing control is permitted and the limit rate Vs on the required valve timing change rate Vreq is canceled (steps 805, 806).

In the thirteenth embodiment described above, normal variable valve timing control is prohibited and only reference position learning is executed until it is determined that reference position learning is normal. Consequently, reference position learning can be completed normally and detection accuracy of the actual valve timing VT can be ensured before processing shifts to normal variable valve timing control.

Fourteenth Embodiment

The motor-driven variable valve timing device 18 (see FIG. 2) can also be controlled before the engine 11 is started (while the engine is stopped). So, in a fourteenth embodiment, by a pre-starting reference position learning control program shown in FIG. 32 being executed, reference position learning is executed before starting of the engine 11 (before cranking).

Figure 32:
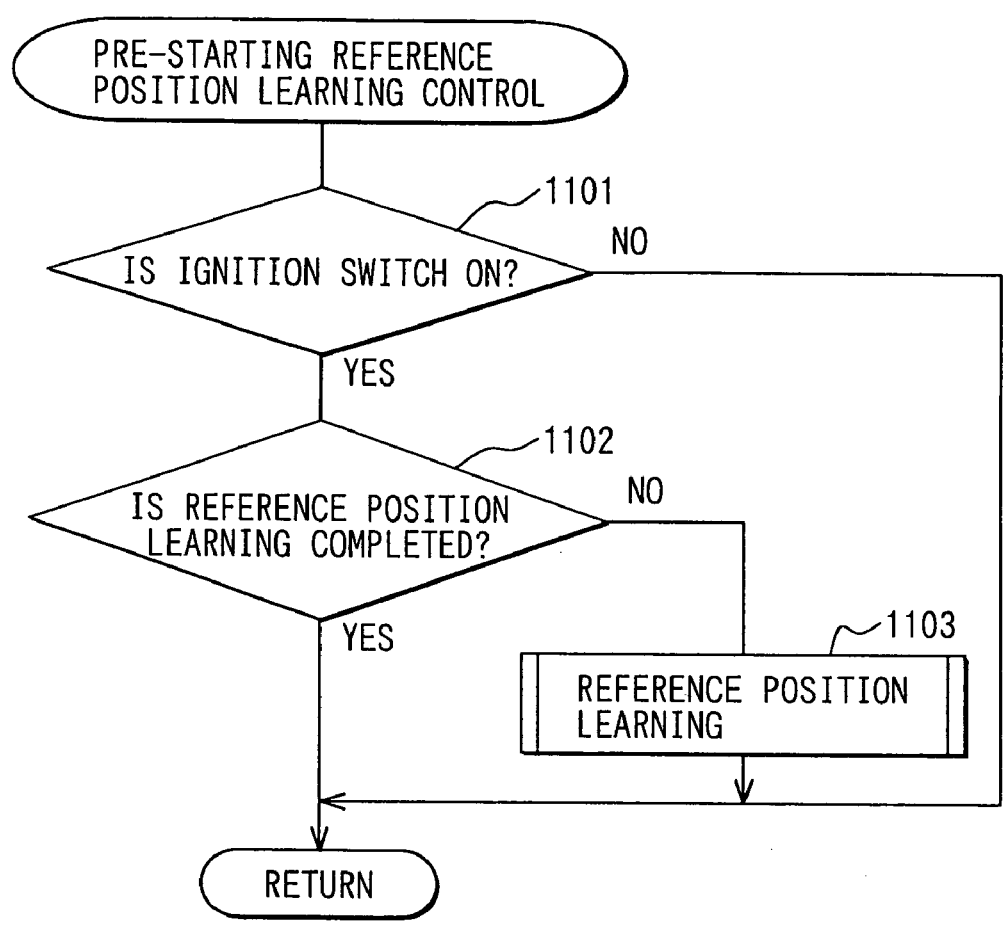
FIG. 32 is a flow chart showing the flow of processing of a pre-starting reference position learning control program of a fourteenth embodiment.

The pre-starting reference position learning control program shown in FIG. 32 is executed with a predetermined period from immediately after the power supply to the ECU 30 is turned on (immediately after an ignition switch is turned from an OFF position to an ACC position or an ON position). When this program is started, first, in a step 1101, it is determined whether or not the ignition switch has been turned to the ON position. When the ignition switch has been turned to the ON position, processing proceeds to step 1102 and determines whether or not reference position learning has been completed. If reference position learning has not yet been completed, processing proceeds to step 1103 and executes reference position learning.

Because by this processing reference position learning is executed before starting of the engine 11, the actual valve timing VT can be detected accurately from when the engine 11 is started. Therefore, the actual valve timing VT can be accurately controlled to a target valve timing VTtg suitable for cranking, and the startability of the engine 11 can be improved.

Fifteenth Embodiment

Figure 33:
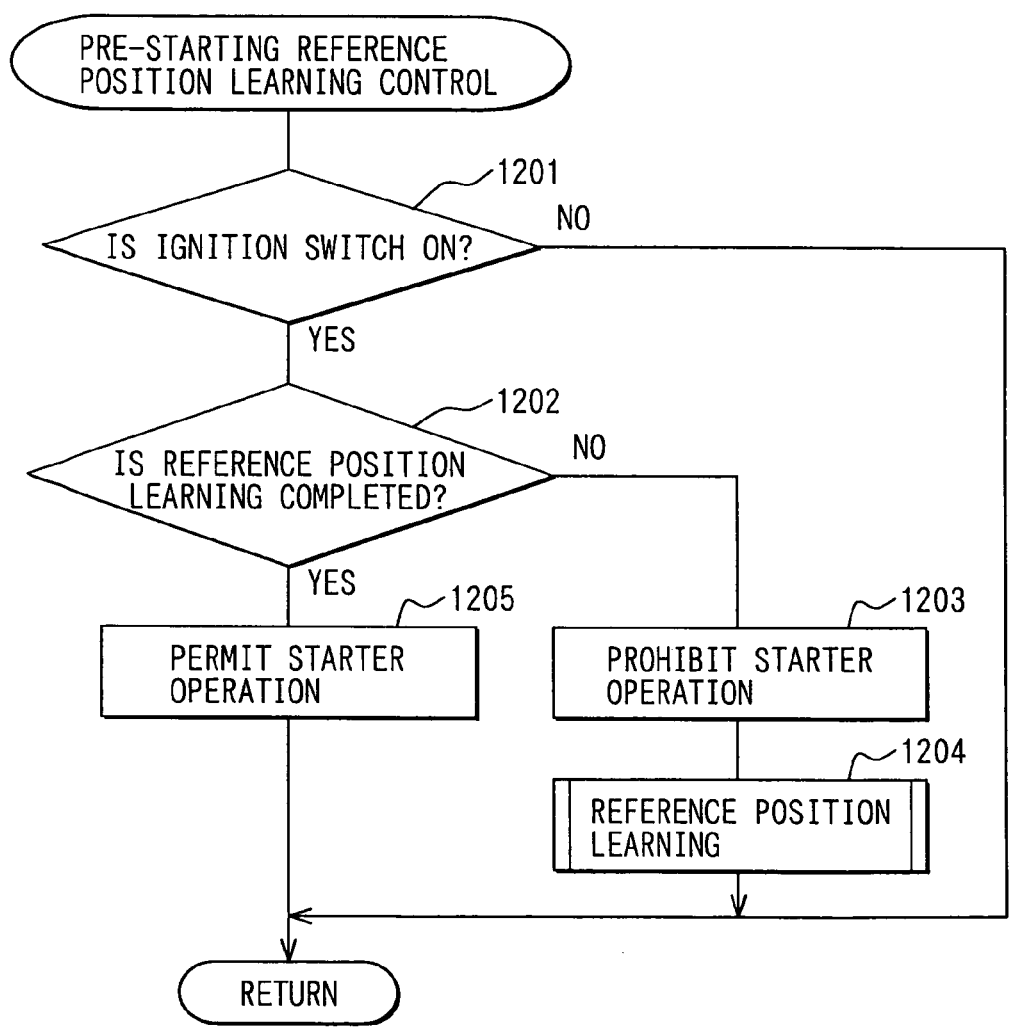
FIG. 33 is a flow chart showing the flow of processing of a pre-starting reference position learning control program of a fifteenth embodiment.

In a fifteenth embodiment, by a pre-starting reference position learning control program shown in FIG. 33 being executed, reference position learning is executed before the engine 11 is started, and start control (starter operation) of the engine 11 is prohibited until reference position learning is completed.

When the pre-starting reference position learning control program shown in FIG. 33 is started, first, in a step 1201, it is determined whether or not an ignition switch has been turned to an ON position. When the ignition switch has been turned to the ON position, processing proceeds to step 1202 and determines whether or not reference position learning has been completed. When reference position learning has not yet been completed, processing proceeds to step 1203 and prohibits operation of a starter of the engine 11 (cranking). After that, processing proceeds to step 1204 and executes reference position learning. The processing of the above-mentioned step 1203 performs the role of starting prohibition means referred to in the Scope of Patent Claim.

After that, when in step 1202 it is determined that reference position learning has been completed, processing proceeds to step 1205 and permits operation of the starter of the engine 11. After this, if the ignition switch is turned to a START position, the starter operates and the engine 11 is started.

In the fifteenth embodiment described above, because operation of the starter is prohibited until reference position learning completes, operation of the starter can be prevented from being commenced before the completion of reference position learning. In other words, reference position learning can be completed certainly before operation of the starter is commenced and the engine 11 is started.

Sixteenth Embodiment

Figure 34:
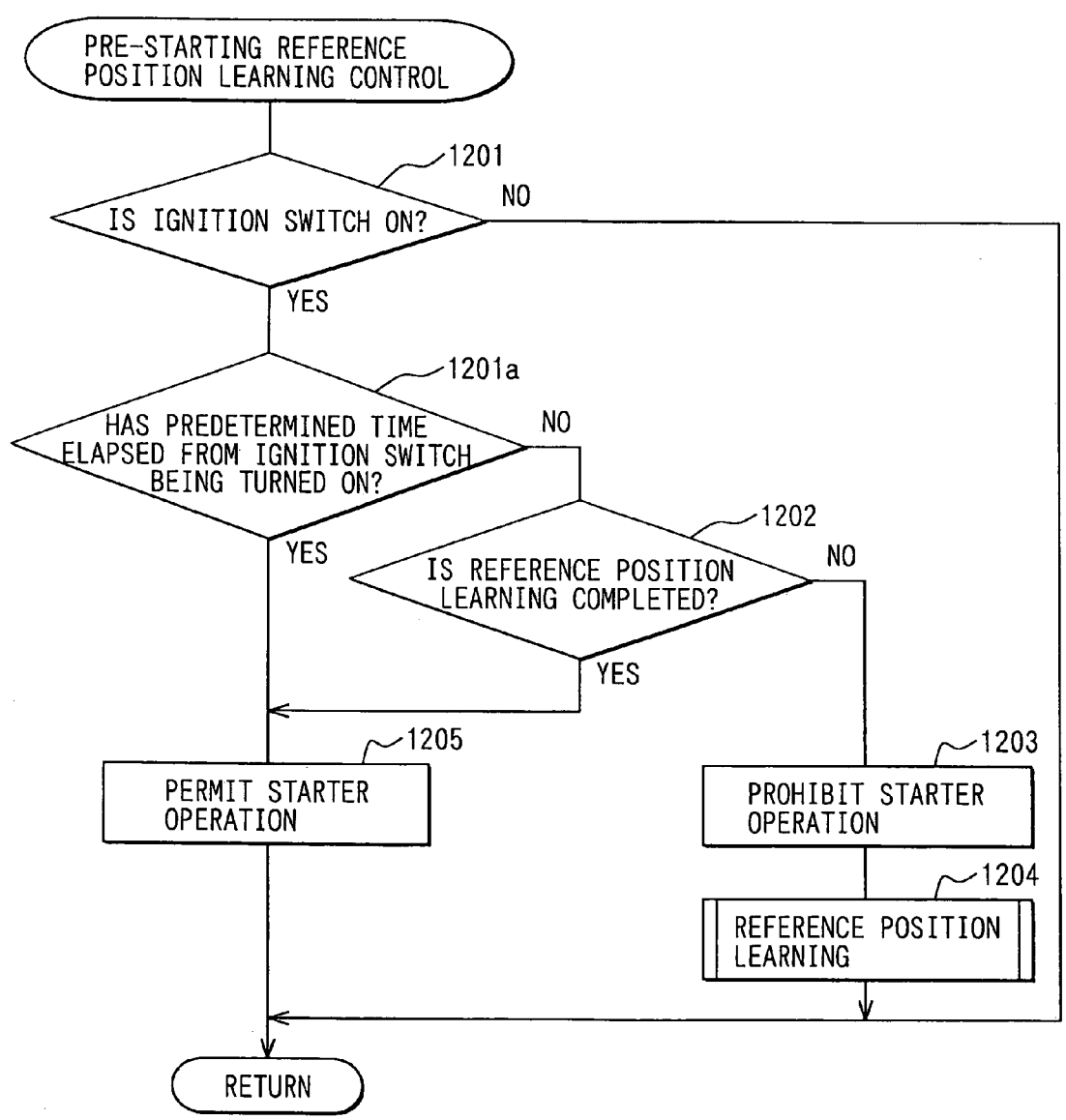
FIG. 34 is a flow chart showing the flow of processing of a pre-starting reference position learning control program of a sixteenth embodiment.

In a sixteenth embodiment, by a pre-starting reference position learning control program shown in FIG. 34 being executed, the execution of processing for prohibiting start control of the engine 11 (operation of the starter) is limited to a predetermined time from when the ignition switch is turned on.

The pre-starting reference position learning control program shown in FIG. 34 is one obtained by adding the processing of a step 1201*a* after the processing of step 1201 of FIG. 33, and the processing of the other steps is the same as in FIG. 33.

In this program, after it is determined in step 1201 that the ignition switch has been turned on (operated to an ON position) processing proceeds to step 1201*a* and determines whether or not a predetermined time has elapsed from the ignition switch being turned on. If the predetermined time from the ignition switch being turned on has not yet elapsed, operation of the starter of the engine 11 is prohibited by the processing of step 1202 and step 1203. And after reference position learning has completed, operation of the starter of the engine 11 is permitted (step 1205).

When on the other hand the predetermined time from the ignition switch being turned on elapses before reference position learning completes, processing proceeds from step 1201*a* to step 1205 and permits operation of the starter of the engine 11 even before completion of reference position learning.

In the sixteenth embodiment described above, processing for prohibiting the operation of the starter of the engine 11 until reference position learning completes is executed only within a predetermined period from when the ignition switch is turned on. Consequently, even when for some reason reference position learning cannot be completed within a predetermined period from when the ignition switch is turned on, starting control of the engine 11 (starter operation) can be commenced thereafter, and problems of the engine 11 becoming unstartable can be prevented.

Although in the foregoing eighth to sixteenth embodiments the invention was applied to a variable valve timing control device for intake valves, there is no limitation to this, and alternatively the invention may be applied to a variable valve timing control device for exhaust valves. Also, the construction of the variable valve timing device 18 may be changed as necessary, and in short it may be any valve timing control device for varying valve timing that uses a gear mechanism. And, the drive source of the variable valve timing device also is not limited to a motor, and as long as it uses a gear mechanism the invention can be applied to a variable valve timing device having hydraulic pressure as a drive source.

Besides this the invention can be implemented with any of various other changes, and for example can be implemented by arbitrarily combining any of the eighth to sixteenth embodiments described above.

Seventeenth Embodiment

A seventeenth embodiment of the invention will now be described.

A motor-driven variable valve timing device has the characteristic that it can vary the valve timing irrespective of the running state of the engine. Therefore, variable valve timing control can be carried out even when the engine is starting or stopping. However, when the engine is starting or stopping, reverse rotation of the engine sometimes occurs. On starting or stopping of the engine, when the engine reverse-rotates while variable valve timing control is being executed, the following kind of problem arises.

The calculation of the actual valve timing based on the output signals of the crank angle sensor and the cam angle sensor is carried out on the premise that the engine is rotating forward; that is, that the crankshaft and the camshaft are rotating forward. Because of this, when the engine reverse-rotates, the actual valve timing is mis-calculated. Therefore, when the engine reverse-rotates during variable valve timing control on engine starting or stopping, the variable valve timing device is controlled on the basis of a mis-calculated actual valve timing.

Therefore, it is an object of the seventeenth embodiment to provide a variable valve timing control device of an internal combustion engine that previously can prevent problems relating to variable valve timing control arising as a result of reverse rotation of the internal combustion engine and can raise the controllability of the internal combustion engine at times of starting and stopping.

First, a variable valve timing control device of an internal combustion engine according to the seventeenth embodiment will be described in outline. A variable valve timing control device according to the seventeenth embodiment is one that, in a system wherein a variable valve timing device for varying the valve timing of intake valves or exhaust valves by means of a drive source provided separately from the internal combustion engine is controlled by valve timing control means, determines the state of rotation of the internal combustion engine with rotation state determining means and performs actual valve timing calculation and/or variable valve timing control when determining that the internal combustion engine is rotating forward or is stopped.

If this is done, the state of rotation of the internal combustion engine can be monitored and it can be arranged that actual valve timing calculation and variable valve timing control are carried out only when the internal combustion engine is rotating forward or stopped. When on the other hand reverse rotation of the internal combustion engine has occurred, actual valve timing calculation and normal variable valve timing control based on output signals from a cam angle sensor and a crank angle sensor can be stopped. By this means, even when reverse rotation of the internal combustion engine occurs on starting or stopping of the internal combustion engine, it is possible to prevent deterioration of valve timing control accuracy resulting from reverse rotation, and the control quality of variable valve timing control on starting and stopping of the internal combustion engine can be increased.

In this case, preferably, the state of rotation of the internal combustion engine is determined on the basis of output signals of a crank angle sensor and/or a cam angle sensor. A crank angle sensor outputs a crank angle signal at intervals of a predetermined crank angle, and a cam angle sensor outputs a cam angle signal at intervals of a predetermined cam angle. Therefore, by monitoring the output signals of the crank angle sensor or the cam angle sensor it is possible to distinguish whether the internal combustion engine is rotating or stopped.

Also, preferably, when the internal combustion engine is rotating and it is determined that the engine speed at the time when a starter is being turned on or when the starter is turned off is above a predetermined value, it is determined that the internal combustion engine is rotating forward. When a starter is on, because the internal combustion engine is forcibly driven to rotate forward by the drive power of the starter, it can be determined that the internal combustion engine is rotating forward. And although if the starter is turned off when the engine speed has not risen sufficiently there is a possibility of the internal combustion engine reverse-rotating, when the starter is turned off after the engine speed has risen sufficiently, starting of the internal combustion engine completes normally and the internal combustion engine continues to rotate forward even after the starter is turned off. Therefore, if an internal combustion engine is rotating and it is determined that the engine speed is above a predetermined value at the time when the starter is turned off, it can be determined that the internal combustion engine is rotating forward.

Now, when the internal combustion engine is stopped, because no signals are outputted from the crank angle sensor and the cam angle sensor, it is not possible to carry out a calculation of actual valve timing based on output signals of the crank angle sensor and the cam angle sensor.

So, preferably, when variable valve timing control is to be executed while the internal combustion engine is stopped, the amount of actuation of the variable valve timing device after the engine stops is controlled to match the actual valve timing to the target valve timing. The amount of actuation of the variable valve timing device after the engine stops constitutes a parameter expressing the valve timing variation subsequent to the engine stopping. Therefore, by controlling the amount of actuation of the variable valve timing device after the engine stops, it is possible to control the valve timing variation from an actual valve timing calculated immediately before the engine stopped. By this means, without calculating the actual valve timing directly while the engine is stopped, it is possible to match the actual valve timing of while the engine is stopped (the actual valve timing of immediately before the engine stopped+the valve timing variation) to a target valve timing indirectly, and variable valve timing control can be executed accurately.

When variable valve timing control is to be executed while the internal combustion engine is stopped, in the case of a motor-driven variable valve timing device, preferably, the amount of rotation (number of revolutions, rotational angle, phase variation) of the motor is controlled as the amount of actuation of the variable valve timing device. By this means it is possible to execute variable valve timing control while the internal combustion engine is stopped with high accuracy.

And when it has been determined that the internal combustion engine has reverse-rotated, preferably, the actual valve timing is controlled to a reference position. In this way it is possible to reach a state of readiness for the next variable valve timing control swiftly.

When the reference position is set to a limit position of the variation range of the variable valve timing device (a most advanced angle position or a most retarded angle position), the actual valve timing may be controlled to the reference position while the internal combustion engine is reverse-rotating or while the internal combustion engine is stopped after it has reverse-rotated. When the reference position is set to a limit position of the variation range of the variable valve timing device, even if the actual valve timing is not known, the position at which a moving part of a phase-varying mechanism of the variable valve timing device strikes an advanced angle side or retarded angle side stopper part becomes the reference position (most advanced angle position or most retarded angle position). Therefore, at any time while the internal combustion engine is reverse-rotating or stopped, the actual valve timing can be controlled to the reference position.

In this case, preferably, it is determined on the basis of a control output to the variable valve timing device whether or not the actual valve timing has reached the reference position set to a limit position of the variation range of the variable valve timing device. That is, it can be determined whether or not the actual valve timing has reached the reference position on the basis of whether or not a control output to the variable valve timing device exceeds a predetermined value needed to make the actual valve timing reach the reference position (make the moving part of the phase-varying mechanism hit the stopper part).

On the other hand, when the reference position has been set to an intermediate position in the variation range of the variable valve timing device, preferably, the actual valve timing is controlled to the reference position while the internal combustion engine is stopped after having reverse-rotated. When the reference position has been set to an intermediate position in the variation range of the variable valve timing device, if the actual valve timing is not known, the actual valve timing cannot be controlled to the reference position. Therefore, it is desirable to wait for the internal combustion engine to stop after reverse-rotating, and control the actual valve timing to the reference position after a state has been reached such that the actual valve timing can be found for example from a valve timing variation from a limit position.

A specific example of a variable valve timing control device of an internal combustion engine according to the seventeenth embodiment will now be described in detail on the basis of the drawings. The system construction of a variable valve timing control device according to the seventeenth embodiment is basically the same as that shown in FIG. 1 and FIG. 2 and so will not be described again here.

The ECU 30 in the seventeenth embodiment, by executing the valve timing control programs shown in FIG. 35 through FIG. 40, functions as rotation state determining means and valve timing control means, and controls the variable valve timing device 18 while monitoring the state of rotation of the engine 11.

Figure 41:
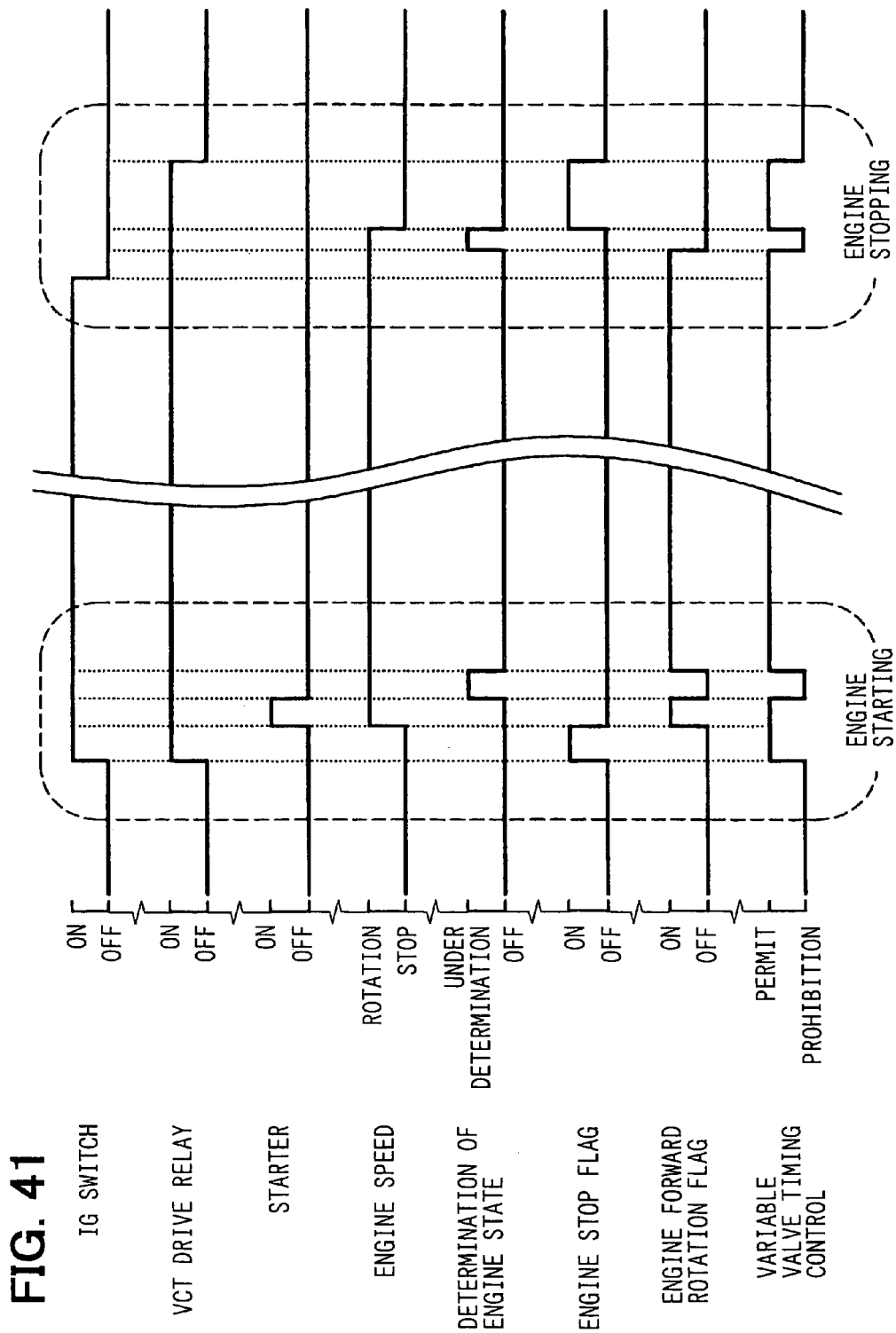
FIG. 41 is a time chart showing an example of variable valve timing control in the seventeenth embodiment.

In the seventeenth embodiment, as shown in FIG. 41, when an ignition switch (hereinafter, "IG switch") is turned on, a variable valve timing device driving relay (hereinafter, "VCT drive relay") is turned on, and a power supply voltage is supplied from a battery (not shown) to the ECU 30 and the variable valve timing device 18 and so on. And even after the IG switch is turned off, the ON state of the VCT drive relay is maintained until a predetermined time elapses, and the power supply voltage continues to be supplied to the ECU 30 and the variable valve timing device 18 and so on. And when the predetermined time has elapsed from the IG switch being turned off, the VCT drive relay is turned off, and the supply of the power supply voltage to the ECU 30 and the variable valve timing device 18 and soon is stopped. As a result, even while the engine is stopped, the variable valve timing device 18 can be controlled until the VCT drive relay is turned off.

The ECU 30 determines the state of rotation (forward rotation/reverse rotation/stopped) of the engine 11 on the basis of the output signals from the crank angle sensor 20 and the cam angle sensor 19 and an on/off signal of a starter (not shown). When it has determined that the engine 11 is rotating forward or stopped, it performs actual valve timing calculation and variable valve timing control. When a reverse rotation of the engine 11 has occurred, actual valve timing calculation and variable valve timing control are stopped.

During forward rotation of the engine 11, a target valve timing is calculated on the basis of the running state of the engine and so on, and an actual valve timing is calculated on the basis of the output signals of the crank angle sensor 20 and the cam angle sensor 19. And the motor 26 of the variable valve timing device 18 is feedback-controlled so as to make the actual valve timing match the target valve timing.

On the other hand, while the engine 11 is stopped, because no signals are outputted from the crank angle sensor 20 and the cam angle sensor 19, it is not possible to perform calculation of an actual valve timing based on the output signals of the crank angle sensor 20 and the cam angle sensor 19. So, while the engine 11 is stopped, the amount of rotation (number of revolutions, angle of rotation, phase variation) of the motor 26 of the variable valve timing device 18 after the engine stops is controlled to bring the actual valve timing to the target valve timing. That is, because the amount of rotation of the motor 26 after the engine stops is a parameter expressing the valve timing variation since the engine stopped, by controlling the amount of rotation of the motor 26 after the engine stops it is possible to control the valve timing variation from the actual valve timing calculated immediately before the engine stopped. By this means it is possible to bring the actual valve timing while the engine is stopped (the actual valve timing immediately before the engine stopped+the valve timing variation) to a target valve timing indirectly, without directly calculating the actual valve timing while the engine is stopped.

And, if it is determined that the engine 11 has rotated backward, differently from normal variable valve timing control, the actual valve timing is swiftly brought to a state of readiness for the next variable valve timing control by being controlled to a reference position. This reference position is set for example to a limit position (a most advanced angle position or a most retarded angle position) of the variation range of the variable valve timing device 18.

The processing content of the valve timing control programs shown in FIG. 35 through FIG. 40 executed by the ECU 30 will now be described.

[Main Valve Timing Control]

Figure 35:
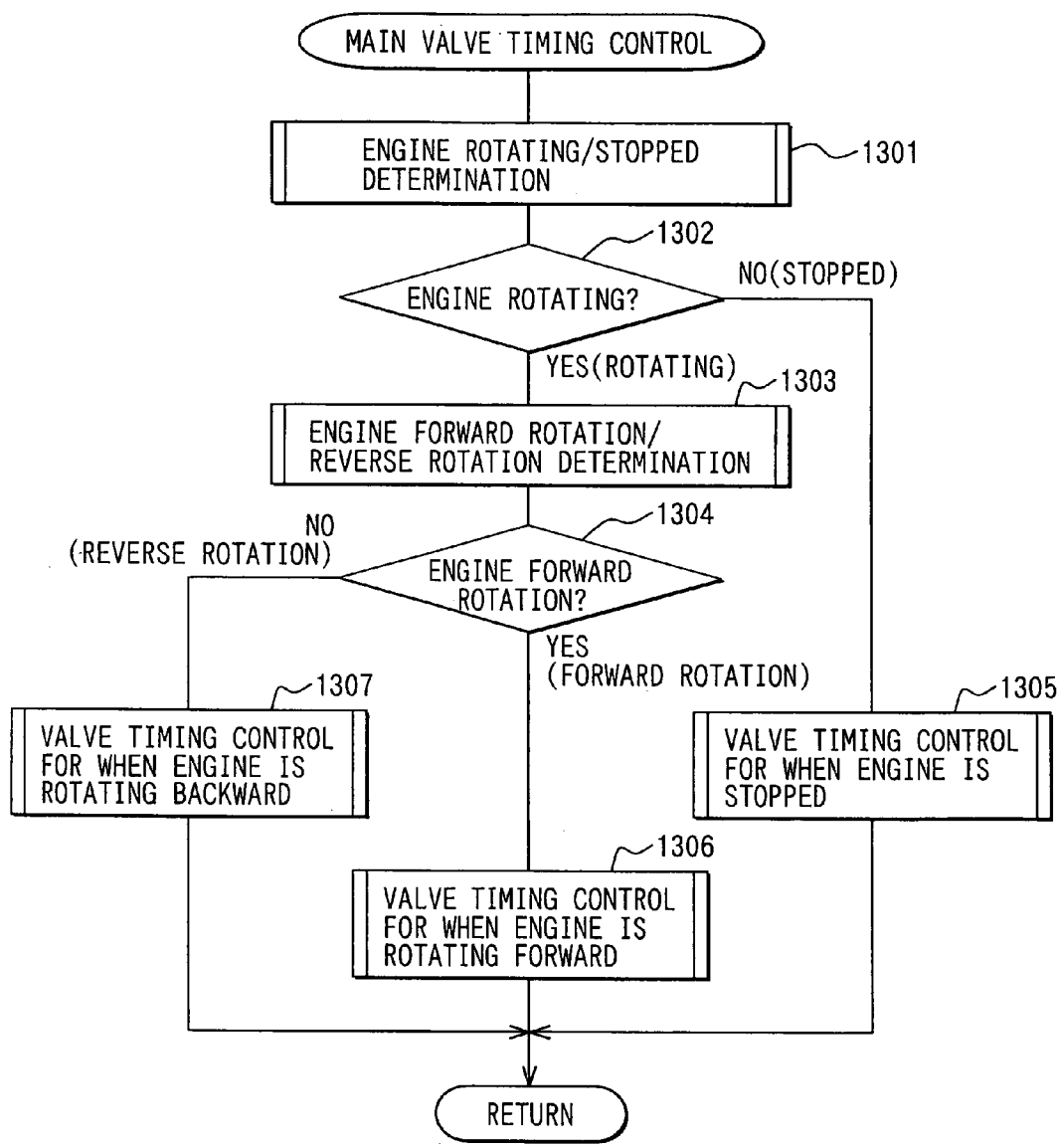
FIG. 35 is a flow chart showing the flow of processing of a main valve timing control program of a seventeenth embodiment.

The main valve timing control program shown in FIG. 35 is executed with a predetermined period from when the IG switch is turned on to when the VCT drive relay turns off. When this program is started, first, in a step 1301, an engine rotating/stopped determination is carried out on the basis of the output signals of the crank angle sensor 20. The engine rotating/stopped determination may alternatively be carried out on the basis of the output signals of the cam angle sensor 19.

After this, processing proceeds to step 1302 and determines whether or not the engine is rotating on the basis of the determination result of step 1301. If it is determined that the engine is not rotating (that the engine is stopped) processing proceeds to step 1305 and executes a valve timing control program for when the engine is stopped shown in FIG. 38, which will be further discussed later, and the present program ends.

On the other hand, when in step 1302 it is determined that the engine is rotating, processing proceeds to step 1303 and executes an engine forward rotation/reverse rotation determination program shown in FIG. 33, which will be further discussed later, and thereby performs an engine forward rotation/reverse rotation determination on the basis of an on/off signal from a starter (not shown). After this, processing proceeds to step 1304 and determines whether or not the engine is rotating forward on the basis of the determination result of step 1303. If it is determined that the engine is rotating forward, processing proceeds to step 1306 and executes a valve timing control program for when the engine is rotating forward shown in FIG. 37, which will be further discussed later, and the present program ends. When on the other hand in step 1304 it is determined that the engine is not rotating forward (i.e. the engine is rotating backward), processing proceeds to step 1307 and executes a valve timing control program for when the engine is rotating backward shown in FIG. 39, which will be further discussed later, and the present program ends.

[Engine Forward/Reverse Rotation Determination]

Figure 36:
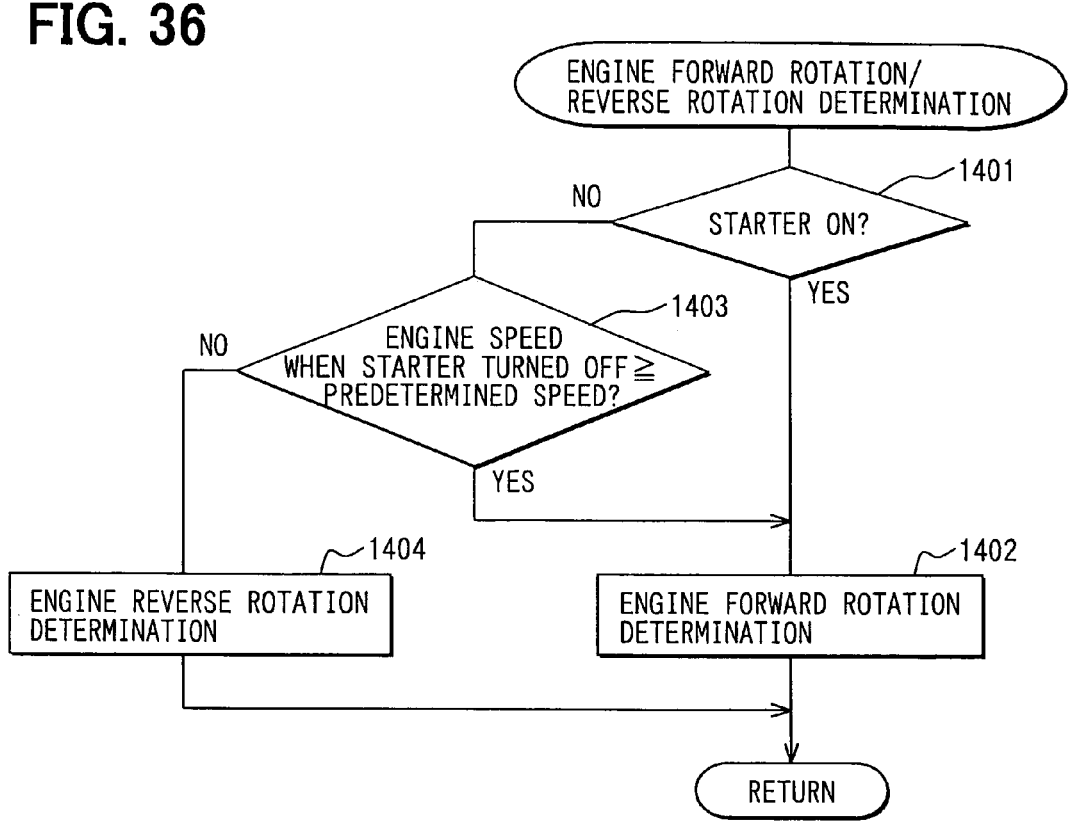
FIG. 36 is a flow chart showing the flow of processing of an engine forward rotation/backward rotation determination program of the seventeenth embodiment.

When in step 1303 of the main valve timing control program of FIG. 35 the engine forward rotation/reverse rotation program of FIG. 36 is started, first, in a step 1401, it is determined whether or not the starter has been turned on. If as the result it is determined that the starter has been turned on, it is determined that the engine 11 is being forcibly driven to rotate forward by the drive power of the starter, and processing proceeds to step 1402. In step 1402 it is determined that the engine is rotating forward, and the present program ends.

When on the other hand it is determined in step 1401 that the starter has not been turned on (i.e. that the starter is off), processing proceeds to step 1403. In step 1403 it is determined whether or not the engine speed at the point in time at which the starter was turned off was above a predetermined speed such that forward rotation can be maintained. When it is determined that the engine speed when the starter turned off was above the predetermined speed, because the engine speed rose sufficiently before the starter was turned off, it can be inferred that starting of the engine 11 completed normally and that even after the starter was turned off the engine 11 has continued to rotate forward. Accordingly, processing proceeds to step 1402 and determines that the engine is rotating forward, whereupon the present program ends.

With respect to this, when in step 1403 it is determined that the engine speed when the starter turned off was below the predetermined speed, because the starter was turned off before the engine speed had risen sufficiently, there is a possibility that the engine 11 has rotated backward since the starter was turned off. Therefore, processing proceeds to step 1404 and determines that the engine is rotating backward, whereupon the present program ends.

[Valve Timing Control while Engine Rotating Forward]

Figure 37:
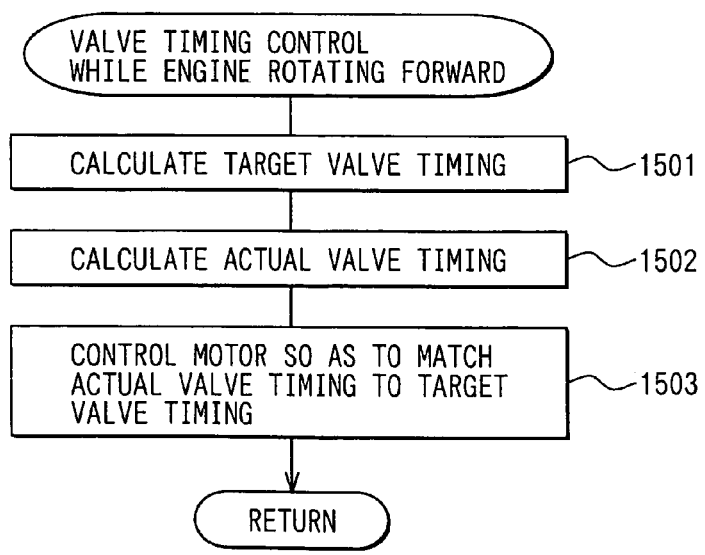
FIG. 37 is a flow chart showing the flow of processing of a valve timing control program for forward engine rotation in the seventeenth embodiment.

When in step 1306 of the main valve timing control program of FIG. 35 the valve timing control program for when the engine is rotating forward shown in FIG. 37 is started, first, in a step 1501, a target valve timing is calculated on the basis of the running state of the engine and so on. After that, processing proceeds to step 1502 and calculates an actual valve timing for example from crank angle signals outputted from the crank angle sensor 20 and cam angle signals outputted from the cam angle sensor 19.

After this, processing proceeds to step 1503 and feedback-controls the motor 26 of the variable valve timing device 18 so as to make the actual valve timing match the target valve timing.

As this valve timing control for when the engine is rotating forward, alternatively the same control as in for example the foregoing first embodiment may be carried out.

[Valve Timing Control while Engine Stopped]

Figure 38:
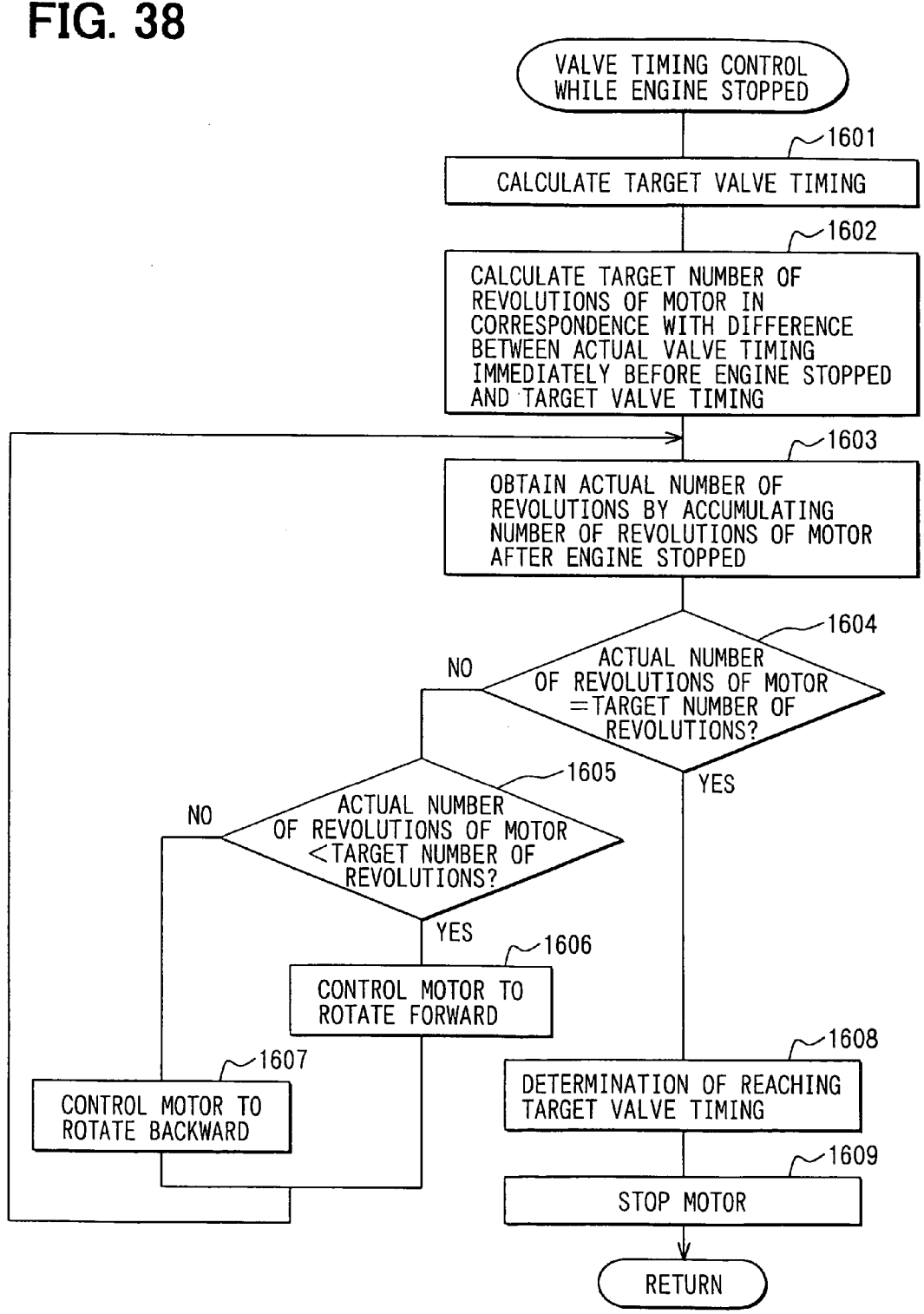
FIG. 38 is a flow chart showing the flow of processing of a valve timing control program for a stopped engine in the seventeenth embodiment.

When in step 1305 of the main valve timing control program of FIG. 35 the valve timing control program for when the engine is stopped shown in FIG. 38 is started, first, in a step 1601, a target valve timing (for example a valve timing suited to a next engine start) is calculated. After that, processing proceeds to step 1602 and calculates a target number of revolutions of the motor 26 (target amount of rotation) in correspondence with the difference between-the actual valve timing calculated immediately before the engine stopped and the target valve timing (the target valve timing variation).

After that, processing proceeds to step 1603 and accumulates the number of revolutions (amount of rotation) of the motor 26 since the engine stopped to obtain an actual number of revolutions (actual amount of rotation) of the motor 26. The number of revolutions of the motor 26 for example is given a plus value in the forward rotation direction of the motor and a minus value in the reverse rotation direction of the motor.

After this, processing proceeds to step 1604 and determines whether or not the actual number of revolutions of the motor 26 since the engine stopped matches the target number of revolutions. When as the result it is determined that the actual number of revolutions of the motor 26 since the engine stopped does not match the target number of revolutions, processing proceeds to step 1605 and determines whether or not the actual number of revolutions of the motor 26 since the engine stopped is lower than the target number of revolutions. If the actual number of revolutions of the motor 26 is lower than the target number of revolutions, processing proceeds to step 1606 and controls the motor 26 to rotate forward before returning to step 1603. If on the other hand the actual number of revolutions of the motor 26 is greater than the target number of revolutions, processing proceeds to step 1607 and controls the motor 26 to rotate backward before returning to step 1603.

After that, when in step 1604 it is determined that the actual number of revolutions of the motor 26 since the engine stopped matches the target number of revolutions, processing proceeds to step 1608 and determines that the actual valve timing of the stopped engine (the actual valve timing of immediately before the engine stopped+the valve timing variation) has reached the target valve timing. After that, processing proceeds to step 1609 and stops the motor 26 and thereby holds the actual valve timing as of that time, and the present program ends.

[Valve Timing Control while Engine Rotating Backward]

Figure 39:
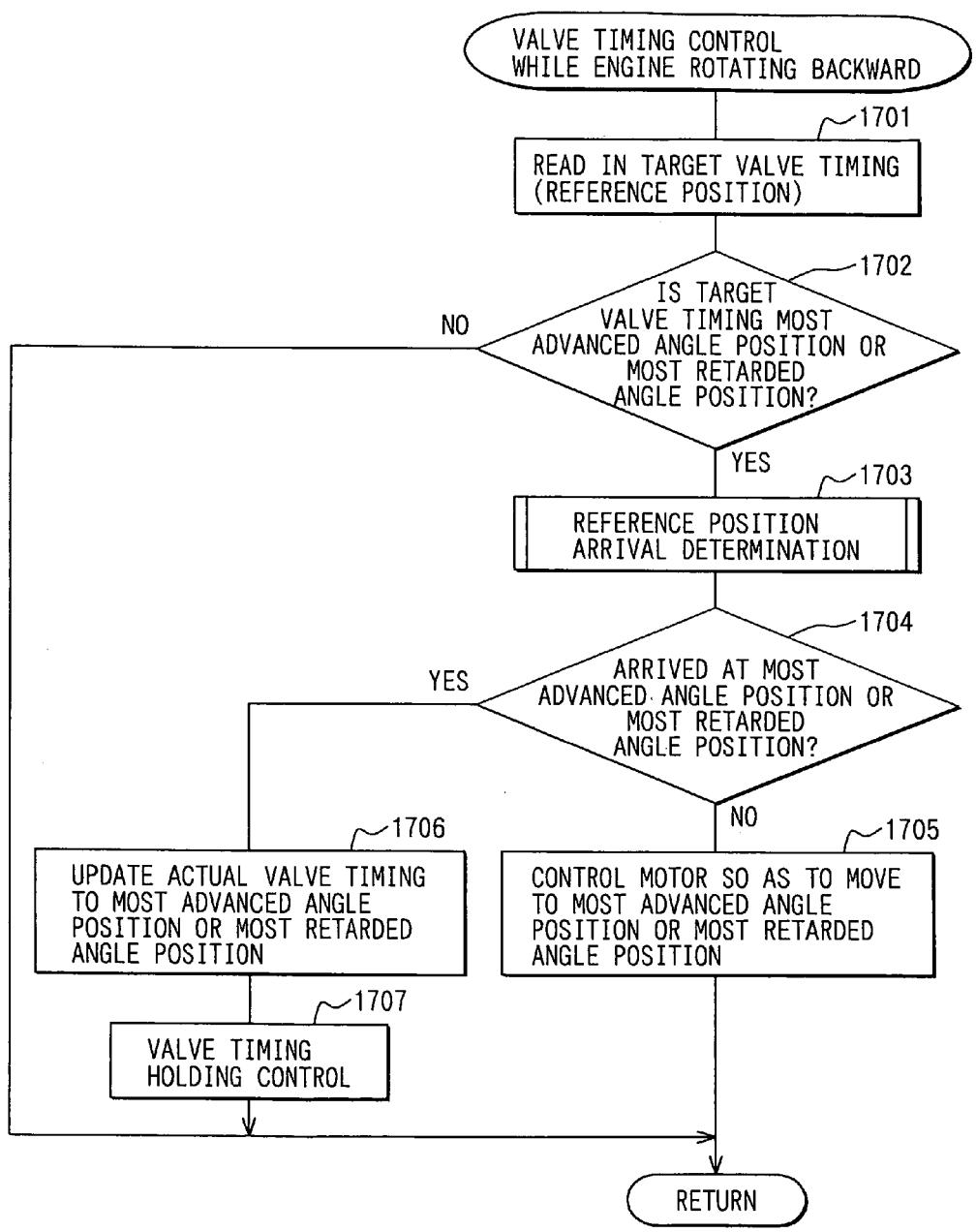
FIG. 39 is a flow chart showing the flow of processing of a valve timing control program for backward engine rotation in the seventeenth embodiment.

When in step 1307 of the main valve timing control program of FIG. 35 the valve timing control program for when the engine is rotating backward of FIG. 39 is started, first, in a step 1701, a reference position is read in as a target valve timing. As mentioned above, this reference position is set for example to a most advanced angle position or a most retarded angle position constituting a limit position of the variation range of the variable valve timing device 18.

After this, in step 1702, it is determined whether or not the target valve timing (reference position) is a most advanced angle position or a most retarded angle position, and if it is determined that the target valve timing (reference position) is a most advanced angle position or a most retarded angle position the processing of step 1703 onward is executed and the actual valve timing is controlled to the reference position (most advanced angle position or most retarded angle position) while the engine is rotating backward. When the reference position has been set to the most advanced angle position or the most retarded angle position, even if the actual valve timing is not known, the position at which a moving part of the phase-varying mechanism 21 of the variable valve timing device 18 hits an advanced angle side or retarded angle side stopper part becomes the reference position (most advanced angle position or most retarded angle position) Therefore, the actual valve timing can be controlled to the reference position in the following way even while the engine is rotating backward.

First, in step 1703, a reference position arrival determination program shown in FIG. 40, which will be further discussed later, is executed, and a determination of whether or not the actual valve timing has arrived at the reference position (most advanced angle position or most retarded angle position) is carried out on the basis of a control output to the motor 26.

After this, processing proceeds to step 1704 and determines whether or not the actual valve timing has arrived at the reference position (most advanced angle position or most retarded angle position) on the basis of the determination result of step 1703. When as the result it is determined that the actual valve timing has not reached the reference position (most advanced angle position or most retarded angle position), processing proceeds to step 1705 and outputs a control value of the motor 26 so that the actual valve timing moves in the direction of the reference position (most advanced angle position or most retarded angle position).

After that, when in step 1704 it was determined that the actual valve timing has reached the reference position (most advanced angle position or most retarded angle position), processing proceeds to step 1706 and updates a stored value of the actual valve timing to the reference position (most advanced angle position or most retarded angle position). After that, processing proceeds to step 1707 and controls the motor 26 to hold the present valve timing, and the present program ends.

Alternatively, the processing of steps 1703 to 1707 may be carried executed while the engine is stopped after rotating backward, and the actual valve timing thereby controlled to the reference position (most advanced angle position or most retarded angle position) while the engine is stopped after rotating backward.

On the other hand, when the reference position has been set to an intermediate position in the variation range of the variable valve timing device 18, in step 1702 the determination is "No", and the present program ends without the processing of steps 1703 to 1707 being executed. In this case, the actual valve timing is preferably controlled to the reference position (an intermediate position) while the engine is stopped after rotating backward. When the reference position has been set to an intermediate position in the variation range of the variable valve timing device 18, if the actual valve timing is not known, it is not possible to control the actual valve timing to the reference position (an intermediate position). Therefore, processing first waits until the engine has stopped after rotating backward, and controls the actual valve timing to the reference position after a state has been reached such that the actual valve timing can be found for example from a valve timing variation from a limit position.

[Reference Position Arrival Determination]

Figure 40:
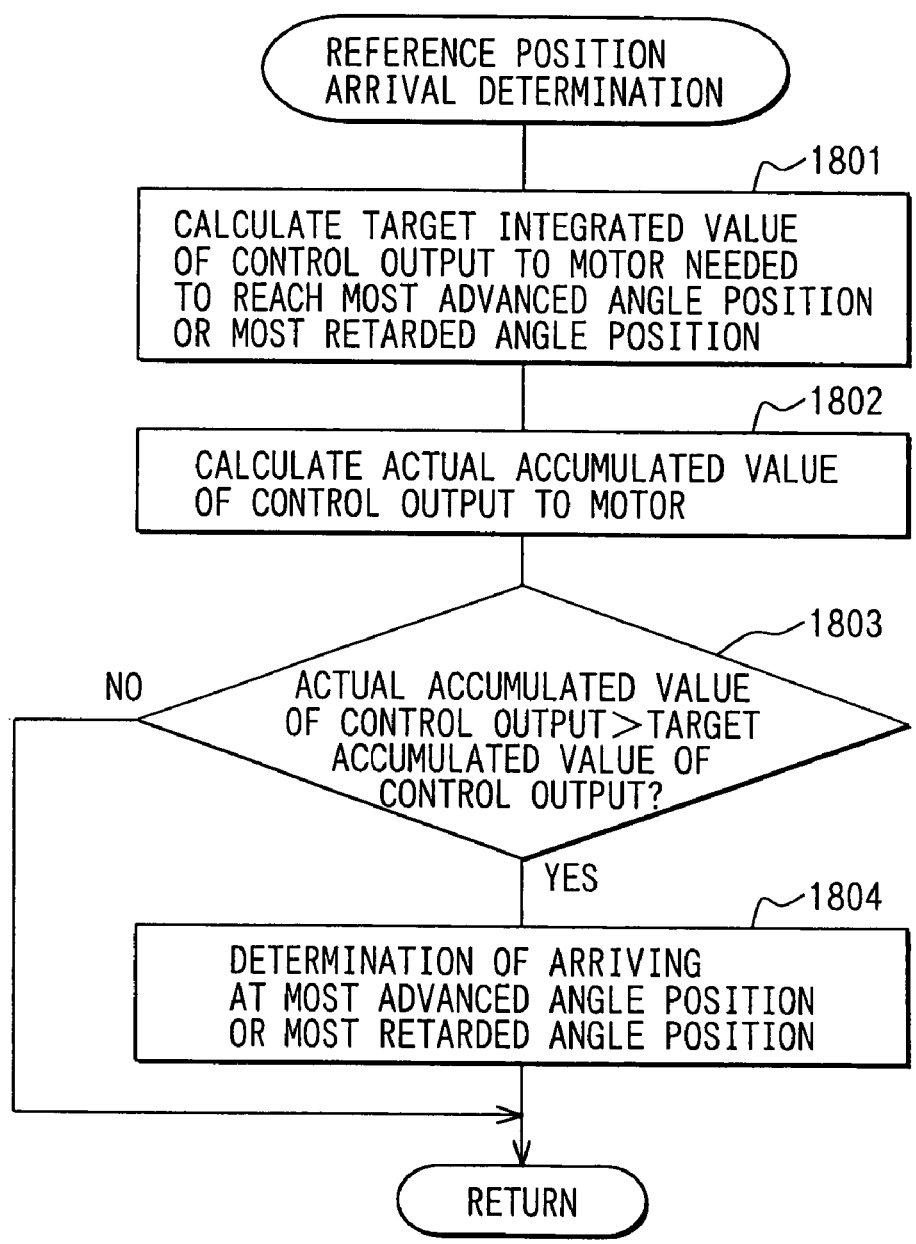
FIG. 40 is a flow chart showing the flow of processing of a reference position arrival determination program of the seventeenth embodiment.

When in step 1703 of the valve timing control program for while the engine is rotating backward of FIG. 39 the reference position arrival determination program of FIG. 40 is started, first, in a step 1801, a target accumulated value of the control output to the motor 26 needed to make the actual valve timing reach the reference position (most advanced angle position or most retarded angle position) (make the moving part of the phase-varying mechanism 21 hit the stopper part) is calculated. After that, processing proceeds to step 1802 and obtains an actual accumulated value of the control output to the motor 26 by accumulating the motor control value from when the motor 26 started to be controlled to move the actual valve timing in the direction of the reference position (most advanced angle position or most retarded angle position).

After this, processing proceeds to step 1803 and determines whether or not the actual accumulated value of the control output to the motor 26 has risen above the target accumulated value of the control output. When it is determined that the actual control output accumulated value of the motor 26 has risen above the target control output accumulated value, processing proceeds to step 1804 and infers that the actual valve timing has arrived at the reference position (most advanced angle position or most retarded angle position), and the present program ends.

An example of the seventeenth embodiment described above will be explained using the time chart of FIG. 41. When the engine 11 is started, while the engine is stationary between the IG switch being turned on (whereupon the VCT drive relay is turned on) and the starter being turned on, the valve timing control for when the engine is stopped is carried out. That is, the actual number of revolutions of the motor 26 since the engine stopped is controlled to a target number of revolutions to match the actual valve timing of the stopped engine to a target valve timing.

After that, while the starter is on and the engine is rotating forward, valve timing control for when the engine is rotating forward is executed. That is, the motor 26 of the variable valve timing device 18 is feedback-controlled to make an actual valve timing calculated on the basis of the output signals of the crank angle sensor 20 and the cam angle sensor 19 match a target valve timing.

Then, after the starter is turned off, if it is determined that the engine is rotating forward, valve timing control for when the engine is rotating forward is carried out again. However, when after the starter is turned off it is determined that the engine is rotating backward, actual valve timing calculation and variable valve timing control are stopped and the actual valve timing is returned to the reference position (most advanced angle position or most retarded angle position).

On stopping of the engine 11, on the other hand, while the engine is rotating forward immediately after the IG switch is turned off, valve timing control for when the engine is rotating forward is executed. After that, if it is determined that the engine has stopped, valve timing control for when the engine is stopped is executed until the VCT drive relay is turned off. However, when it is determined that the engine is rotating backward, actual valve timing calculation and variable valve timing control are stopped, and the actual valve timing is returned to the reference position (most advanced angle position or most retarded angle position).

In the seventeenth embodiment described above, the state of rotation of the engine 11 is monitored, and actual valve timing calculation and variable valve timing control are carried out only when the engine is rotating forward or stopped, and when backward rotation of the engine has occurred, actual valve timing calculation and variable valve timing control are stopped. Because of this, even when reverse rotation of the engine occurs on starting or stopping of the engine, it is possible to prevent deterioration of valve timing control accuracy resulting from reverse rotation, and the control quality of variable valve timing control on starting and stopping of the engine can be increased.

However, when the engine is stopped, it is not possible to carry out calculation of the actual valve timing based on output signals from the crank angle sensor 20 and the cam angle sensor 19. So, in this seventeenth embodiment, when variable valve timing control is to be executed while the engine is stopped, the actual number of revolutions of the motor 26 since the engine stopped is controlled to match a target number of revolutions, to make the actual valve timing of the stopped engine (the actual valve timing of immediately before the engine stopped+the valve timing variation) match the target valve timing. By this means it is possible to bring the actual valve timing of the stopped engine to the target valve timing indirectly, without directly calculating the actual valve timing while the engine is stopped, and variable valve timing control can be executed with good accuracy.

Also, in this seventeenth embodiment, when reverse rotation of the engine has occurred, because the actual valve timing is controlled to a reference position, a state of readiness for the next variable valve timing control can be reached swiftly.

Eighteenth Embodiment

Next, an eighteenth embodiment of the invention will be described.

The variable valve timing device 18 in this embodiment has a construction such that when the motor 26 is not being driven the output shaft 27 of the motor 26 rotates synchronously with the intake-side camshaft 16. The state of rotation (rotating forward/rotating backward/stopped) of the motor 26 can be determined for example on the basis of the output signal of the motor speed sensor 29. Therefore, when the motor 26 is rotating synchronously with the intake-side camshaft 16, it is possible to determine the state of rotation of the engine 11 by determining the state of rotation of the motor 26.

Figure 42:
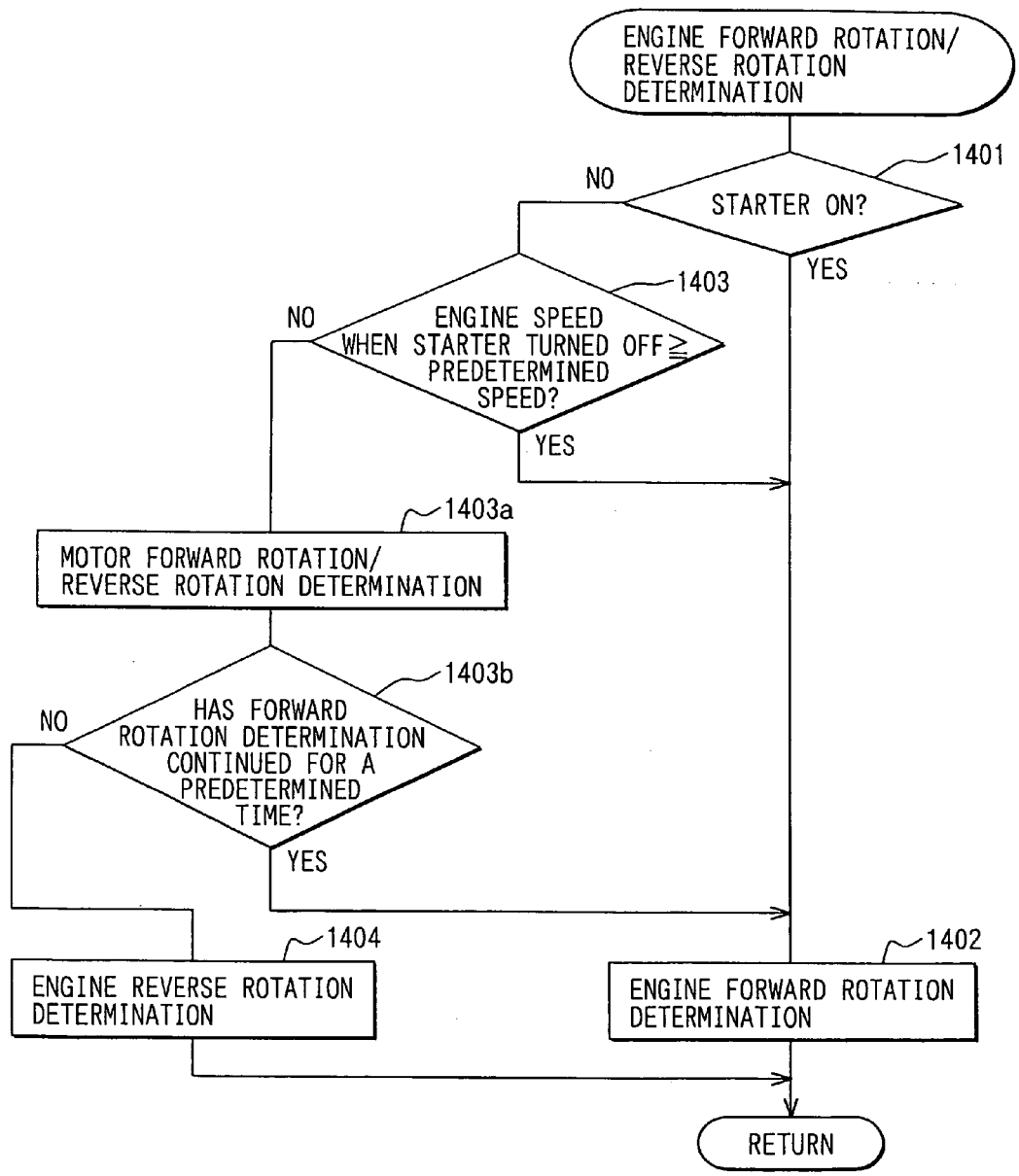
FIG. 42 is a flow chart showing the flow of processing of an engine forward rotation/backward rotation determination program of an eighteenth embodiment.

An engine forward rotation/reverse rotation determination program shown in FIG. 42 executed in this eighteenth embodiment is obtained by adding the processing of two steps 1403*a*, 1403*b* between step 1403 and step 1404 of FIG.

36 explained with reference to the seventeenth embodiment, and the processing of the other steps is the same as in FIG. 36.

In this program, when it is determined in step 1403 that the engine speed when the starter was turned off was lower than a predetermined engine speed at which forward rotation can be maintained, processing proceeds to step 1403*a*. In step 1403*a*, when the variable valve timing device 18 is holding the actual valve timing steady, that is, when the motor 26 is rotating synchronously with the intake-side camshaft 16, forward rotation or reverse rotation of the motor 26 is determined for example on the basis of the output signal of the motor speed sensor 29. This forward rotation or reverse rotation of the motor 26 corresponds to forward rotation or reverse rotation of the engine 11.

After this, processing proceeds to step 1403*b* and determines whether or not the state of forward rotation being determined on the basis of the state of rotation of the motor 26 after the starter turns off has continued for a predetermined time (or a predetermined number of revolutions). When as the result it is determined that the state of forward rotation being determined on the basis of the state of rotation of the motor 26 has continued for a predetermined time (or a predetermined number of revolutions), processing proceeds to step 1402 and determines that the engine is rotating forward. When on the other hand the state of forward rotation being determined on the basis of the state of rotation of the motor 26 does not continue for the predetermined time (or predetermined number of revolutions), processing proceeds to step 1404 and determines that the engine is rotating backward.

In this way, forward rotation/reverse rotation of the engine 11 after the starter is turned off can be determined more accurately.

Nineteenth Embodiment

In a nineteenth embodiment of the invention also, the variable valve timing device 18 has a construction such that the output shaft 27 of the motor 26 rotates synchronously with the intake-side camshaft 16 when the motor 26 is not being driven. Because of this, it is possible to determine the state of rotation of the engine 11 by determining the state of rotation of the motor 26 rotating synchronously with the intake-side camshaft 16.

Figure 43:
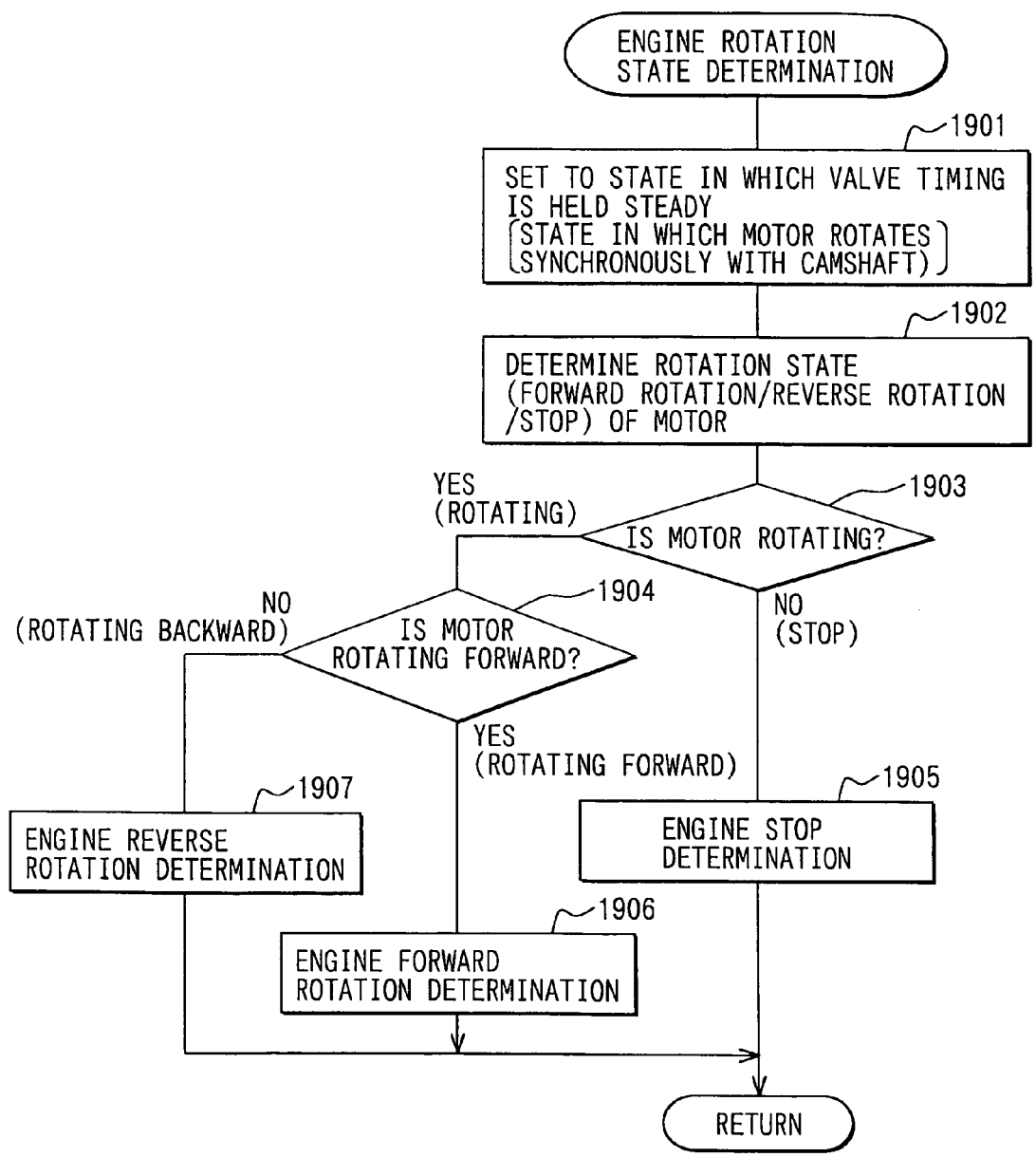
FIG. 43 is a flow chart showing the flow of processing of an engine rotation state determination program of a nineteenth embodiment.

In this nineteenth embodiment of the invention, the engine rotation state determination program shown in FIG. 43 is executed. When this program is started, first, in a step 1901, the variable valve timing device 18 is set to a state in which the actual valve timing is held steady, that is, the state wherein the motor 26 rotates synchronously with the intake-side camshaft 16. After that, processing proceeds to step 1902 and determines the state of rotation of the motor 26 (rotating forward/rotating backward/stopped) on the basis for example of the output signal of the motor speed sensor 29.

After this, processing proceeds to step 1903 and determines whether or not the motor is rotating on the basis of the determination result of step 1902. When it is determined that the motor is not rotating (i.e. the motor is stopped), processing proceeds to step 1905 and determines that the engine is stopped, and the present program ends.

On the other hand, when in step 1903 it is determined that the motor is rotating, processing proceeds to step 1904 and determines whether or not the motor is rotating forward on the basis of the determination of step 1902. When it is determined that the motor is rotating forward, processing proceeds to step 1906 and determines that the engine is rotating forward, and the present program ends.

With respect to this, when in step 1904 it is determined that the motor is not rotating forward (i.e. the motor is rotating backward), processing proceeds to step 1907 and determines that the engine is rotating backward, and the present program ends.

In the nineteenth embodiment described above, after the state wherein the motor 26 rotates synchronously with the intake-side camshaft 16 is set, the state of rotation (rotating forward/rotating backward/stopped) of the engine 11 is determined on the basis of the state of rotation of the motor 26 rotating synchronously with the intake-side camshaft 16, and consequently the state of rotation of the engine 11 can be determined with good accuracy.

Twentieth Embodiment

In executing variable valve timing control while the engine is stopped, in the seventeenth embodiment, as the amount of rotation of the motor 26 of the variable valve timing device 18 after the engine stops, the actual number of revolutions of the motor 26 was controlled to match a target number of revolutions to make the actual valve timing of the stopped engine match a target valve timing. With respect to this, in a twentieth embodiment, as the amount of rotation of the motor 26, a phase variation is used. That is, an actual phase variation (actual rotation angle) of the motor 26 after the engine stops is controlled to match a target phase variation (target rotation angle) to make the actual valve timing of the stopped engine match a target valve timing.

The phase variation (rotation angle) of the motor 26 can be detected by counting a pulse signal outputted from the motor speed sensor 29 every time the motor 26 rotates through a predetermined angle.

Figure 44:
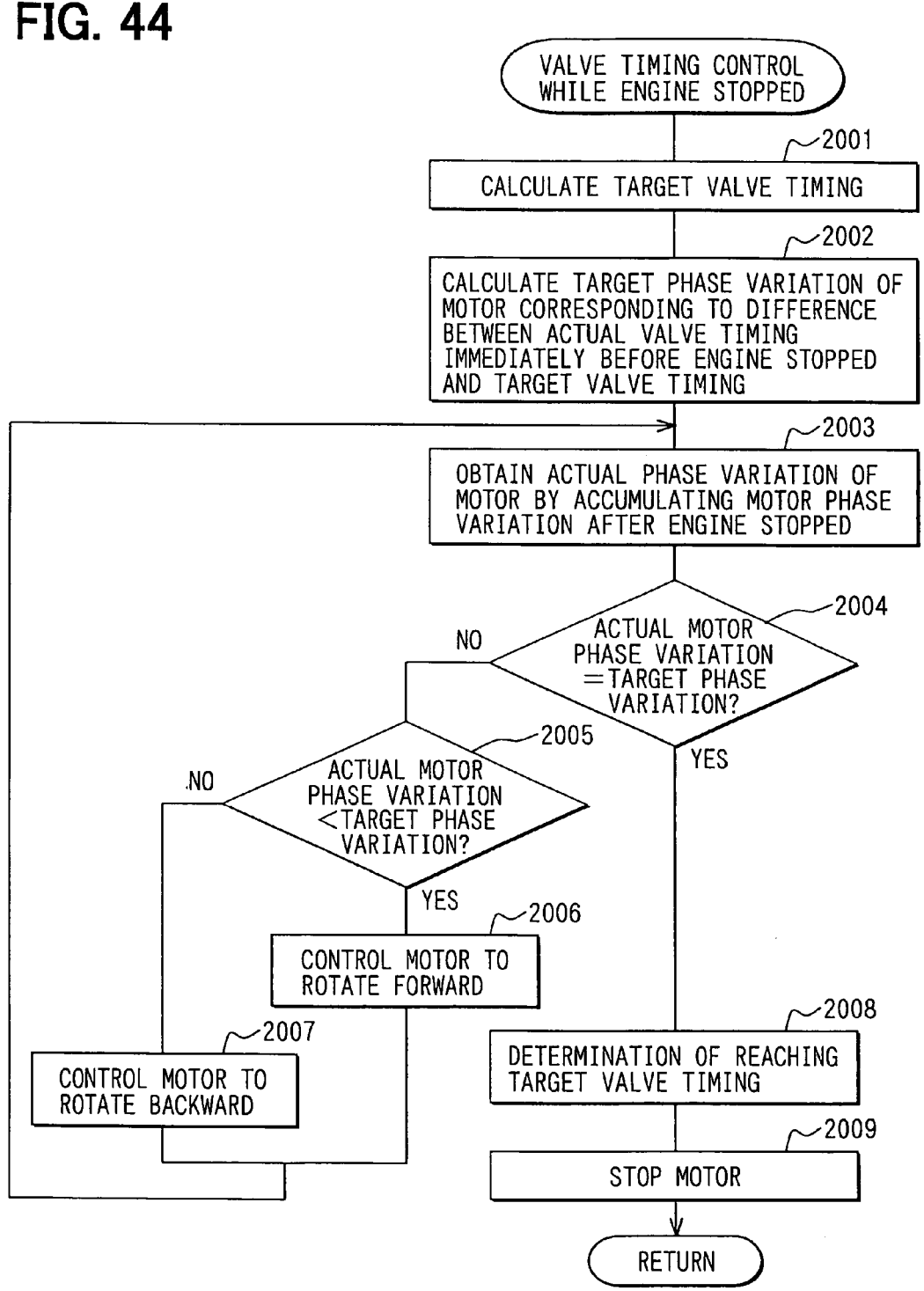
FIG. 44 is a flow chart-showing the flow of processing of a valve timing control program for a stopped engine in a twentieth embodiment.

In the twentieth embodiment, a valve timing control program for while the engine is stopped shown in FIG. 44 is executed. When this program is started, first, in a step 2001, a target valve timing is calculated. Then, in step 2002, a target phase variation of the motor 26 corresponding to the difference (a target valve timing variation) between the actual valve timing calculated immediately before the engine stopped and the target valve timing is calculated. And in step 2003, the phase variation of the motor 26 since the engine stopped is totaled to obtain an actual phase variation of the motor 26. The phase variation of the motor 26 is for example given a plus value in the forward rotation direction of the motor and a minus value in the reverse rotation direction of the motor.

After this, in step 2004 and step 2005, the actual phase variation of the motor 26 since the engine stopped and the target phase variation are compared. If the actual phase variation of the motor 26 is lower than the target phase variation, the motor 26 is controlled to rotate forward in step 2006, and if the actual phase variation of the motor 26 is greater than the target phase variation the motor 26 is controlled to rotate backward in step 2007.

After that, when in step 2004 it is determined that the actual phase variation of the motor 26 since the motor stopped matches the target phase variation, in step 2008 it is determined that the actual valve timing of the stopped engine (the actual valve timing of immediately before the engine stopped+the valve timing variation) has reached the target valve timing. Then, in step 2009, the motor 26 is stopped and the actual valve timing as of that point in time is held.

In this twentieth embodiment also it is possible to calculate the actual valve timing of the stopped engine indirectly and make this actual valve timing match a target valve timing, and it is possible to execute variable valve timing control with good accuracy.

Twenty-first Embodiment

As in the foregoing seventeenth embodiment and twentieth embodiment, by controlling an amount of rotation (number of revolutions, rotation angle, phase variation) of the motor 26 showing an amount of actuation of the variable valve timing device 18 after the engine is stopped, it is possible to make the actual valve timing of the stopped engine match a target valve timing. However, the amount of actuation of the variable valve timing device 18 (amount of rotation of the motor 26) discussed above is not the only parameter expressing the valve timing variation since the engine stopped, and for example it is also possible to employ the amount of driving force supplied to the variable valve timing device.

Figure 45:
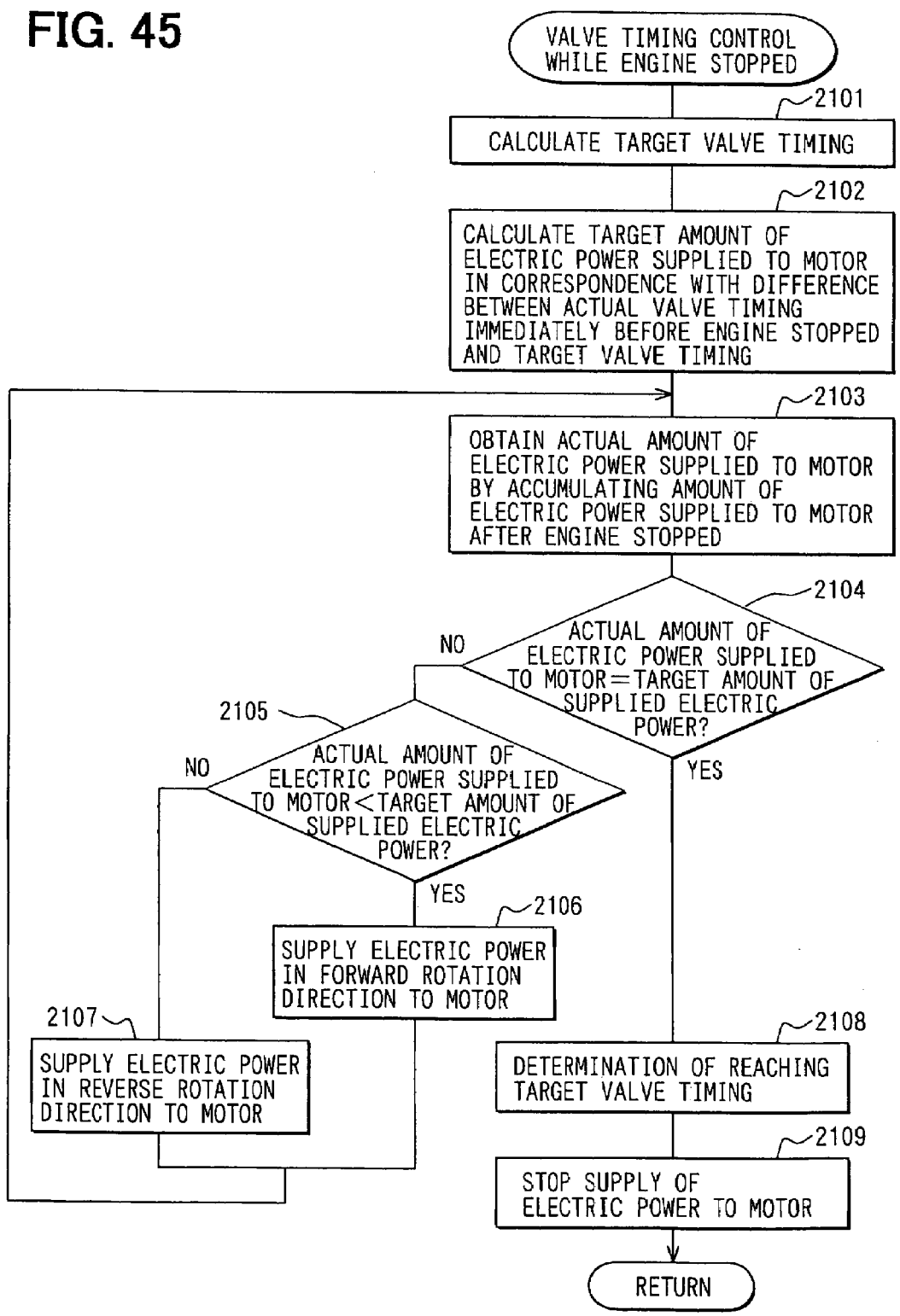
FIG. 45 is a flow chart showing the flow of processing of a valve timing control program for a stopped engine in a twenty-first embodiment.

In a twenty-first embodiment of the invention shown in FIG. 45, in executing variable valve timing control while the engine is stopped, as the amount of driving force supplied to the variable valve timing device 18 mentioned above, the amount of electric power supplied to the motor 26 of the variable valve timing device 18 is used. That is, an actual amount of electric power supplied to the motor 26 after the engine stops is controlled so as to match it to a target amount of supplied electric power to bring the actual valve timing of the stopped engine to a target valve timing.

In the twenty-first embodiment, a valve timing control program for when the engine is stopped shown in FIG. 45 is executed. When this program is started, first, in a step 2101, a target valve timing is calculated. Then, in step 2102, the target amount of the electric power supplied to the motor 26 corresponding to the difference (target valve timing variation) between the actual valve timing calculated immediately before the engine stopped and the target valve timing is calculated. After that, in step 2103, the amount of the electric power supplied to the motor 26 since the engine stopped is totaled to obtain the actual amount of the electric power supplied to the motor 26. The amount of the electric power supplied to the motor 26 is for example given a plus value in the forward rotation direction of the motor and a minus value in the reverse rotation direction of the motor.

After this, in step 2104 and step 2105, the actual amount of the electric power supplied to the motor 26 since the engine stopped and the target amount of the supplied electric power are compared. If the actual amount of the electric power supplied to the motor 26 is smaller than the target amount of the supplied electric power, in step 2106 electrical power in the forward rotation direction is supplied to the motor 26. On the other hand, if the actual amount of the electric power supplied to the motor 26 is larger than the target amount of the supplied electric power, in step 2107 electrical power in the reverse rotation direction is supplied to the motor 26.

After that, when in step 2104 it is determined that the actual amount of the electric power supplied to the motor 26 since the engine stopped matches the target amount of the supplied electric power, in step 2108 it is determined that the actual valve timing of the stopped engine (the actual valve timing of immediately before the engine stopped+the valve timing variation) has reached the target valve timing. Then, in step 2109, the supply of electrical power to the motor 26 is stopped and the actual valve timing of that point in time is held.

With the twenty-first embodiment described above also, it is possible to calculate the actual valve timing of the stopped engine indirectly and make this actual valve timing match a target valve timing, and variable valve timing control can be executed with good accuracy.

Twenty-second Embodiment

In the twenty-first embodiment described above, because the variable valve timing device 18 was motor-driven, as the amount of driving force to the variable valve timing device 18 the amount of electric power supplied to the motor 26 of the variable valve timing device 18 was used.

In a twenty-second embodiment, in a case where a hydraulically driven variable valve timing device is used, the amount of oil supplied from a hydraulic drive source (an electric oil pump) is employed as the amount of driving force supplied to the variable valve timing device. That is, in a twenty-second embodiment of the invention shown in FIG. 46, in a hydraulically driven variable valve timing device (hereinafter, "hydraulic VCT") driven by hydraulic pressure supplied from an electric oil pump or the like provided separately from the engine 11, an actual amount of oil supplied to the hydraulic VCT since the engine stopped is controlled to match a target amount of supplied oil to make the actual valve timing of the stopped engine match a target valve timing.

Figure 46:
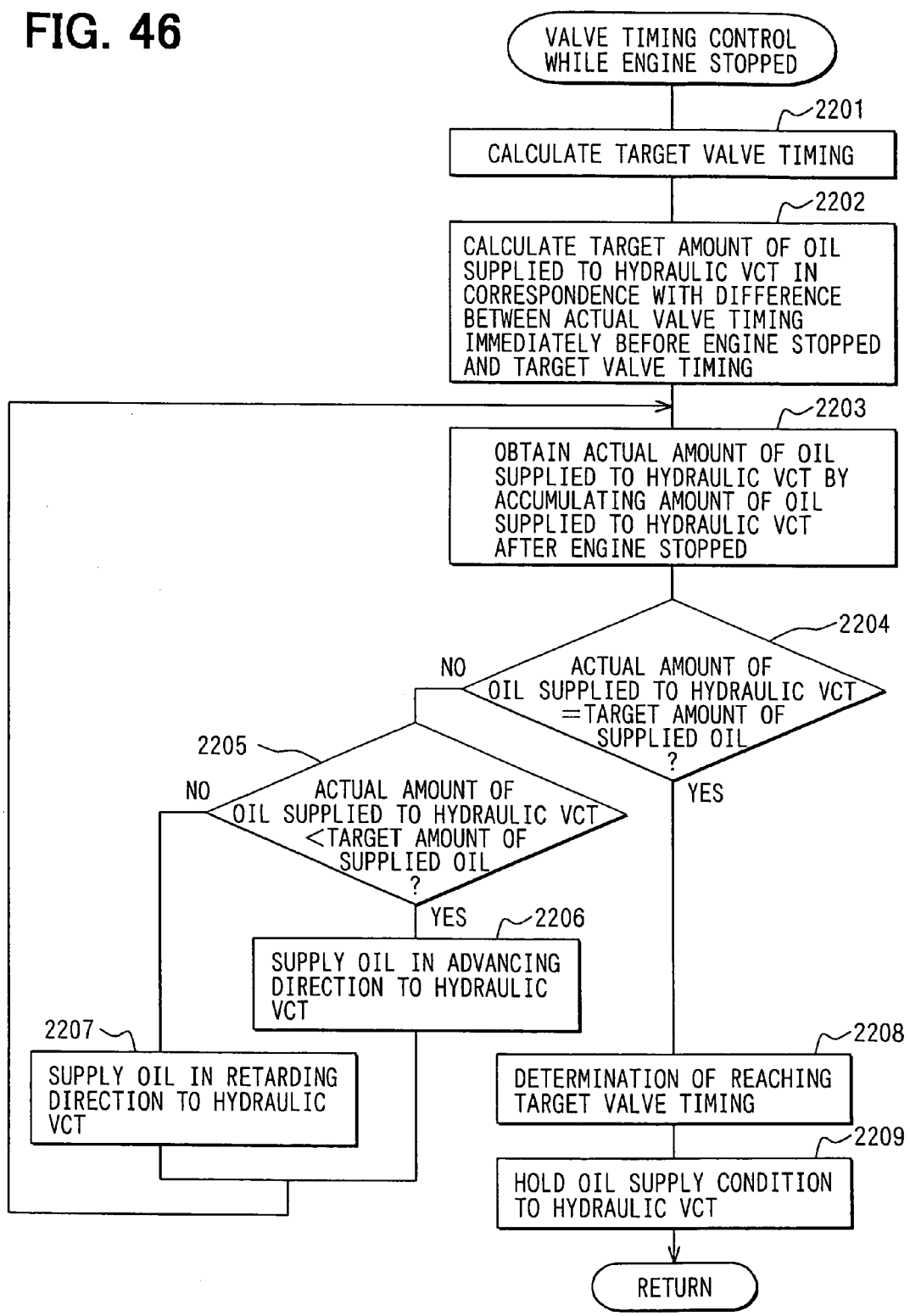
FIG. 46 is a flow chart showing a flow of processing of a valve timing control program of a stopped engine in a twenty-second embodiment.

In this twenty-second embodiment, a valve timing control program for when the engine is stopped shown in FIG. 46 is executed. When this program is started, first, in a step 2201, a target valve timing is calculated. Then, in a step 2202, a target amount of oil supplied to the hydraulic VCT corresponding to the difference (target valve timing variation) between the actual valve timing calculated immediately before the engine stopped and the target valve timing is calculated. And in step 2203, the amount of oil supplied to the hydraulic VCT since the engine stopped is totaled to obtain the actual amount of oil supplied to the hydraulic VCT. The amount of oil supplied to the hydraulic VCT is for example given a plus value in the valve timing advancing direction and a minus value in the valve timing retarding direction.

After this, in step 2204 and step 2205 the actual amount of oil supplied to the hydraulic VCT since the engine stopped and the target amount of supplied oil are compared, and if the actual amount of oil supplied to the hydraulic VCT is smaller than the target amount of supplied oil, in step 2206 a hydraulic pressure in the valve timing advancing direction is supplied to the hydraulic VCT. On the other hand, if the actual amount of oil supplied to the hydraulic VCT is larger than the target amount of supplied oil, in step 2207 a hydraulic pressure in the valve timing retarding direction is supplied to the hydraulic VCT.

After that, when in step 2204 it is determined that the actual amount of oil supplied to the hydraulic VCT matches the target amount of supplied oil, in step 2208 it is determined that the actual valve timing of the stopped engine (the actual valve timing of immediately before the engine stopped+the valve timing variation) has reached the target valve timing. Then, in step 2209, the condition of the oil supply to the hydraulic VCT is held to hold the actual valve timing of that point in time.

In the twenty-second embodiment described above also, it is possible to calculate the actual valve timing of the stopped engine indirectly and make this actual valve timing match a target valve timing, and variable valve timing control can be executed with good accuracy.

Twenty-third Embodiment

In controlling the actual valve timing to a reference position (most advanced angle position or most retarded angle position) when the engine is rotating backward or stopped after rotating backward, in the foregoing seventeenth embodiment, it was determined whether or not the actual valve timing had reached the reference position on the basis of whether or not the actual accumulated value of the control output to the motor 26 had risen above a target accumulated value of the control output. With respect to this, in a twenty-third embodiment, it is determined whether or not the actual valve timing has reached the reference position on the basis of whether or not an actual total control time value of the motor 26 has risen above a target total control time value. That is, in determining the control output to the variable valve timing device 18, besides the accumulated value of that control output, it is also possible to determine whether or not the actual valve timing has reached the reference position by using a total value of control time.

Figure 47:
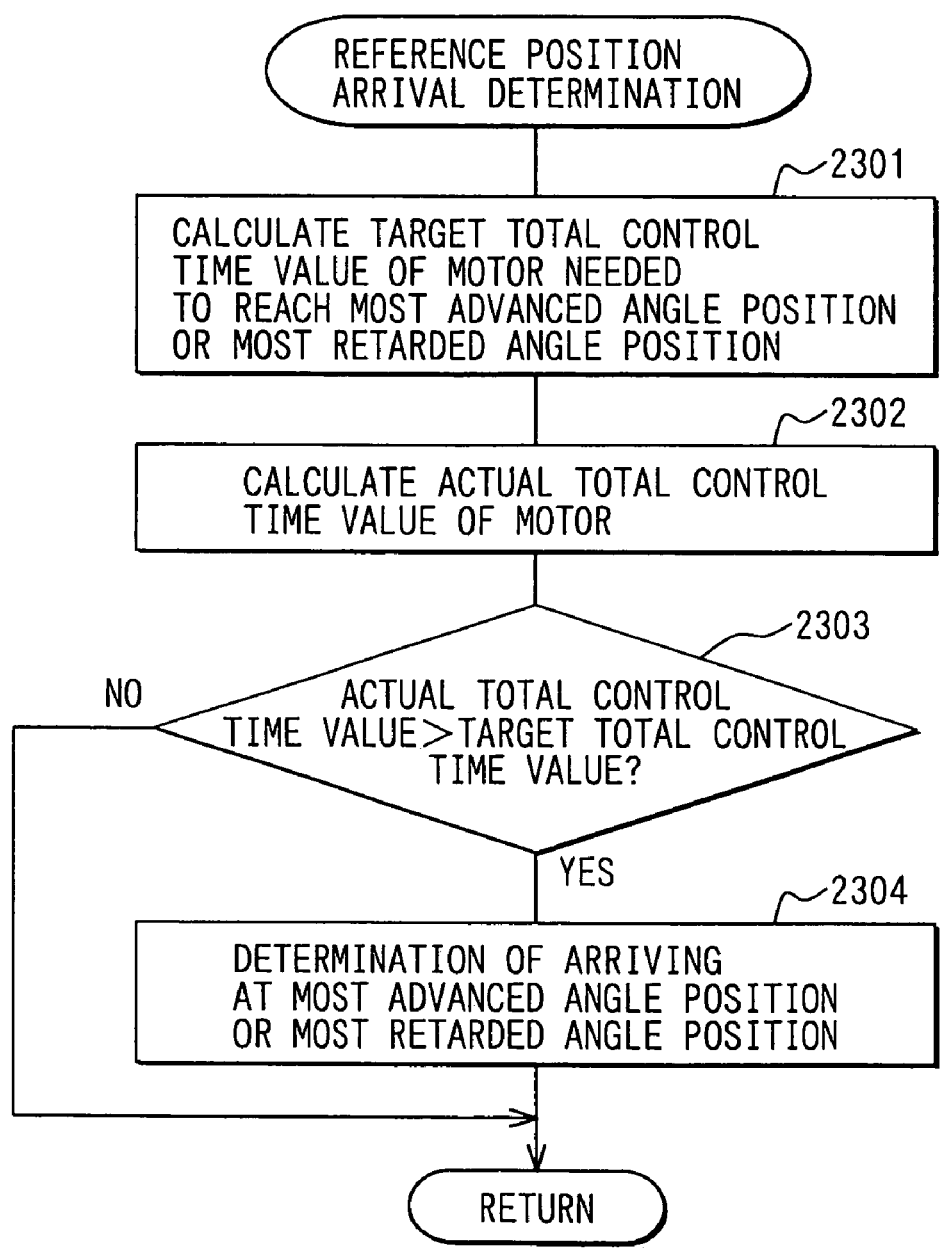
FIG. 47 is a flow chart showing a flow of processing of a reference position arrival determination program of a twenty-third embodiment.

In the twenty-third embodiment, a reference position arrival determination program shown in FIG. 47 is executed. In this program, first, in a step 2301, a target total control time value of the motor 26 needed to bring the actual valve timing to the reference position (a most advanced angle position or a most retarded angle position) (to make the moving part of the phase-varying mechanism 21 hit the stopper part) is calculated. After that, processing proceeds to step 2302, and totals the motor control time from when the motor 26 started to be controlled to move the actual valve timing in the direction of the reference position (most advanced angle position or most retarded angle position) to obtain an actual total control time value.

After this, in step 2303, the actual total control time value of the motor 26 and the target total control time value are compared. When the actual total control time value of the motor 26 has risen above the target total control time value, in step 2304 it is deduced that the actual valve timing has arrived at the reference position (most advanced angle position or most retarded angle position).

With this twenty-third embodiment also, it is possible to determine accurately whether or not the actual valve timing has reached the reference position (most advanced angle position or most retarded angle position).

Twenty-fourth Embodiment

In the foregoing seventeenth to twenty-third embodiments, it was determined whether or not the actual valve timing had reached a reference position on the basis of a control output to the variable valve timing device 18. However, whether or not the actual valve timing has reached a reference position can also be determined on the basis of an operating state of the variable valve timing device 18.

Figure 48:
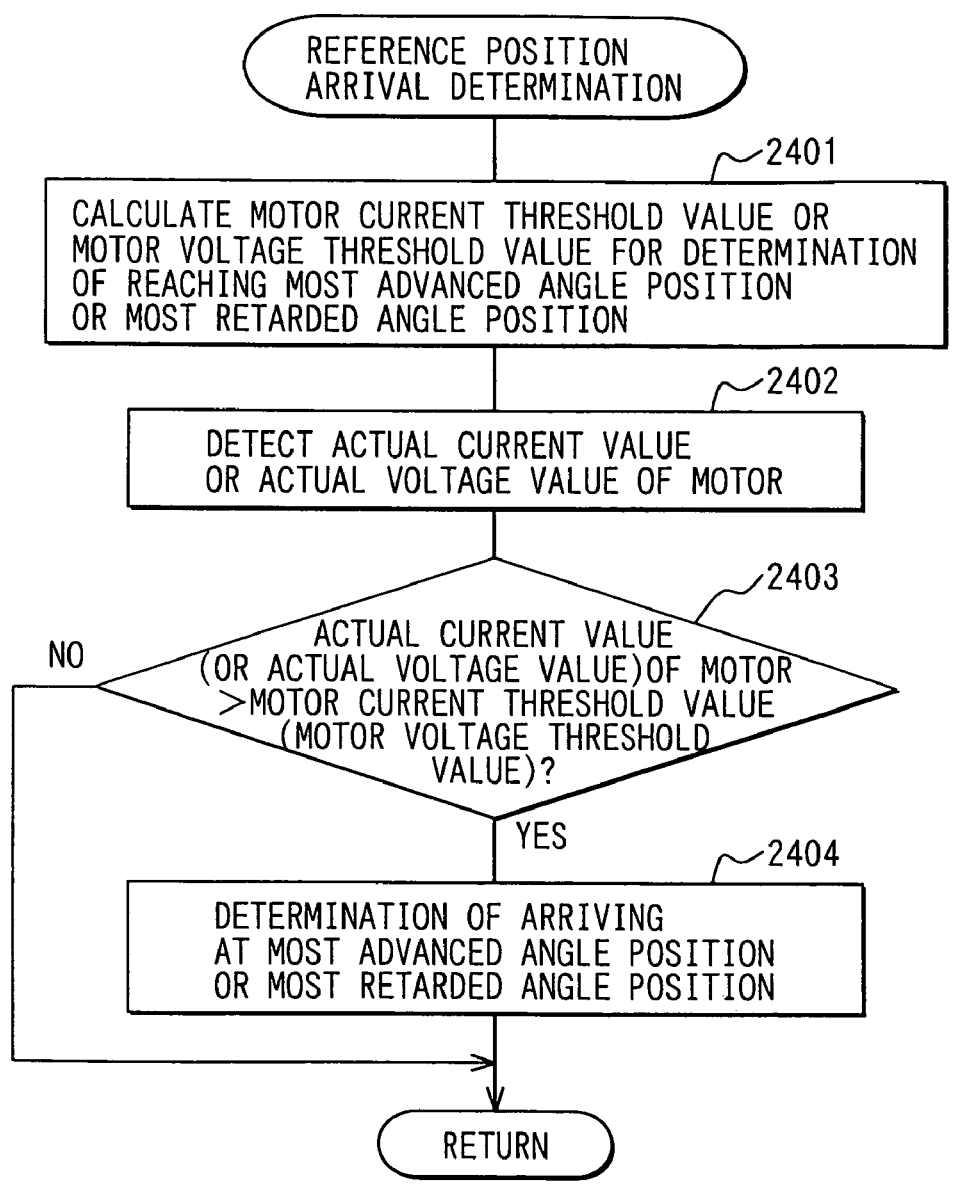
FIG. 48 is a flow chart showing a flow of processing of a reference position arrival determination program of a twenty-fourth embodiment.

A twenty-fourth embodiment shown in FIG. 48 focuses on the fact that when the actual valve timing reaches the reference position (most advanced angle position or most retarded angle position) and the moving part of the phase-varying mechanism 21 hits the stopper part, the rotation of the motor 26 slows suddenly to the same speed as the camshaft speed or stops suddenly, and the current value or voltage value of the motor 26 increases. That is, in this embodiment, as an operating state of the variable valve timing device 18, the actual current value or actual voltage value of the motor 26 is monitored, and whether or not the actual valve timing has reached the reference position is determined on the basis of whether or not the actual current value or actual voltage value has risen above a predetermined threshold value.

In the twenty-fourth embodiment, a reference position arrival determination program shown in FIG. 48 is executed. In this program, first, in a step 2401, a motor current threshold value or a motor voltage threshold value for determining whether or not the actual valve timing has reached the reference position (most advanced angle position or most retarded angle position) (that is, whether or not the rotation of the motor 26 is being restricted and consequently the current value or the voltage value of the motor 26 has increased) is calculated. After that, in step 2402, the actual current value or the actual voltage value of the motor 26 is detected.

After this, in step 2403, the actual current value (or actual voltage value) of the motor 26 and the motor current threshold value (or motor voltage threshold value) are compared. When the actual current value (or actual voltage value) of the motor 26 has risen above the motor current threshold value (or motor voltage threshold value), in step 2404, it is inferred that the actual valve timing has reached the reference position (most advanced angle position or most retarded angle position).

With this twenty-third embodiment also, it is possible to determine accurately whether or not the actual valve timing has reached the reference position (most advanced angle position or most retarded angle position).

Twenty-fifth Embodiment

The twenty-fifth embodiment constitutes a variation of the twenty-fourth embodiment described above. That is, in this twenty-fifth embodiment, when the actual valve timing reaches the reference position (most advanced angle position or most retarded angle position) and the moving part of the phase-varying mechanism 21 hits the stopper part and the rotation of the motor 26 slows suddenly to the same speed as the camshaft speed or stops suddenly, this is detected on the basis of the actual speed of the motor 26. Specifically, when the rotation of the motor 26 slows suddenly to the same speed as the camshaft speed or stops suddenly and the actual speed of the motor 26 falls below a predetermined threshold value, it is determined that the actual valve timing has arrived at the reference position.

Figure 49:
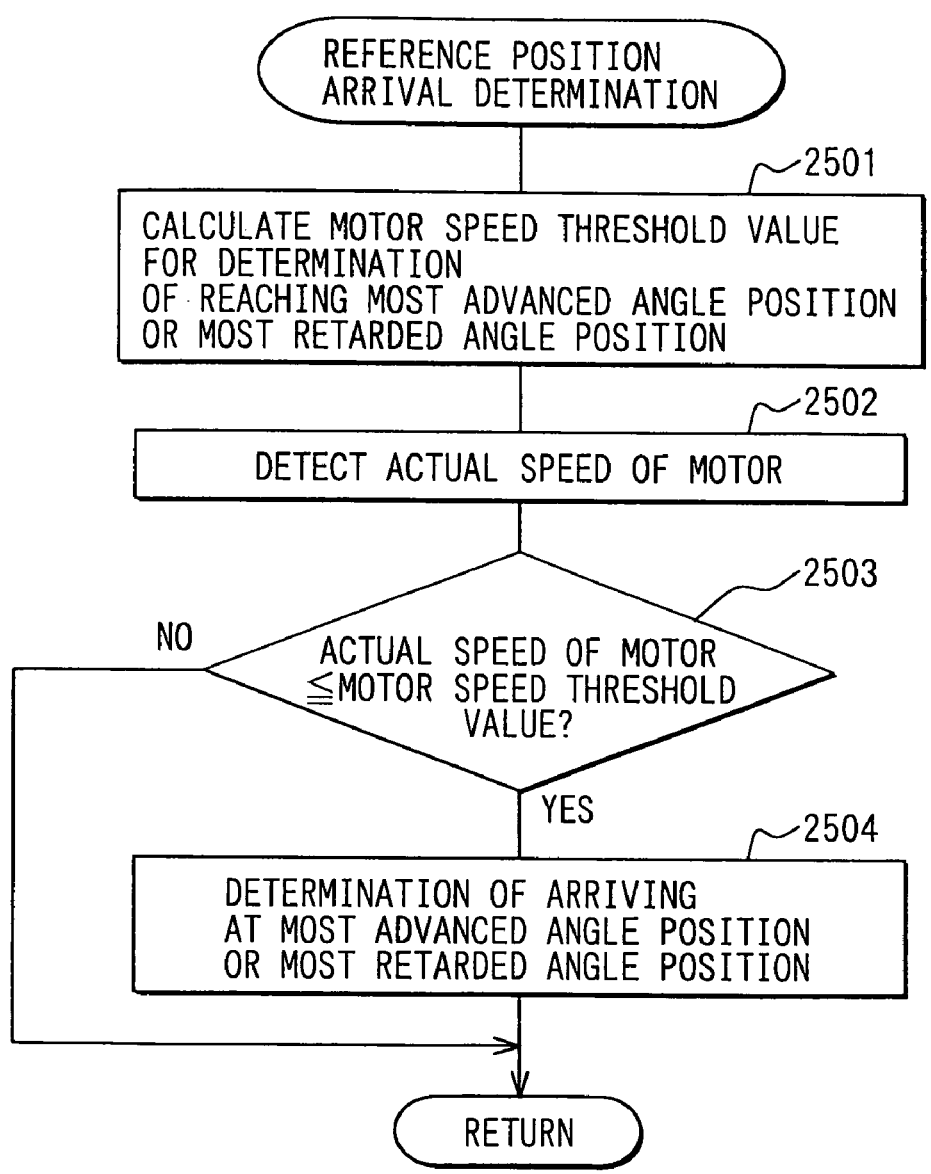
FIG. 49 is a flow chart showing a flow of processing of a reference position arrival determination program of a twenty-fifth embodiment.

In the twenty-fifth embodiment, the reference position arrival determination program shown in FIG. 49 is executed. In this program, first, in a step 2501, a motor speed threshold value for determining whether or not the actual valve timing has reached the reference position (most advanced angle position or most retarded angle position) (that is, whether or not the speed of the motor 26 has fallen suddenly) is calculated. After that, in step 2502, the actual speed of the motor 26 is detected.

After this, in step 2503, the actual speed of the motor 26 and the motor speed threshold value are compared. When the actual speed of the motor 26 has fallen below the motor speed threshold value, in step 2504, it is inferred that the actual valve timing has arrived at the reference position (most advanced angle position or most retarded angle position).

With this twenty-fifth embodiment also, it is possible to determine accurately whether or not the actual valve timing has reached the reference position (most advanced angle position or most retarded angle position).

Twenty-sixth Embodiment

Next, a twenty-sixth embodiment of the invention will be described, using FIG. 50.

When the engine speed is low, such as on starting and stopping of the engine, the generated power (battery charging power) of an alternator driven by the engine 11 falls, and the battery voltage tends to fall. When during variable valve timing control on starting or stopping of the engine the battery voltage becomes too low, there is a possibility of the power supplied to the variable valve timing device 18 becoming insufficient and deficient operation of the variable valve timing device 18 occurring or of the power supplied to the starter becoming insufficient and the startability of the engine 11 falling.

Figure 50:
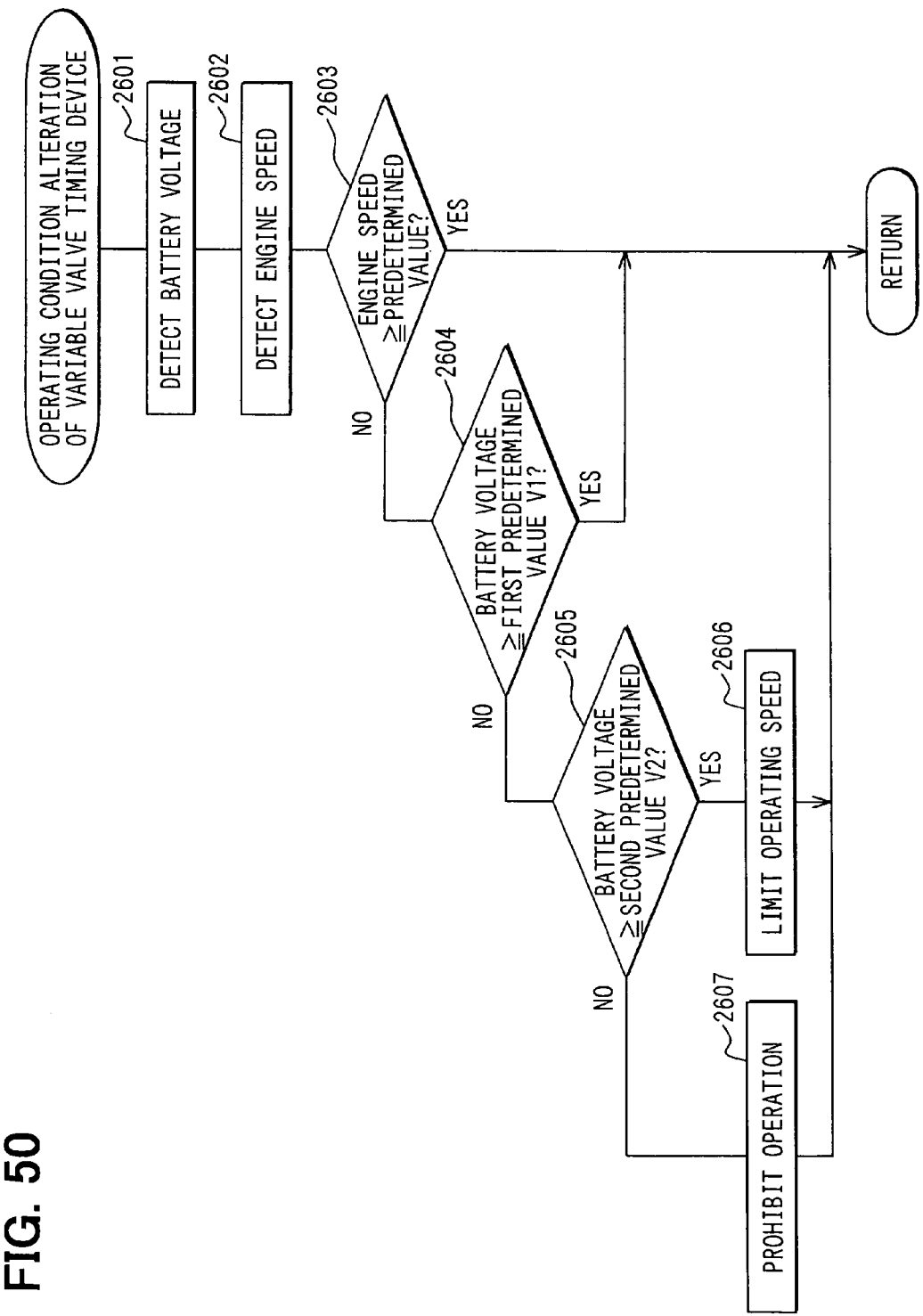
FIG. 50 is a flow chart showing a flow of processing of a variable valve timing device operating condition alteration program of a twenty-sixth embodiment.

As a countermeasure to this, in a twenty-sixth embodiment, by an operating condition alteration program of the variable valve timing device shown in FIG. 50 being executed, when the engine speed is lower than a predetermined value, an operating condition of the variable valve timing device 18 is changed in correspondence with the battery voltage. By this means, even when the battery voltage falls when the engine speed falls at times such as on starting and stopping of the engine, an operating condition of the variable valve timing device 18 can be changed so that the variable valve timing device 18 can operate normally under that battery voltage condition or so that the power supply to the starter can be secured.

The operating condition alteration program of the variable valve timing device 18 shown in FIG. 50 is executed with a predetermined period over the time from when the IG switch is turned on to when the VCT drive relay is turned off. When this program is started, first, in a step 2601, the present battery voltage is detected. After that, in step 2602, the present engine speed is detected. Then, in step 2603, it is determined whether or not the engine speed is above a predetermined value. This predetermined value is set to an engine speed such that it is possible to secure a sufficient generated power (battery charging power) of an alternator driven by the engine 11. If as the result it is determined that the engine speed is above the predetermined value, it is inferred that problems caused by battery voltage drop will not occur, and the present program ends.

When on the other hand in step 2603 it is determined that the engine speed is lower than the predetermined value, processing proceeds to step 2604 and determines whether or not the battery voltage is above a first predetermined value V1. If as the result it is determined that the battery voltage is above the first predetermined value V1, it is inferred that problems caused by battery voltage drop will not occur, and the present program ends.

When in step 2604 it is determined that the battery voltage is lower than the first predetermined value V1, processing proceeds to step 2605 and determines whether or not the battery voltage is above a second predetermined value V2. This second predetermined value V2 is set to a lower voltage value than the first predetermined value V1. When as the result it is determined that the battery voltage is lower than the first predetermined value V1 and higher than the second predetermined value V2, processing-proceeds to step 2606 and limits an actuation speed of the variable valve timing device 18 to below a predetermined speed and thereby reduces the power consumption of the variable valve timing device 18. By this means, the variable valve timing device 18 is operated normally in a low-power-consumption mode, and power supply to the starter and so on is ensured.

With respect to this, when it is determined that the battery voltage is lower than the second predetermined value V1, it is determined that this cannot be dealt with by an operation speed limiting on the variable valve timing device 18, and processing proceeds to step 2607 and prohibits operation of the variable valve timing device 18. By this means, defective operation of the variable valve timing device 18 and deficient power supply to the starter can be certainly prevented.

With the twenty-sixth embodiment described above, when the engine speed is lower than a predetermined value, in correspondence with the battery voltage the actuation speed of the variable valve timing device 18 is limited or operation of the variable valve timing device 18 is prohibited. As a result, even when a fall in the battery voltage occurs on starting or stopping of the engine, defective operation of the variable valve timing device 18 and deterioration of the startability of the engine arising due to this voltage fall can be prevented, and the quality of control on starting and stopping of the engine can be increased.

The predetermined value (threshold value) of the engine speed and the predetermined value (threshold value) of the battery voltage in the twenty-sixth embodiment may be altered in accordance with the engine state (temperature, engine load, electric load, oil viscosity and so on). If this is done, as times when the battery load is large, such as for example on cold-starting, the predetermined value of the engine speed or the predetermined value of the battery voltage can be made large to prevent problems caused by battery voltage deficiency.

And, although in the twenty-sixth embodiment the actuation speed of the variable valve timing device 18 was limited when the battery voltage was low, some other operating condition of the variable valve timing device 18 (for example an amount of operation) may alternatively be altered.

And although the twenty-sixth embodiment may be implemented in combination with the other embodiments described above, it may also be implemented alone.

And although in the foregoing seventeenth embodiment to twenty-sixth embodiment reverse rotation of the engine was determined on the valve timing control program side, alternatively reverse rotation of the engine may be determined on the engine control program side, and this determination result used in the valve timing control program. And the determination result of an engine reverse rotation determination executed on the valve timing control program side may be reflected on the engine control program side, and for example fuel-cutting control on reverse rotation determination may be executed.

And, in the foregoing seventeenth embodiment to twenty-sixth embodiment, in the executing of variable valve timing control with the engine stopped, by controlling a parameter expressing valve timing variation such as the amount of rotation of the motor 26 (number of revolutions, phase variation) since the engine stopped to a target value, the actual valve timing of the stopped engine was made to match a target valve timing without the actual valve timing being directly calculated while the engine is stopped. However, alternatively the actual valve timing of the stopped engine (actual valve timing immediately before the engine stopped+ valve timing variation) can be calculated on the basis of the actual valve timing immediately before the engine stopped and a parameter expressing a valve timing variation such as the amount of rotation (number of revolutions, phase variation) of the motor 26, and the variable valve timing device 18 may be feedback-controlled so as to make the actual valve timing of the stopped engine match a target valve timing.

And, the invention is not limited to a variable valve timing control device for intake valves as in the foregoing seventeenth embodiment to twenty-sixth embodiment, and may alternatively be applied to a variable valve timing control device for exhaust valves. Also, the construction of the variable valve timing device 18 may be suitably modified, and in short it may be any variable valve timing device driven by a drive source such as a motor or an oil pump provided separately from the engine.

What is claimed is:

1. A variable valve timing control device of an internal combustion engine, comprising:
    a variable valve timing device which varies valve timing of intake valves or exhaust valves of the internal combustion engine with a gear mechanism; and
    control means for controlling the variable valve timing device,
    wherein said control means executes rate-limiting control for limiting a valve timing change rate to a predetermined rate or less, when an actual valve timing is in a predetermined rate-limited region set in a vicinity of a limit position of a movable range of the variable valve timing device,
    wherein said control means does not execute the rate-limiting control when the actual valve timing is being changed in an opposite direction from a limit position of the rate-limited region even though the actual valve timing is in the rate-limited region.

2. A variable valve timing control device of an internal combustion engine according to claim 1, wherein said rate-limiting region is set on a basis of a valve timing variation needed to slow the valve timing change rate to the predetermined rate and/or on an actual valve timing detection error.

3. A variable valve timing control device of an internal combustion engine, comprising:
    a variable valve timing device which varies valve timing of intake valves or exhaust valves of the internal combustion engine with a gear mechanism;
    control means for controlling the variable valve timing device;
    wherein said control means executes rate-limiting control for limiting a valve timing change rate to a predetermined rate or less, when an actual valve timing is in a predetermined rate-limited region set in a vicinity of a limit position of a movable range of the variable valve timing device; and
    reference position learning means for learning a reference position of the valve timing,
    wherein said control means executes rate-limiting control for limiting the valve timing change rate to the predetermined rate or less, when said reference position learning means has not completed learning of the reference position.

4. A variable valve timing control device of an internal combustion engine according to claim 3, wherein said control means executes said rate-limiting control in a region where a difference between an actual valve timing and a limit position of a movable range of said variable valve timing device is within a predetermined value, when said reference position learning means has not completed learning of the reference position.

5. A variable valve timing control device of an internal combustion engine according to claim 3, wherein said control means sets a target valve timing in accordance with the valve timing change rate limited to the predetermined rate or less by said rate-limiting control, when executing variable valve timing control in a state that said reference position learning means has not completed learning of the reference position.

6. A variable valve timing control device of an internal combustion engine according to claim 3, wherein said reference position learning means prohibits normal variable valve timing control until reference position learning has been completed and executes only reference position learning.

7. A variable valve timing control device of an internal combustion engine according to claim 3, wherein said reference position leaning means learns the reference position before the internal combustion engine is started.

8. A variable valve timing control device of an internal combustion engine according to claim 7, further comprising start prohibiting means for prohibiting start control of said internal combustion engine until said reference position learning has been completed.

9. A variable valve timing control device of an internal combustion engine according to claim 8, wherein said start prohibiting means limits execution of a processing for prohibiting start control of said internal combustion engine until said reference position learning has been completed to a predetermined time from when an ignition switch is turned on.

10. A variable valve timing control device of an internal combustion engine, comprising:
    a variable valve timing device which varies valve timing of intake valves or exhaust valves of the internal combustion engine with a gear mechanism;
    control means for controlling the variable valve timing device; and
    reference position learning means for learning a reference position of the valve timing,
    wherein said control means executes rate-limiting control for limiting a valve timing change rate to a predetermined rate or less, when said reference position learning means has not completed learning of the reference position.

11. A variable valve timing control device of an internal combustion engine, comprising:
    a variable valve timing device which varies valve timing of intake valves or exhaust valves of the internal combustion engine with a gear mechanism;
    control means for controlling the variable valve timing device;
    reference position learning means for learning a reference position of the valve timing; and
    learning abnormality determination means for determining whether or not there has been an abnormality in reference position learning executed by said reference position learning means,
    wherein said control means executes rate-limiting control for limiting a valve timing change rate to a predetermined rate or less, when said learning abnormality determination means determines that there has been an abnormality in reference position learning.

12. A variable valve timing control device of an internal combustion engine according to claim 11, wherein said learning abnormality determination means determines that there has been an abnormality in reference position learning, when a reference position learning value of said reference position learning means exceeds a predetermined guard value.

13. A variable valve timing control device of an internal combustion engine according to claim 11, wherein said control means sets a target valve timing in accordance with the valve timing change rate limited to the predetermined rate or less by said rate-limiting control, when executing a variable valve timing control in a state that said learning abnormality determination means determines that there has been an abnormality in reference position learning.

14. A variable valve timing control device of an internal combustion engine according to claim 11, wherein said control means prohibits normal variable valve timing control and executes only reference position learning until said learning abnormality determination means determines that there is no abnormality in reference position learning.

15. A variable valve timing control device of an internal combustion engine, comprising:
a variable valve timing device which varies valve timing of intake valves or exhaust valves of the internal combustion engine with a gear mechanism; and
control means for controlling the variable valve timing device,
wherein said control means executes rate-limiting control for limiting a valve timing change rate to a predetermined rate or less, when an actual valve timing is in a predetermined rate-limited region set in a vicinity of a limit position of a movable range of the variable valve timing device,
said gear mechanism comprising:
a first rotating member disposed concentrically with a camshaft and rotationally driven by rotary drive power from a crankshaft;
a second rotating member that rotates integrally with said camshaft; and
a phase-varying member that transmits rotary power from said first rotating member to said second rotating member and varies rotation phase of said second rotating member with respect to said first rotating member, and
wherein drive power transmitting means between said first rotating member and said phase-varying member and/or drive power transmitting means between said second rotating member and said phase-varying member is constructed by a gear wheel, and
further comprising a motor for controlling a rotation phase of said phase-varying member, and
wherein said control means, when said valve timing is not to be changed, matches a speed of said motor to a speed of said camshaft to match a turning speed of said phase-varying member to the speed of said camshaft and thereby hold a difference in rotation phase between said first rotating member and said second rotating member steady and thus hold said valve timing steady, and when said valve timing is to be changed, changes the speed of said motor with respect to the speed of said camshaft to change the turning speed of said phase-varying member with respect to the speed of said camshaft and thereby vary the difference in rotation phase between said first rotating member and said second rotating member and thus vary said valve timing.

16. A variable valve timing control device of an internal combustion engine, comprising:
a variable valve timing device for varying valve timing of intake valves or exhaust valves by means of a drive source provided separately from the internal combustion engine;
valve timing control means for controlling the variable valve timing device so that an actual valve timing is matched to a target valve timing (hereinafter, referred to as "variable valve timing control"); and
rotation state determination means for determining a rotation state of the internal combustion engine,
wherein said valve timing control means performs actual valve timing calculation and/or variable valve timing control when said rotation state determination means determines that the internal combustion engine is rotating forward or is stopped,
wherein said valve timing control means controls said valve timing to a reference position when said rotation state determination means determines a reverse rotation of the internal combustion engine.

17. A variable valve timing control device of an internal combustion engine according to claim 16, wherein said rotation state determination means determines the rotation state of the internal combustion engine on a basis of an output signal from a crank angle sensor and/or a cam angle sensor.

18. A variable valve timing control device of an internal combustion engine according to claim 16, wherein said rotation state determination means determines that the internal combustion engine is rotating forward when the internal combustion engine is rotating and it is determined that an engine speed at a time when a starter is being turned on or when the starter is turned off is not less than a predetermined value.

19. A variable valve timing control device of an internal combustion engine according to claim 16, wherein in a case where said reference position is set to a limit position of a movable range of said variable valve timing device said valve timing control means controls said valve timing to said reference position while the internal combustion engine is rotating backward or while the internal combustion engine is stopped after rotating backward.

20. A variable valve timing control device of an internal combustion engine according to claim 19, wherein said valve timing control means determines on a basis of a control output to said variable valve timing device whether or not the actual valve timing reaches the reference position set to the limit position of the movable range of said variable valve timing device.

21. A variable valve timing control device of an internal combustion engine according to claim 19, wherein said valve timing control means determines on a basis of an operating state of said variable valve timing device whether or not the actual valve timing reaches the reference position set to the limit position of the movable range of said variable valve timing device.

22. A variable valve timing control device of an internal combustion engine according to claim 16, wherein in a case where said reference position is set to an intermediate position in a movable range said valve timing control means controls the actual valve timing to said reference position while the internal combustion engine is stopped after rotating backward.

23. A variable valve timing control device of an internal combustion engine according to claim 16, wherein said valve timing control means changes an operating condition of said variable valve timing device in correspondence with a battery voltage when a speed of the internal combustion engine is lower than a predetermined value.

24. A variable valve timing control device of an internal combustion engine according to claim 23, wherein said valve timing control means limits an actuation speed of said variable valve timing device when said battery voltage is within a range from a first predetermined value to a second predetermined value lower than that, and prohibits an operation of said variable valve timing device when the battery voltage is lower than said second predetermined value.

25. A variable valve timing control device of an internal combustion engine, comprising:
- a variable valve timing device for varying valve timing of intake valves or exhaust valves by means of a drive source provided separately from the internal combustion engine;
- valve timing control means for controlling the variable valve timing device so that an actual valve timing is matched to a target valve timing (hereinafter, referred to as "variable valve timing control");
- rotation state determination means for determining a rotation state of the internal combustion engine;
- wherein said valve timing control means performs actual valve timing calculation and/or variable valve timing control when said rotation state determination means determines that the internal combustion engine is rotating forward or is stopped; and
- a drive motor having a rotating shaft synchronously rotating with said camshaft, wherein said rotation state determination means determines the rotation state of the internal combustion engine based on a rotation state of the motor.

26. A variable valve timing control device of an internal combustion engine according to claim 25, wherein said rotation state determination means determines that the internal combustion engine is rotating forward when a state determined that the internal combustion engine is rotating forward based on the rotation state of the motor after the starter is turned off is continued for a predetermined time.

27. A variable valve timing control device of an internal combustion engine according to claim 25, wherein said variable valve timing device comprising:
- a first rotating member disposed concentrically with the camshaft and rotationally driven by rotary drive power from a crankshaft;
- a second rotating member that rotates integrally with the camshaft;
- a phase-varying member that transmits rotary power from said first rotating member to said second rotating member and varies rotation phase of said second rotating member with respect to said first rotating member; and
- a motor disposed concentrically with said camshaft so as to control the rotation phase of this phase-varying member,
- wherein said variable valve timing device is constructed so that when said valve timing is not to be changed a speed of said motor is matched to a speed of said camshaft to match a turning speed of said phase-varying member to the speed of said camshaft and thereby hold a difference in rotation phase between said first rotating member and said second rotating member steady and thus hold said valve timing steady, and when said valve timing is to be changed the speed of said motor is changed with respect to the speed of said camshaft to change the turning speed of said phase-varying member with respect to the speed of said camshaft and thereby vary the difference in rotation phase between said first rotating member and said second rotating member and thus vary said valve timing, and
- wherein said rotation state determination means determines the rotation state of the internal combustion engine based on the rotation state of the motor when said variable valve timing device holds the valve timing steady.

28. A variable valve timing control device of an internal combustion engine, comprising:
- a variable valve timing device for varying valve timing of intake valves or exhaust valves by means of a drive source provided separately from the internal combustion engine;
- valve timing control means for controlling the variable valve timing device so that an actual valve timing is matched to a target valve timing (hereinafter, referred to as "variable valve timing control"); and
- rotation state determination means for determining a rotation state of the internal combustion engine,
- wherein said valve timing control means performs actual valve timing calculation and/or variable valve timing control when said rotation state determination means determines that the internal combustion engine is rotating forward or is stopped,
- wherein said valve timing control means controls an actuation amount of said variable valve timing device and/or a drive power amount supplied to said variable valve timing device after the engine is stopped to make the actual valve timing match the target valve timing, when said variable valve timing control is executed while the internal combustion engine is stopped.

29. A variable valve timing control device of an internal combustion engine according to claim 28, wherein in a case where said variable valve timing device is of a type driven by a motor said valve timing control means controls a rotation amount of said motor as the actuation amount of said variable valve timing device.

30. A variable valve timing control device of an internal combustion engine according to claim 28, wherein in a case where said variable valve timing device is of a type driven by a motor said valve timing control means controls a supplied electric power amount as the drive power amount supplied to said variable valve timing device.

31. A variable valve timing control device of an internal combustion engine according to claim 28, wherein in a case where said variable valve timing device is of a type driven by a hydraulic pressure said valve timing control means controls a supplied oil amount as the drive power amount supplied to said variable valve timing device.

* * * * *

UNITED STATES PATENT AND TRADEMARK OFFICE
CERTIFICATE OF CORRECTION

| | |
|---|---|
| PATENT NO. | : 7,363,896 B2 |
| APPLICATION NO. | : 11/494612 |
| DATED | : April 29, 2008 |
| INVENTOR(S) | : Urushihata et al. |

It is certified that error appears in the above-identified patent and that said Letters Patent is hereby corrected as shown below:

On the Title Page please add the following:

Item(30) Foreign Application Priority Data

Oct. 25, 2002   [JP]   Japan..............................2002-310579

Nov. 5, 2002    [JP]   Japan..............................2002-320612

Nov. 28, 2002   [JP]   Japan..............................2002-344892

Feb. 24, 2003   [JP]   Japan..............................2003-45392

Oct. 23, 2003   [JP]   PCT/JP03/13578

Signed and Sealed this

Twenty-sixth Day of August, 2008

JON W. DUDAS
*Director of the United States Patent and Trademark Office*